US012792607B2

(12) United States Patent
Rolo

(10) Patent No.: US 12,792,607 B2
(45) Date of Patent: Nov. 10, 2026

(54) SYSTEMS AND METHODS FOR MANAGING STORAGE SYSTEM MONITORING DATA USING VALUE DETECTION

(71) Applicant: NetApp, Inc., San Jose, CA (US)

(72) Inventor: Carlos Rolo, Lisbon (PT)

(73) Assignee: NetApp, Inc., San Jose, CA (US)

( * ) Notice: Subject to any disclaimer, the term of this patent is extended or adjusted under 35 U.S.C. 154(b) by 9 days.

(21) Appl. No.: 18/888,061

(22) Filed: Sep. 17, 2024

(65) Prior Publication Data

US 2025/0245227 A1 Jul. 31, 2025

Related U.S. Application Data

(63) Continuation-in-part of application No. 18/646,559, filed on Apr. 25, 2024, which is a continuation-in-part of application No. 18/424,368, filed on Jan. 26, 2024.

(51) Int. Cl.
*G06F 16/2455* (2019.01)
*G06F 3/06* (2006.01)
(Continued)

(52) U.S. Cl.
CPC ........ *G06F 16/2455* (2019.01); *G06F 3/0653* (2013.01); *G06F 11/3082* (2013.01);
(Continued)

(58) Field of Classification Search
CPC ............. G06F 16/2455; G06F 16/1744; G06F 16/1748; G06F 3/0653; G06F 11/3409; G06F 11/3082; H04L 43/08; H04L 43/02
See application file for complete search history.

(56) References Cited

U.S. PATENT DOCUMENTS 5,473,742 A 12/1995 Polyakov et al.
7,437,003 B1 10/2008 Gorbatov et al.
(Continued)

FOREIGN PATENT DOCUMENTS

CN 111930751 A 11/2020
GB 2585513 A 1/2021

OTHER PUBLICATIONS

Cheng H., "Compressing Time Series Data," Technical Report, TDEngine, Oct. 2022, pp. 1-7.
(Continued)

*Primary Examiner* — Nam T Tran
(74) *Attorney, Agent, or Firm* — Jaffery Watson Hamilton & DeSanctis LLP

(57) ABSTRACT

A monitoring system can generate compressed storage system monitoring data segments using monitoring data obtained from a storage system. The monitoring system can obtain a segment of storage system monitoring data and generate a compressed segment from the segment and a reconstructed segment from the compressed segment. The monitoring system can identify locations in the segment based on a comparison of the segment and the reconstructed segment and determine values for the identified locations. In response to a user query received from a user system, the user query indicating a portion of the segment, the monitoring system can perform at least one of: reconstructing and providing the portion using the identified locations, the determined values for the identified locations, and the compressed segment; or providing the identified locations, the determined values for the identified locations, and the compressed segment for reconstruction of the portion.

20 Claims, 22 Drawing Sheets

(51) Int. Cl.
*G06F 11/30* (2006.01)
*G06F 11/34* (2006.01)
*G06F 16/174* (2019.01)
*H04L 43/02* (2022.01)
*H04L 43/08* (2022.01)

(52) U.S. Cl.
CPC ...... *G06F 11/3409* (2013.01); *G06F 16/1744* (2019.01); *H04L 43/02* (2013.01); *H04L 43/08* (2013.01)

(56) References Cited

U.S. PATENT DOCUMENTS

| | | | |
|---|---|---|---|
| 8,122,196 | B2 | 2/2012 | Chang |
| 8,742,959 | B1 | 6/2014 | Efros et al. |
| 10,120,893 | B1 | 11/2018 | Rocamora et al. |
| 10,156,993 | B1 | 12/2018 | Armangau et al. |
| 10,360,251 | B1 | 7/2019 | Bairavasundaram et al. |
| 11,138,200 | B1 * | 10/2021 | Mantzouratos ... G06F 16/24556 |
| 2008/0301256 | A1 | 12/2008 | McWilliams et al. |
| 2011/0314356 | A1 * | 12/2011 | Grube ..................... G06F 11/10 714/763 |
| 2014/0040276 | A1 | 2/2014 | Chen et al. |
| 2014/0195498 | A1 | 7/2014 | Asher et al. |
| 2019/0296963 | A1 * | 9/2019 | Bonnell .............. G06F 11/3409 |
| 2019/0319642 | A1 | 10/2019 | Abdellatif et al. |
| 2020/0091930 | A1 * | 3/2020 | Nag .................... H03M 7/3079 |
| 2020/0133583 | A1 | 4/2020 | Xiao et al. |
| 2020/0177443 | A1 * | 6/2020 | Asghar ................... H04L 43/02 |
| 2020/0272605 | A1 * | 8/2020 | More .................. G06F 16/1744 |
| 2020/0279219 | A1 | 9/2020 | Desai et al. |
| 2020/0366315 | A1 * | 11/2020 | Sun ..................... H03M 7/6082 |
| 2021/0149905 | A1 | 5/2021 | Luo et al. |
| 2021/0191658 | A1 | 6/2021 | Mizushima et al. |
| 2021/0223982 | A1 * | 7/2021 | Prado .................. G06F 11/3409 |
| 2021/0233549 | A1 | 7/2021 | Kamamoto et al. |
| 2021/0271675 | A1 | 9/2021 | Kornmeier et al. |
| 2023/0057444 | A1 | 2/2023 | Djukic et al. |
| 2023/0176790 | A1 | 6/2023 | Dhuse et al. |
| 2023/0315691 | A1 | 10/2023 | Ritika et al. |
| 2024/0063814 | A1 | 2/2024 | Shalikashvili et al. |
| 2024/0104397 | A1 | 3/2024 | Sasaki |
| 2024/0259034 | A1 | 8/2024 | Gill et al. |
| 2025/0156074 | A1 | 5/2025 | Fay et al. |
| 2025/0244910 | A1 | 7/2025 | Rolo |
| 2025/0244911 | A1 | 7/2025 | Rolo |
| 2025/0245112 | A1 | 7/2025 | Rolo |
| 2025/0245117 | A1 | 7/2025 | Rolo |
| 2025/0245209 | A1 | 7/2025 | Rolo |

OTHER PUBLICATIONS

Ding R., et al., "Yading: Fast Clustering of Large-scale Time Series Data," Proceedings of the VLDB Endowment, 2015, vol. 8(5), pp. 473-484.
Eichinger F., et al., "A Time-series Compression Technique and Its Application to the Smart Grid," The VLDB Journal, 2015, vol. 24, pp. 193-218.
Gomes R.D., "Time Series Compression Algorithms and their Applications," Technical Report, DZone, Sep. 2022, pp. 1-8.
Hawkins III S.E., et al., "Algorithm for Compressing Time-series Data," Technical Report, Johns Hopkins University Applied Physics Laboratory for Goddard Space Flight Center, Jun. 2012, pp. 1-2.
Lockerman J., et al., "Time Series Compression Algorithms Explained," Technical Report, Timescale, Apr. 2020, pp. 1-18.
Pelkonen T., et al., "Gorilla: A Fast, Scalable, in-memory Time Series Database," Proceedings of the VLDB Endowment, 2015, vol. 8(12), pp. 1816-1827.
Peng X., et al., "Monitoring Data Reduction in Data Centers: A Correlation-Based Approach," Smart Cities, Green Technologies, and Intelligent Transport Systems: Smartgreens, Springer International Publishing, Cham, 2017, pp. 135-153.
Valialkin A., "VictoriaMetrics: Achieving Better Compression than Gorilla for Time Series Data," Technical Report, Victoriametrics, May 2019, pp. 1-11.
Van Beurden M., "Free Lossless Audio Codec," Technical Report, IETF, Jun. 2017, pp. 1-60.
Non-Final Office Action mailed on Mar. 14, 2025 for U.S. Appl. No. 18/424,368, filed Jan. 16, 2024, 50 pages.
Final Office Action mailed on Jan. 14, 2026 for U.S. Appl. No. 18/888,051, filed Sep. 17, 2024, 09 pages.
Final Office Action mailed on Nov. 19, 2025 for U.S. Appl. No. 18/424,368, filed Jan. 26, 2024, 53 pages.
Non-Final Office Action mailed on Dec. 12, 2025 for U.S. Appl. No. 18/888,043, filed Sep. 17, 2024, 24 pages.
Non-Final Office Action mailed on Feb. 27, 2026 for U.S. Appl. No. 18/424,368, filed Jan. 16, 2024, 55 pages.
Non-Final Office Action mailed on Jan. 16, 2026 for U.S. Appl. No. 18/888,025, filed Sep. 17, 2024, 13 pages.
Non-Final Office Action mailed on Oct. 2, 2025 for U.S. Appl. No. 18/646,559, filed Apr. 25, 2024, 21 pages.
Non-Final Office Action mailed on Oct. 2, 2025 for U.S. Appl. No. 18/888,051, filed Sep. 17, 2024, 13 pages.
Notice of Allowance mailed on Apr. 28, 2026 for U.S. Appl. No. 18/888,051, filed Sep. 17, 2024, 10 pages.

* cited by examiner

880

SYSTEMS AND METHODS FOR MANAGING STORAGE SYSTEM MONITORING DATA USING VALUE DETECTION

CROSS-REFERENCE TO RELATED APPLICATIONS

This application is a continuation-in-part of U.S. application Ser. No. 18/646,559, filed Apr. 25, 2024, now pending, which is a continuation-in-part of U.S. application Ser. No. 18/424,368, filed Jan. 26, 2024, now pending. The patent applications identified above are incorporated herein by reference in their entireties to provide continuity of disclosure.

TECHNICAL FIELD

Embodiments of the present disclosure generally relate to efficiently managing storage system monitoring data.

BACKGROUND

A storage system monitoring tool can acquire storage system monitoring data for a storage system. The storage system monitoring data can include measurements of various storage system metrics that describe the state of the storage system. Such storage system metrics can include central processing unit (CPU) utilization, storage utilization, database latency, disk latency, or other metrics.

Storage system monitoring data may accumulate rapidly. In an experiment described herein, a group of 57 nodes generated 600 MB in less than a day. The accumulation rate can depend on the number of storage system metrics monitored and the rate at which storage system metric measurements are acquired. To provide an informative, actionable description of the state of the storage system, storage system monitoring data may include measurements of tens to hundreds of storage system metrics. Furthermore, storage system monitoring data may be acquired at rates sufficient to support timely alerts and diagnose technical issues affecting the storage system. Depending on the metric, measurements may be acquired at rates between 0.01 and 10 Hz (or even greater rates).

Storage system monitoring data may be retained for a long time. Storage system monitoring data can be used to generate customer reports (e.g., a customer may request a monthly report on storage utilization) or satisfy regulatory or contractual requirements (e.g., satisfying a regulatory compliance policy where a banking customer must store bank account records for 15 years). Accordingly, some storage system monitoring data may be retained for days, months, years, or even decades.

Substantial storage system monitoring data can be associated with a storage system, given the potentially rapid accumulation rate and lengthy retention period of such data. Furthermore, the data may need to be accessible on demand (e.g., in response to customer, administrator, or regulator requests). Storing and transmitting such large amounts of storage system monitoring data can be resource-intensive, while the stored monitoring data may provide little value to storage system administrators or customers.

SUMMARY

According to some embodiments of the present disclosure, storage system monitoring data can be segmented and compressed. Compressed segments can be stored. In response to a data request, compressed segments can be retrieved and reconstructed.

The disclosed embodiments include a storage system monitoring method. The method can include an operation of obtaining storage system monitoring data. The method can further include an operation of generating compressed storage system monitoring data segments, at least by segmenting the storage system monitoring data into storage system monitoring data segments and compressing the storage system monitoring data segments into the compressed storage system monitoring data segments using at least two compression techniques. The method can further include an operation of, in response to a user query, identifying at least one compressed storage system monitoring data segment and performing at least one of: reconstructing and providing a portion of the storage system monitoring data using the at least one compressed storage system monitoring data segment; or providing the at least one compressed storage system monitoring data segment for reconstruction of the portion of the storage system monitoring data.

The disclosed embodiments include a system. The system can include at least one processor and at least one non-transitory computer-readable medium containing instructions. When executed by the at least one processor, the instructions can cause the system to perform operations for monitoring a storage system. The operations can include obtaining multiple channels of storage system monitoring data for the storage system. The operations can further include generating compressed channel segments, at least by segmenting the channels of the storage system monitoring data into channel segments and compressing the channel segments into the compressed channel segments using at least two compression techniques. The operations can include, in response to a user query, identifying at least one compressed channel segment and performing at least one of: reconstructing and providing a portion of one of the multiple channels of the storage system monitoring data using the at least one compressed channel segment; or providing the at least one compressed channel segment for reconstruction of the portion of the one of the multiple channels of the storage system monitoring data.

The disclosed embodiments include a storage system monitoring method. The method can include obtaining storage system monitoring data. The method can include generating a segment by applying the storage system monitoring data to a machine learning model trained to segment the storage system monitoring data. The method can include generating a compressed segment by applying a specified compression technique to the segment. The method can include receiving a user query from a user system, the user query specifying a portion of the storage system monitoring data. The method can include, in response to the user query, performing at least one of: reconstructing and providing the portion using the compressed segment; or providing the compressed segment for reconstruction of the portion.

The disclosed embodiments can include a monitoring system. The monitoring system can include at least one processor and at least one computer-readable medium containing instructions. When executed by the at least one processor, the instructions can cause the monitoring system to perform operations. The operations can include obtaining multiple channels of storage system monitoring data for a storage system. The operations can further include generating a channel segment by applying at least one of the multiple channels to at least one machine learning model trained to segment the storage system monitoring data. The operations can further include generating a compressed channel segment by applying a specified compression technique to the channel segment. The operations can further include, in response to a user query: identifying the compressed channel segment; and performing at least one of: reconstructing and providing a portion of one of the multiple channels of the storage system monitoring data using the compressed channel segment; or providing the compressed channel segment for reconstruction of the portion of the one of the multiple channels of the storage system monitoring data.

The disclosed embodiments can include a non-transitory, computer-readable medium containing instructions. When executed by at least one processor of a system, the instructions can cause the system to perform monitoring operations. The operations can include obtaining storage system monitoring data. The operations can further include generating a segment by applying the storage system monitoring data to a machine learning model trained to indicate segment boundaries between segments, the machine learning model including at least one of a neural network model; gradient boosting, decision tree, or random-forest model; or naive Bayes model. The operations can further include generating a compressed segment by applying at least one of a polynomial approximation, frequency domain transformation, or audio encoding technique to the segment. The operations can further include receiving a user query from a user system, the user query specifying a portion of the storage system monitoring data. The operations can further include, in response to the user query, performing at least one of: reconstructing and providing the portion using the compressed segment; or providing the compressed segment for reconstruction of the portion.

The disclosed embodiments include a storage system monitoring method. The method can include an operation of obtaining compression information for a compressed segment generated from a segment of storage system monitoring data. The method can include generating a predicted portion of storage system monitoring data using the compression information. The method can include obtaining an additional portion of storage system monitoring data, the additional portion contiguous to the segment of storage system monitoring data. The method can include determining the predicted portion matches the additional portion and combining the additional portion and the compressed segment. The method can include, in response to a user query, performing at least one of: reconstructing and providing the additional portion using the compressed segment; or providing the compressed segment for reconstruction of the additional portion.

The disclosed embodiments include a monitoring system. The monitoring system can include at least one processor and at least one computer readable medium containing instructions. When executed by the at least one processor, the instructions can cause the monitoring system to perform operations. The operations can include obtaining compression information for a compressed segment generated from a segment of storage system monitoring data. The operations can further include generating a predicted portion of storage system monitoring data using the compression information. The operations can further include obtaining an additional portion of storage system monitoring data, the additional portion contiguous to the segment of storage system monitoring data. The operations can further include determining the predicted portion matches the additional portion and combining the additional portion and the compressed segment. The operations can further include, in response to a user query, performing at least one of: reconstructing and providing the additional portion using the compressed segment; or providing the compressed segment for reconstruction of the additional portion.

The disclosed embodiments include a non-transitory, computer-readable medium containing instructions. When executed by at least one processor of a system, the instructions can cause the system to perform operations. The operations can further include obtaining compression information for a compressed segment generated from a segment of storage system monitoring data. The operations can further include generating a predicted portion of storage system monitoring data using the compression information. The operations can further include obtaining an additional portion of storage system monitoring data, the additional portion including a batch of observations and being contiguous to the segment of storage system monitoring data. The operations can further include determining the predicted portion matches the additional portion and combining the additional portion and the compressed segment. The operations can further include, in response to a user query, performing at least one of: reconstructing and providing the additional portion using the compressed segment; or providing the compressed segment for reconstruction of the additional portion.

The disclosed embodiments include a storage system monitoring method. The method can include obtaining a segment of storage system monitoring data. The method can include generating a compressed segment from the segment and a reconstructed segment from the compressed segment. The method can include identifying locations in the segment based on a comparison of the segment and the reconstructed segment. The method can include determining values for the identified locations. The method can include receiving a user query from a user system, the user query indicating a portion of the segment. The method can include, in response to the user query, performing at least one of: reconstructing and providing the portion using the identified locations, the determined values for the identified locations, and the compressed segment; or providing the identified locations, the determined values for the identified locations, and the compressed segment for reconstruction of the portion.

The disclosed embodiments include a monitoring system. The system can include at least one processor and at least one computer-readable medium containing instruction. When executed by the at least one processor, the instructions can cause the monitoring system to perform operations. The operations can include obtaining a segment of storage system monitoring data. The operations can further include generating a compressed segment from the segment and a reconstructed segment from the compressed segment. The operations can further include identifying locations in the segment based on a comparison of the segment and the reconstructed segment. The operations can further include determining values for the identified locations. The operations can further include receiving a user query from a user system, the user query indicating a portion of the segment. The operations can further include, in response to the user query, performing at least one of: reconstructing and providing the portion using the identified locations, the determined values for the identified locations, and the compressed segment; or providing the identified locations, the determined values for the identified locations, and the compressed segment for reconstruction of the portion.

The disclosed embodiments include a non-transitory, computer-readable medium containing instruction that, when executed by at least one processor of a system, cause the system to perform operations. The operations can include obtaining a segment of storage system monitoring data. The operations can further include generating a compressed segment from the segment using a lossy compression method and a reconstructed segment from the compressed segment. The operations can further include identifying locations in the segment based on a comparison of the segment and the reconstructed segment. The operations can further include determining values for the identified locations, the values depending on the values of the segment at the location. The operations can further include receiving a user query from a user system, the user query indicating a portion of the segment. The operations can further include, in response to the user query, performing at least one of: reconstructing and providing the portion using the identified locations, the determined values for the identified locations, and the compressed segment; or providing the identified locations, the determined values for the identified locations, and the compressed segment for reconstruction of the portion.

The disclosed embodiments include a storage system monitoring method. The method can include obtaining storage system monitoring data. The method can include generating a segment of the storage system monitoring data. The method can include determining time information, a compression technique, and a compression parameter set for the segment, wherein a reconstructed segment generated using the compression technique and the compression parameter set satisfies an error condition. The method can include storing the time information, the compression parameter set, and an indication of the compression technique. The method can include receiving a user query from a user system, the user query indicating a time interval. The method can include, in response to the user query, identifying the compression technique and the compression parameter set based on the time interval and the time information and performing at least one of: reconstructing and providing at least a portion of the segment using the time information, the compression technique, and the compression parameter set; or providing the compression parameter set and the indication of the compression technique for reconstruction of the portion.

The disclosed embodiments include a monitoring system. The system can include at least one processor and at least one non-transitory, computer-readable medium containing instructions. When executed by the at least one processor of the monitoring system, the instructions can cause the monitoring system to perform operations. The operations can include obtaining storage system monitoring data including multiple channels. The operations can further include generating a segment of the storage system monitoring data. The operations can further include determining time information, a compression technique, a compression parameter set for the segment, and a set of reconstruction values for the segment, wherein a reconstructed segment generated using the compression technique, the compression parameter set, and the set of reconstruction values satisfies an error condition based on a difference between values of the segment and values of the reconstructed segment. The operations can further include storing the time information, the compression parameter set, the set of reconstruction values, and an indication of the compression technique. The operations can further include receiving a user query from a user system, the user query indicating a time interval. The operations can further include, in response to the user query, identifying the compression technique and the compression parameter set based on the time interval and the time information and performing at least one of: reconstructing and providing at least a portion of the segment using the time information, the compression technique, the compression parameter set, and the set of reconstruction values; or providing the compression parameter set, the set of reconstruction values, and the indication of the compression technique for reconstruction of the portion.

The disclosed embodiments include a non-transitory, computer-readable medium containing instructions. When executed by at least one processor of a monitoring system, the instructions can cause the monitoring system to perform operations. The operations can include obtaining storage system monitoring data including multiple channels. The operations can further include generating a segment of the storage system monitoring data. The operations can further include determining time information that specifies a mapping from segment index to time, a compression technique, a compression parameter set for the segment, and a set of reconstruction values for the segment, wherein a reconstructed segment generated using the compression technique, the compression parameter set, and the set of reconstruction values satisfies an error condition based on a difference between values of the segment and values of the reconstructed segment. The operations can further include storing the time information, the compression parameter set, the set of reconstruction values, and an indication of the compression technique. The operations can further include receiving a user query from a user system, the user query indicating a time interval. The operations can further include, in response to the user query, identifying the compression technique and the compression parameter set based on the time interval and the time information and performing at least one of: reconstructing and providing at least a portion of the segment using the time information, the compression technique, the compression parameter set, and the set of reconstruction values; or providing the compression parameter set, the set of reconstruction values, and the indication of the compression technique for reconstruction of the portion.

The disclosed embodiments further include systems, methods, and non-transitory computer-readable media corresponding to the above-recited embodiments.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
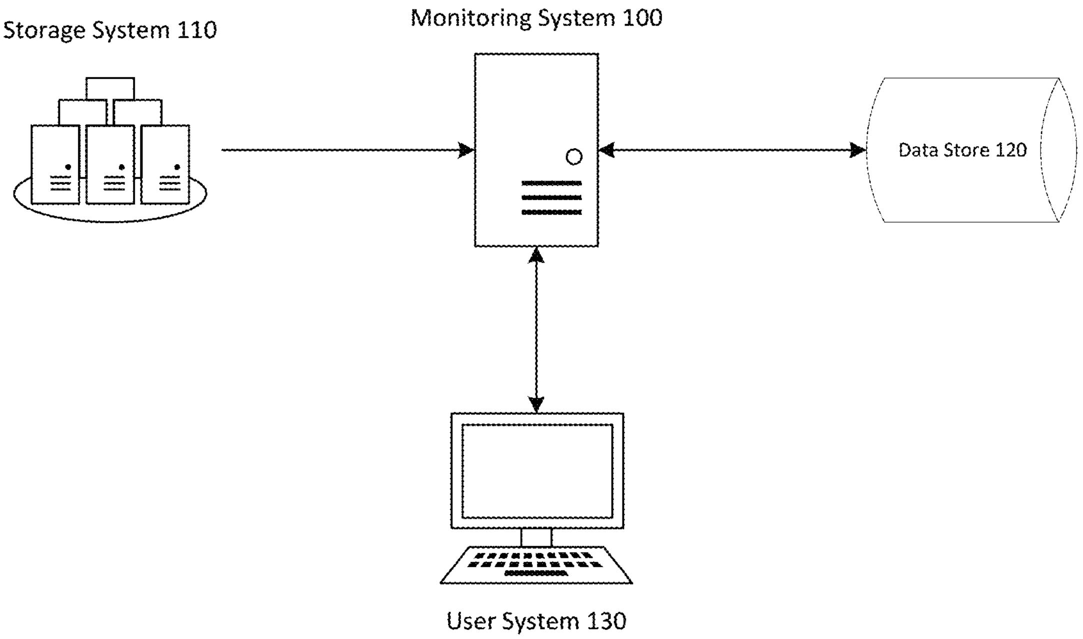
FIG. 1 depicts an exemplary monitoring system, consistent with disclosed embodiments.

Storage system monitoring data can include measurements of storage system metrics that individually or collectively characterize the performance of a storage system. This storage system monitoring data can accumulate rapidly and may need to be retained for a substantial time, due to customer, regulatory, or contractual requirements. Furthermore, such data may need to be accessible on demand (e.g., in response to customer, administrator, or regulator requests). Storing and transmitting such large amounts of storage system monitoring data can be resource-intensive, while the stored data may provide little value to storage system administrators or customers.

Storage system monitoring data can include multiple channels, each corresponding to a different storage system metric. Measurements in a channel may be expressly or implicitly associated with corresponding times. Measurements in a channel may form a time series. As may be appreciated, the values of such time series data may vary irregularly, lacking periodicity or harmonic components. For example, a storage system metric may irregularly switch between measurements reflecting one operational state of the storage system (e.g., nominal operation) and another operational state of the storage system (e.g., overloaded or throttled operation). Likewise, measured values of a storage system metric may suddenly change based on a response of the storage system to user or administer requests. As may also be appreciated, the relationship between different channels of system monitoring data can vary irregularly, with the values some channels being similar or correlated over some time intervals (or some operational states of the storage system) and uncorrelated over other time intervals (or over other operational states of the storage system). Such irregular variations in the storage system metric data can hinder attempts to compactly represent such data.

The disclosed embodiments include systems and methods for monitoring storage systems that address the above technical problems. Consistent with disclosed embodiments, a monitoring system can obtain storage system monitoring data, which can include multiple channels of measurements for different storage system metrics. The monitoring system can segment this storage system monitoring data. The monitoring system can then compress the segmented storage system monitoring data. The monitoring system (or another system or systems) can store the compressed, segmented storage system monitoring data in association with time information. The time information can describe the beginning and ending time of the segment.

In a response to a request, the monitoring system (or another system or systems) can identify appropriate stored compressed, segmented storage system monitoring data based on associated time information. The identified compressed, segmented storage system monitoring data can be decompressed and combined with other storage system monitoring data to generate a response to the request. In some instances, the other storage system monitoring data can also be decompressed version of compressed, segmented storage system monitoring data.

In some embodiments, a monitoring system consistent with disclosed embodiments can be configured to use multiple segmentation techniques. The segmentation techniques can include generating segments based on metadata concerning the storage system monitoring data (e.g., number of samples, data size, time information, or the like associated with a potential segment). The segmentation techniques can include generating segments based on the values of the storage system monitoring data. Such value-based segmentation techniques can identify segments using frequency or wavelet domain analysis, statistical analysis, machine learning models, or the like.

In some embodiments, a monitoring system consistent with disclosed embodiments can be configured to use multiple compression techniques. The compression techniques can be lossless compression techniques, lossy compression techniques, or any combination thereof. As may be appreciated, different segments of the same metric data may be suited for compression using different techniques. For example, a hypothetical system metric may intersperse constant or linear intervals with periodic intervals. Both the constant or linear intervals and the periodic intervals may be of irregular duration. The constant or linear intervals may be compressed using polynomial approximation (e.g., zeroth or first order polynomial approximation), while the periodic intervals may be compressed using frequency domain techniques (e.g., wavelets or Fourier transforms). In some embodiments, a frequency domain technique can compress a segment at least in part by selecting only a subset of frequencies for storage (e.g., frequencies within a specified range, frequencies satisfying an absolute or relative power or amplitude condition, or the like).

In some embodiments, a monitoring system can be configured to select an appropriate compression technique based on characteristics of the segment. In some embodiments, the monitoring system can be configured to generate multiple compressed segments or compressed versions of a portion of the segment. The monitoring system can rank the compressed segments according to a performance measure (e.g., compression ratio, fidelity measure, or the like) and select the highest-ranked compressed segment. The selected compressed segment can then be stored for subsequent reconstruction. Reconstructing the segment can include recreating the segment or creating a lossy, distorted, or otherwise imperfect version of the segment.

In some embodiments, a monitoring system consistent with disclosed embodiments can be configured to independently select segmentation and compression techniques. For example, the monitoring system can be configured to select a compression technique based on a segment, and not a segmentation technique used to generate the segment. In some embodiments, a monitoring system consistent with disclosed embodiments can be configured to jointly select segmentation and compression techniques. For example, the monitoring system can be configured to select a segmentation technique-compression technique pair. The monitoring system may be configured to select among multiple such pairs based on a performance measure.

By segmenting and compressing storage system monitoring data based on the characteristics of the individual segments, using different segmentation or compression techniques as appropriate, a monitoring system consistent with disclosed embodiments can reduce the size of stored monitoring data associated with a storage system. Reducing the size of the stored monitoring data can reduce the burden of preserving such data, while ensure that the data remains accessible for responding to customer, administrator, or regulator requests. In this manner, the disclosed embodiments provide a technical improvement over conventional methods of storing monitoring data.

While described herein with regard to storage systems for convenience, the disclosed embodiments can be used with other systems that generate large amounts of irregular metric data. The disclosed embodiments can improve the performance of such systems by permitting retention of data for additional metrics (e.g., thereby aiding in identification and diagnosis of erroneous or unintended system operation), retention of storage system monitoring data for longer durations, retention of storage system monitoring data using less storage space, or combinations of the foregoing.

FIG. 1 depicts an exemplary monitoring system 100, consistent with disclosed embodiments. Monitoring system 100 can be implemented using one or more computing devices (e.g., laptop, desktop, workstation, computing cluster, network appliance, cloud computing platform, or the like). Monitoring system 100 can be configured to obtain storage system monitoring data, process storage system monitoring data, store or provide for storage the processed storage system monitoring data, respond to requests for storage system monitoring data, or the like. As described herein, processing the obtained storage system monitoring data can include, at least in part, segmenting and compressing such data. Responding to requests for storage system monitoring data can include identifying and retrieving compressed storage system monitoring data segments from storage and reconstructing the requested storage system monitoring data using the compressed storage system monitoring data segments.

As may be appreciated, different operations can be performed by different ones of the one or more computing devices implementing monitoring system 100. For example, a first computing device can obtain, segment, and compress the storage system monitoring data, while a second computing device can receive a data request, identify and retrieve compressed storage system monitoring data segments, and reconstruct and provide the requested storage system monitoring data.

As depicted in FIG. 1, monitoring system 100 can be in communication with a storage system 110. Storage system 110 can be implemented using one or more computing devices configured to store and provide data in response to requests from other systems. For example, storage system 110 can include a storage device including a storage controller and one or more storage components, such as a disk shelf including a number of disk drives or a storage array. As an additional example, storage system 110 can include a cluster of servers configured to implement a data store (e.g., using CASSANDRA or another suitable database management system).

In some embodiments, one or more services running on storage system 110 can be configured to generate storage system monitoring data. The disclosed embodiments are not limited to any particular service or services for generating storage system monitoring data. Furthermore, the disclosed embodiments are not limited to any particular mechanism, format, or protocol for transmitting storage system monitoring data from storage system 110 to monitoring system 100. Consistent with disclosed embodiments, storage system 110 can push the storage system monitoring data to monitoring system 100, or monitoring system 100 can pull the storage system monitoring data from storage system 110.

In some embodiments, as depicted in FIG. 1, monitoring system 100 can be in communication with a data store 120. Similar to storage system 110, data store 120 can be implemented using one or more computing devices configured to store and provide data in response to requests from other systems. Furthermore, the disclosed embodiments are not limited to any particular mechanism, format, or protocol for transmitting storage system monitoring data between monitoring system 100 and data store 120. While depicted as separate systems, storage system 110 and data store 120 can also be implemented using the same computing device(s). The disclosed embodiments are not limited to any particular data store architecture or schema. As described herein, the compressed storage system monitoring data segments can be stored in association with time information. Data store 120 can be configured to store compressed segments in an object store (e.g., AMAZON S3 AZURE BLOB, GOOGLE Storage, or the like), data warehouse (e.g., AMAZON REDSHIFT, GOOGLE BIGQUERY, or the like), or any other suitable storage architecture.

Consistent with disclosed embodiments, compressed segments stored in data store 120 can be associated with time information. The time information associated with a compressed segment can indicate the beginning and/or ending time of the segment. In some embodiments, the stored compressed segments can be indexed by beginning or ending time. For example, in response to a request received from a system (e.g., monitoring system 100, or the like), the request specifying a time or range of times, data store 120 can be configured to provide segments that overlap, in whole or in part, with the specified time or range of times. For example, when the data request specifies 2024-04-06T20:16:35Z as a start time and 2024-04-06T20:47:37Z as a stop time, the compressed segments returned could include a compressed segment associated with the start time 2024-04-06T20:15:35Z and the duration 100 s (e.g., starting before and overlapping the requested time), a compressed segment associated with the start time 2024-04-06T20:20:35Z and stop time 2024-04-06T20:21:35Z (e.g., contained within the requested time), or a compressed segment associated with the start time 2024-04-06T20:40:37Z and the stop time 2024-04-06T20:50:00Z (e.g., ending after and overlapping the requested time). The disclosed embodiments are not limited to any particular index architecture or manner of associating the time information with the compressed segments.

As depicted in FIG. 1, monitoring system 100 can be in communication with a user system 130. User system 130 can be implemented using one or more computing devices. User system 130 can provide a user interface that enables users to provide requests for system monitoring data to monitoring system 100. For example, user system 130 can provide a display (e.g., a graphical user interface or the like) and input devices (e.g., human interface device(s), or the like) for enabling a user to provide such requests. Furthermore, the disclosed embodiments are not limited to any particular mechanism, format, or protocol for transmitting storage system monitoring data between monitoring system 100 and user system 130.

In some embodiments, monitoring system 100 can be configured to store performance information in data store 120 and/or provide the performance information to user system 130. The performance information can concern the segmentation and/or compression of storage system monitoring data obtained from storage system 110. Performance information concerning segmentation can include statistical information concerning the number of observations in the determined segments (e.g., average, median, max, min, or the like), the choice of segmentation technique (e.g., the number or distribution of metadata based or data-value based segmentation, or the like) or the like. Performance information concerning compression can include statistical information concerning the achieved compression ratio (e.g., average, median, max, min, or the like), the choice of compression technique (e.g., the number or distribution of compression techniques used, or the like). When the storage system monitoring data includes multiple channels of metric data, the performance information can be specific to a particular channel, or can concern multiple channels.

In some embodiments, monitoring system 100 can store or provide the performance information at regular intervals or according to a schedule. For example, monitoring system 100 can store or provide the performance information at 1 Hz to 0.01 Hz sampling rates.

In some embodiments, monitoring system 100 can store or provide the performance information in response to detection of an event. In some embodiments, current performance information for a channel can be compared to prior performance information for the channel. For example, monitoring system 100 can be configured to determine reporting thresholds for the performance information. Such reporting thresholds can depend on historical data for the storage system and/or user supplied data. For example, a high reporting threshold for compression ratio can be the mean compression ratio plus a multiple of the standard deviations of the compression ratio. A low reporting threshold for the compression ratio can be the mean compression ratio minus a multiple of the standard deviations of the compression ratio. In this example, monitoring system 100 can determine the standard deviation of the compression ratio, while the user can supply the value of the multiple (e.g., 1, 2, 2.5, 3, or another suitable value).

In some embodiments, current performance information for a first channel can be compared to current performance information for other seconds channels. The first channel and the second channels can include the same metric for different components of storage system 110. In some embodiments, these different components may be assigned the same or similar tasks. Monitoring system 100 can be configured to determine reporting thresholds for the performance information. Such reporting thresholds can depend on current data for the first channel and second channels and/or user supplied data.

In some embodiments, monitoring system 100 can maintain a buffer of performance information. In response to detection of the event, monitoring system 100 can store or provide the contents of the buffer, and begin providing performance information as such information is generated. In this manner, a user can observe both the performance data prior to the detection of the event and the performance data after the detection of the event.

In some embodiments, monitoring system 100 can be configured to provide an indication to user system 130 that the event has been detected. Such an indication can be provided in addition to, or as an alternative to, storing and/or providing the performance data. For example, a "change detected" or "warning" message can be provided to user system 130 in response to detection of an event. The message could specify the channel or metric associated with the detected event. For example, the message could specify that the compression ratio for disk usage has changed by more than two standard deviations for a particular one of the nodes the storage system.

Figure 2:
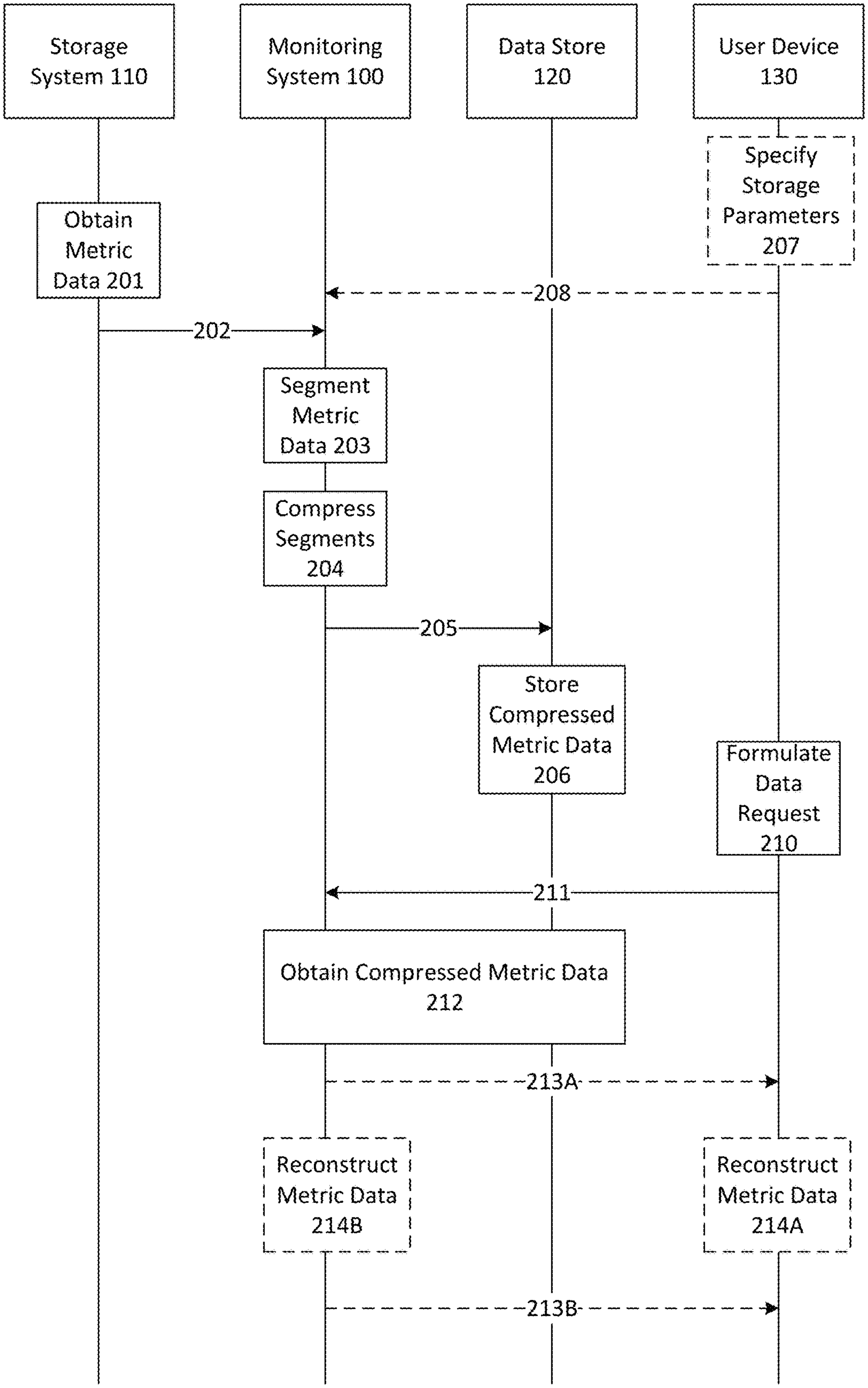
FIG. 2 depicts an exemplary storage process and an exemplary reconstruction process adapted for use with the system of FIG. 1, consistent with disclosed embodiments.

FIG. 2 depicts an exemplary storage process and an exemplary reconstruction process adapted for use with the system of FIG. 1, consistent with disclosed embodiments. The storage process can include steps 201 to 206 (and optionally 207 and 208) of obtaining the storage system monitoring data, processing such data, and storing the processed data in data store 120. The reconstruction process can include steps 210 to 214A (or 214B) of requesting and retrieving storage system monitoring data. As may be appreciated, monitoring system 100 can be configured to support performance of multiple concurrent storage processes (e.g., using storage system monitoring data obtained from multiple storage systems). Similarly, monitoring system 100 can be configured to support performance of multiple concurrent reconstruction processes (e.g., involving requests from multiple user systems, or multiple requests from the same user system). In some embodiments, monitoring system 100 can be configured to support performance of multiple concurrent storage and reconstruction processes (e.g., responding to queries from a user system while continuing to store data obtained from a storage system).

In step 201 of the storage process, storage system 110 can obtain storage system monitoring data, consistent with disclosed embodiments. The disclosed embodiments are not limited to any particular monitoring tool or software for obtaining the storage system monitoring data. In some embodiments, tools such as MANAGE ENGINE APPLICATIONS MANAGER, DROPWIZARD METRICS, PRO- METHEUS, DATADOG, NETAPP FILE SYSTEM ANALYTIC, OR THE LIKE can acquire the storage system monitoring data. The storage system monitoring data can include measurements of storage system metrics. As may be appreciated, the disclosed embodiments are not limited to a set or enumeration of storage system metrics. In some embodiments, the storage system metrics can include table metrics, message metrics, streaming metrics, compaction metrics, commit log metrics, storage metrics, hint metrics, index metrics, buffer pool metrics, client management metrics, batch metrics, or virtual machine metrics. In some embodiments, the storage system monitoring data can include channels. Different channels can include measurements of different metrics (or different combinations of metric and device or system). In some embodiments, the storage system monitoring metrics can include CPU I/O wait time, CPU Guest Usage, CPU usage, System Status (e.g., a Boolean-valued indication of whether a storage system or a component thereof is working), number of connected clients, network usage, memory usage, disk usage, read latency, write latency, operating system load, or the like.

In step 202 of the storage process, storage system monitoring data can be transmitted to monitoring system 100, consistent with disclosed embodiments. In some embodiments, storage system 110 can push the storage system monitoring data to monitoring system 100. Storage system 110 can push such data to monitoring system 100 periodically or according to a schedule (e.g., once every 10 seconds, or another suitable interval), in response to an event (e.g., an accumulated amount or size of storage system monitoring data, or the like), or upon satisfaction of another suitable criterion. In some embodiments, monitoring system 100 can retrieve the storage system monitoring data from storage system 110. Monitoring system 100 can retrieve storage system monitoring data periodically or according to a schedule (e.g., once every 10 seconds, or another suitable interval), in response to an event (e.g., an accumulated amount or size of storage system monitoring data, or the like), or upon satisfaction of another suitable criterion.

In step 203 of the storage process, monitoring system 100 can be configured to segment obtained storage system monitoring data, consistent with disclosed embodiments. Monitoring system 100 can be configured to perform segmentation as a continuous process or a batch process. In some embodiments, monitoring system 100 can generate multiple overlapping segments (or sets of segments) from the same storage system monitoring data. Monitoring system 100 can use these segments to generate multiple compressed segments (or sets of compressed segments) and then select one of the compressed segments (or sets of compressed segments) for storage.

In some embodiments, when segmentation is performed as a continuous process, monitoring system 100 can accumulate storage system monitoring data (e.g., in a file, a memory, a buffer, a storage location, or in another suitable manner) as such data is obtained. Monitoring system 100 can identify a segment boundary in the accumulated storage system monitoring data using segmentation criteria. The segment prior to the segment boundary can then be trimmed from the accumulated data.

In some embodiments, when segmentation is performed as a batch process, monitoring system 100 can obtain a batch of storage system monitoring data. In some embodiments, the batch can be received from storage system 110. In some embodiments, the batch can be accumulated by monitoring system 100 (e.g., in a file, a memory, a buffer, a storage location, or in another suitable manner). Once monitoring system 100 has obtained the batch, monitoring system 100 can determine segment boundaries that partition the batch into segments according to segmentation criteria.

In some embodiments, monitoring system 100 can identify boundaries between segments using multiple different segmentation techniques. Monitoring system 100 can select segmentation technique(s) for processing storage system monitoring data according to segmentation parameters, as described herein. Segmentation techniques can include techniques based on potential segment metadata (e.g., metadata techniques) and techniques based on the values of the data contained in a potential segment (e.g., data value techniques). Metadata techniques can include techniques based on information about the segment (e.g., the size of the segment, number of data points in the segment, the time values for the segment, or another suitable criterion). Data value techniques can include techniques that depend on the values included in the segment. In some embodiments, data value techniques can include a data processing operation and a detection operation. The data processing operation can include steps of preprocessing or augmenting the values included in the storage system monitoring data. The detection operation can include detecting segment boundaries in the storage system monitoring data.

Consistent with disclosed embodiments, preprocessing can include, but is not limited to, filtering, normalizing, coding or categorizing, transforming datatype, reducing or increasing precision, decimating or interpolating data points, performing a singular value decomposition or similar transformation, or any similar transformation of the values contained in the segment, or any combination of the foregoing. Consistent with disclosed embodiments, augmenting storage system monitoring data can include generating additional data based on the data values of the segment. In some embodiments, preprocessing can be combined with data augmentation.

Consistent with disclosed embodiments, the detection operation can include identifying segment boundaries in the storage system monitoring data suitable for trimming or partitioning segments. Monitoring system 100 can then generate segments using the identified segment boundaries. Monitoring system 100 can perform such identification on the original, preprocessed and/or augmented storage system monitoring data using thresholds, machine-learning models, or another suitable detection method.

As described herein, the storage system monitoring data monitoring data can include multiple channels, each corresponding to a different metric (or different combination of metric and device or system). In some embodiments, monitoring system 100 can be configured to segment channels independently. For example, monitoring system 100 can identify segment boundaries in a channel based only on data values in that channel. In some embodiments, monitoring system 100 can be configured to segment channels non-independently. For example, monitoring system 100 can identify a segment boundary for all the channels in a set of channels based on data values of one or more channels in the set of channels.

In some embodiments, monitoring system 100 can identify a segment boundary based on the original, preprocessed and/or augmented data crossing a threshold. In some embodiments, when monitoring system 100 is configured to generate segments including multiple channels, a threshold can involve one or more of the multiple channels. Consistent with disclosed embodiments, the machine learning model can be configured to accept as input original, preprocessed and/or augmented storage system monitoring data. The machine learning model can be configured to provide as output zero-or-more segment boundary indications. When monitoring system 100 is configured to generate segments including multiple channels, the input can be drawn from one or more of the channels and the output more segment boundary indications can apply to one or more of the channels.

Consistent with disclosed embodiments, monitoring system 100 can generate multiple overlapping candidate segments of the same storage system monitoring data. Monitoring system 100 can then compress these candidate segments using compression technique(s). Monitoring system 100 can then select the candidate segment that yielded the best compressed segment, according to a performance measure. When partitioning a batch of storage system monitoring data, monitoring system 100 can select among sets of segments corresponding to differing partitions of the candidate data. When continuously partitioning storage system monitoring data, monitoring system 100 can trim the received storage system monitoring data based on the selected candidate segment.

In step 204 of the storage process, monitoring system 100 can be configured to compress the segmented storage system monitoring data generated in step 203, consistent with disclosed embodiments. In some embodiments, monitoring system 100 can be configured to generate compressed segments that include storage system monitoring data, preprocessed storage system monitoring data, augmented storage system monitoring data, or some combination of the forgoing. For example, rather than compressing read latency times, monitoring system 100 can compress $10^{th}$ and $90^{th}$ percentiles of the read latency times. As an additional example, monitoring system 100 can compress read latency times (sampled at 1 Hz) together with an additional channel of decimated read latency times (down-sampled to 1/300 Hz).

Monitoring system 100 can be configured to compress the segmented storage system monitoring data generated in step 203 using one of a set of suitable techniques. Such techniques can support lossy or lossless compression. In some embodiments, the compression technique may involve determining parameters for a formula that takes index number as an argument (e.g., $\hat{X}(n|a)$, where n is the index and a is a set of parameters for the formula. Such compression techniques can include polynomial approximation, linear predictive coding, or similar techniques. In some embodiments, the compression information for the segment can then include the parameters a and an indication of the formula. Monitoring system 100 can then store the compression information in place of the original segment. Reconstruction can include generating, for a sequence of indices $n_i$ to $n_j$, the reconstructed values $\hat{X}(n_i|a)$ to $\hat{X}(n_j|a)$. A mapping from index to time can then be used to associate the indices of the reconstructed sequence with corresponding times.

In some embodiments, the compression technique may involve determining parameters for a parameterized compression formula $C_a$ having a parameterized inverse formula $$C_b^{-1}$$

(which may be an approximate or lossy inverse). In some embodiments, the compression information for the segment can then include the compression parameters a and/or the corresponding decompression parameters b and an indication of the compression formula and/or inverse formula. Monitoring system 100 can apply the original segment to the parameterized compression formula $C_a$ to generate output values. Monitoring system 100 can then store the compression information and the output values. Reconstruction can include applying the output values to parameterized inverse formula $$C_b^{-1}$$

to generate a reconstructed sequence. A mapping from index to time can then be used to associate the indices of the reconstructed sequence with corresponding times.

In some embodiments, compression can also include identifying anomalous reconstructed values and the indices of these anomalous reconstructed values. The compressed segment can then store values for use in reconstructing these indices. For example, the compressed segment can store the original values corresponding to these indices. Monitoring system 100 can use these original values in place of the anomalous reconstructed values for these indices.

In some embodiments, suitable compression techniques can include dictionary-based techniques (e.g., TRISTAN, CORAD, A-LZSS, D-LZSS or the like), functional approximation techniques (e.g., polynomial approximation, such as Piecewise Polynomial Approximation, Chebyshev Polynomial Transform, inverse distance weighting, Catmull-Rom splines, cubic Hermite spline; frequency domain transformation, such as wavelet transforms; Fourier transforms; or the like), autoencoders (e.g., recurrent neural network autoencoding, or the like), sequential algorithms (Delta encoding and related methods, Simple-8b, Run-length encoding, XOR-based compression, Fibonacci coding, Huffman encoding, Sprintz, run-length binary encoding, RAKE, or the like), major extrema extractor encoding, segment merging, continuous hidden Markov chain encoding, audio encoding (e.g., linear predictive coding, Free Lossless Audio Codec encoding, MP3 encoding, Advanced Audio Coding, or the like), GORILLA, or other suitable methods.

Consistent with disclosed embodiments, monitoring system 100 can be configured to determine a compression technique for a segment. Monitoring system 100 can determine and/or apply compression techniques for a segment according to compression parameters, as described herein. In some embodiments, monitoring system 100 can be configured to determine the compression technique based on characteristics of the segment and/or compression parameters. Accordingly, monitoring system 100 can be configured to compress storage system monitoring data segments having different characteristics using different compression techniques.

Characteristics of the segment can depend on the values in the segment, or functions of such values. Characteristics of the segment (or a channel in the segment) can also depend on what the data values represent, or the types of signals that the monitoring is intended to detect (e.g., are values of the data expected to be relatively constant, with sudden, short duration spikes indicating behavior of interest).

In some embodiments, monitoring system 100 can be configured to generate multiple compressed segments or segment portions (e.g., by applying multiple compression techniques to the same segment or portion thereof, applying the same compression techniques to multiple candidate segments, or a combination of the foregoing). Monitoring system 100 can rank the compressed segments or segment portions according to a performance measure (e.g., compression ratio, fidelity measure, or the like). When monitoring system 100 is configured to generate multiple compressed segments, monitoring system 100 can select and store the highest-ranked compressed segment for subsequent reconstruction. When monitoring system 100 is configured to generate multiple compressed versions of a portion of a segment, monitoring system 100 can select the highest-ranked compression technique, apply the selected technique to the entire segment, and store the resulting compressed segment for subsequent reconstruction.

In step 205 of the storage process, monitoring system 100 can transmit compressed segments of storage system monitoring data to data store 120, consistent with disclosed embodiments. In some embodiments, monitoring system 100 can write the compressed segments to data store 120. Monitoring system 100 can write the compressed segments to data store 120 periodically or according to a schedule (e.g., once every 10 seconds, or another suitable interval), in response to an event (e.g., an accumulated number or size of compressed segments, or the like), or upon satisfaction of another suitable criterion. In some embodiments, data store 120 can retrieve the compressed segments from monitoring system 100. Data store 120 can retrieve the compressed segments periodically or according to a schedule (e.g., once every 10 seconds, or another suitable interval), in response to an event (e.g., an accumulated number or size of compressed segments, or the like), or upon satisfaction of another suitable criterion.

In some embodiments, monitoring system 100 can be configured to transmit time information associated with a compressed segment together with the compressed segment. As described herein, the time information associated with a compressed segment can indicate the beginning and/or ending time of the segment. Additionally or alternatively, monitoring system 100 can store such time information.

In some embodiments, monitoring system 100 can be configured to transmit compression information associated with a compressed segment together with the compressed segment. The compression information can indicate the compression technique used to generate the compressed segment. In some embodiments, the compression information can include data and/or instructions sufficient to reconstruct the segment from the compressed segment. For example, compression information included in a compressed segment header can specify the compression technique used to generate the compressed segment, and any compression technique parameters required to reconstruct the segment. As an additional example, compression information included in a compressed segment header can specify error correction points. Additionally or alternatively, monitoring system 100 can store such compression information.

In some instances (e.g., depending on the compression technique), compression information can be included in the compressed segment (e.g., as a file extension, such as .mpg or .acc, or a header included in a data structure, such as a file, containing the compressed segment). In some embodiments, compression information can be stored separately from the compressed segment. For example, as described herein, monitoring system 100 or data store 120 can maintain a data structure that associates time information with compressed segments. In some embodiments, such a data structure can also store compression information. Alternatively, such a data structure can also store references to compression information (e.g., compression information stored in another data structure maintained by monitoring system 100 or data store 120).

In step 206 of the storage process, the compressed segments can be stored in data store 120. As described herein, the disclosed embodiments are not limited to any particular data store architecture or schema. Data store 120 can be configured to store compressed segments in an object store (e.g., AMAZON S3 AZURE BLOB, GOOGLE Storage, or the like), data warehouse (e.g., AMAZON REDSHIFT, GOOGLE BIGQUERY, or the like), or any other suitable storage architecture. In some embodiments, time information associated with the compressed segment can be stored in association with the segment, or incorporated into a searchable index or data structure usable to locate the compressed segment. For example, the time information can be used as (or used to generate) a key, which can be stored together with a reference to the associated compressed segment (e.g., in a key-value database). A request specifying a time value or range of time values can retrieve matching key(s) and associated references to compressed segments.

In some embodiments, storage parameters can be specified in optional step 207. The storage parameters can include segmentation parameters and/or compression parameters. In various embodiments, the storage parameters can be specified by an application running on user system 130, by a user interacting with such an application, or any combination thereof. For example, some storage parameters can be specified automatically by the application and others by the user.

If optional step 207 is performed, then the storage parameters formulated in step 207 can be transmitted to monitoring system 100 in step 208. The disclosed embodiments are not limited any particular timing or manner of transmitting such parameters. In some embodiments, the storage parameters can be transmitted when monitoring system 100 is initially configured, and then repeatedly updated thereafter. For example, at some point after monitoring system 100 is initially configured, a user can interact with user system 130 to provide new or updated storage parameters to monitoring system 100.

In step 210 of the reconstruction process, a data request can be formulated, consistent with disclosed embodiments. The data request can specify a period of time. In some embodiments, the data request can specify a channel or group of channels included in the storage system monitoring data. In some embodiments, the data request can specify storage system 110. In various embodiments, the data request can be formulated by an application running on user system 130, by a user interacting with such an application, or any combination thereof. For example, a user can select an icon corresponding to storage system 110 in a graphical user interface of the application. In response, the application can generate a request for a portion of storage system monitoring data. The portion can include a default or predetermined selection of channels for a default or predetermined period of time. As another example, the user can directly specify the beginning and ending times of a selected group of channels in the storage system monitoring data.

In step 211 of the reconstruction process, the data request can be transmitted to monitoring system 100, consistent with disclosed embodiments. The disclosed embodiments are not limited to any particular format or manner of transmitting the data request. In some embodiments, the data request can include indications of the requested time period (e.g., a start time or a finish time and a duration or a number of samples, both a start time and a finish time, or the like). In some embodiments, the data request can include indications of the requested storage system monitoring data (e.g., a set or array of values, such as Boolean, integers, or strings, indicating channels of the requested storage system monitoring data). In some embodiments, the data request can include indications of storage system 110 (e.g., a system or device identifier, a storage location containing the data, or the like).

While FIG. 2 depicts the data request being sent to monitoring system 100, the disclosed embodiments are not so limited. In some embodiments, the request can be sent to another system, which can interact with data store 120 to retrieve and reconstruct the requested data (or provide the compressed segments and sufficient information reconstruct the requested data).

In step 212 of the reconstruction process, monitoring system 100 can interact with data store 120 to obtain compressed segments, consistent with disclosed embodiments. As described herein, monitoring system 100 or data store 120 can maintain a data structure associating compressed segments with time information. Monitoring system 100 can use the data structure to obtain references to the appropriate compressed segments. Monitoring system 100 can then retrieve the appropriate compressed segments from data store 120.

In some embodiments, when the storage system data includes multiple channels and the request is limited to a subset of the multiple channels, monitoring system 100 can interact with data store 120 to obtain the compressed segments necessary to reconstruct the requested subset of the channels. When using compression techniques that combine information across channels, a compressed segment may be retrieved because it contains a requested channel, or because it contains a channel necessary to reconstruct a requested channel.

In some embodiments, in addition to the compressed segments, the monitoring system can obtain compression information. The compression information can include data and/or information sufficient to reconstruct the segment from the compressed segment. For example, the compression information can indicate the compression technique used on the segment (and any parameters needed to reconstruct the segment, given the indicated compression technique). In some embodiments, monitoring system 100 can receive or retrieve the compression information from data store 120. In some embodiments, monitoring system 100 can store the compression information.

In some embodiments, as depicted in optional steps 213A and 214A, monitoring system 100 can provide the compression information and compressed segments to user system 130. The disclosed embodiments are not limited to any particular format or manner of transmitting the compression information and compressed segments. User system 130 can then reconstruct the requested storage system monitoring data. Such embodiments can reduce the amount of data transmitted from monitoring system 100 to user system 130. Accordingly, such embodiments can be adapted to scenarios in which network capacity or congestion, or the expense or delay involved in transmitting large quantities of data, are a concern.

In some embodiments, as depicted in optional steps 214B and 213B, monitoring system 100 can reconstruct the requested storage system monitoring data and then transmit the reconstructed storage system monitoring data to user system 130. The disclosed embodiments are not limited to any particular format or manner of transmitting the reconstructed storage system monitoring data. Such embodiments can shift the computational burden of reconstructing the requested storage system monitoring data from user system 130 to monitoring system 100. Accordingly, such embodiments can be adapted to scenarios in which user system 130 lacks the computational resources to reconstruct the data, or to reconstruct the data sufficiently quickly to provide a suitable user experience.

Consistent with disclosed embodiments, reconstruction of the storage system monitoring data can include selecting a compressed segment, identifying the per-segment compression technique used to generate the compressed segment, and reconstructing the segment from the compressed segment. Consistent with disclosed embodiments, reconstruction of the compressed segment can depend on the compression technique used to generate the compressed segment. As may be appreciated, when the compression technique is lossy, the reconstruction can be approximate.

In some embodiments, as described herein, monitoring system 100 can be configured to generate multiple compressed segments corresponding to a portion of storage system monitoring data. For example, one compressed segment can be generated using a lossy compression method, while another compressed segment can be generated using a lossless compression method. In some embodiments, the data request may expressly or implicitly specify which compressed segment to retrieve. For example, the data request may expressly specify a particular compressed segment. Alternatively, the data request may specify non-lossy compression, or maximal compression, or the like, and monitoring system 100 or data store 120 can determine (e.g., based on compression information for the compressed segments) the compressed segment that satisfies the data request.

Consistent with disclosed embodiments, reconstruction of the requested storage system monitoring data can include combining adjoining or overlapping reconstructed segments. In some embodiments, when combining overlapping segments, monitoring system 100 can select among reconstructed values or generate new values for the overlapped interval. In some embodiments, monitoring system 100 can select values from segments corresponding to discrete events (discrete event segments) in place of values from segments corresponding to larger timescales (background segments) where such segments overlap.

Consistent with disclosed embodiments, reconstruction of the requested storage system monitoring data can include combining reconstructed channels. Monitoring system 100 can individually reconstruct compressed segments containing different channels. In some embodiments, monitoring system 100 can temporally align reconstructed channels and/or apply an inverse transformation to a channel expressed as a combination of other reconstructed channels. In some embodiments, monitoring system 100 can trim the reconstructed storage system monitoring data to match the requested time period. In some embodiments, monitoring system 100 can provide the entire reconstructed storage system monitoring data. User system 130 can be configured to display only the measurements falling within the requested time period and/or only the requested channels.

Figure 3:
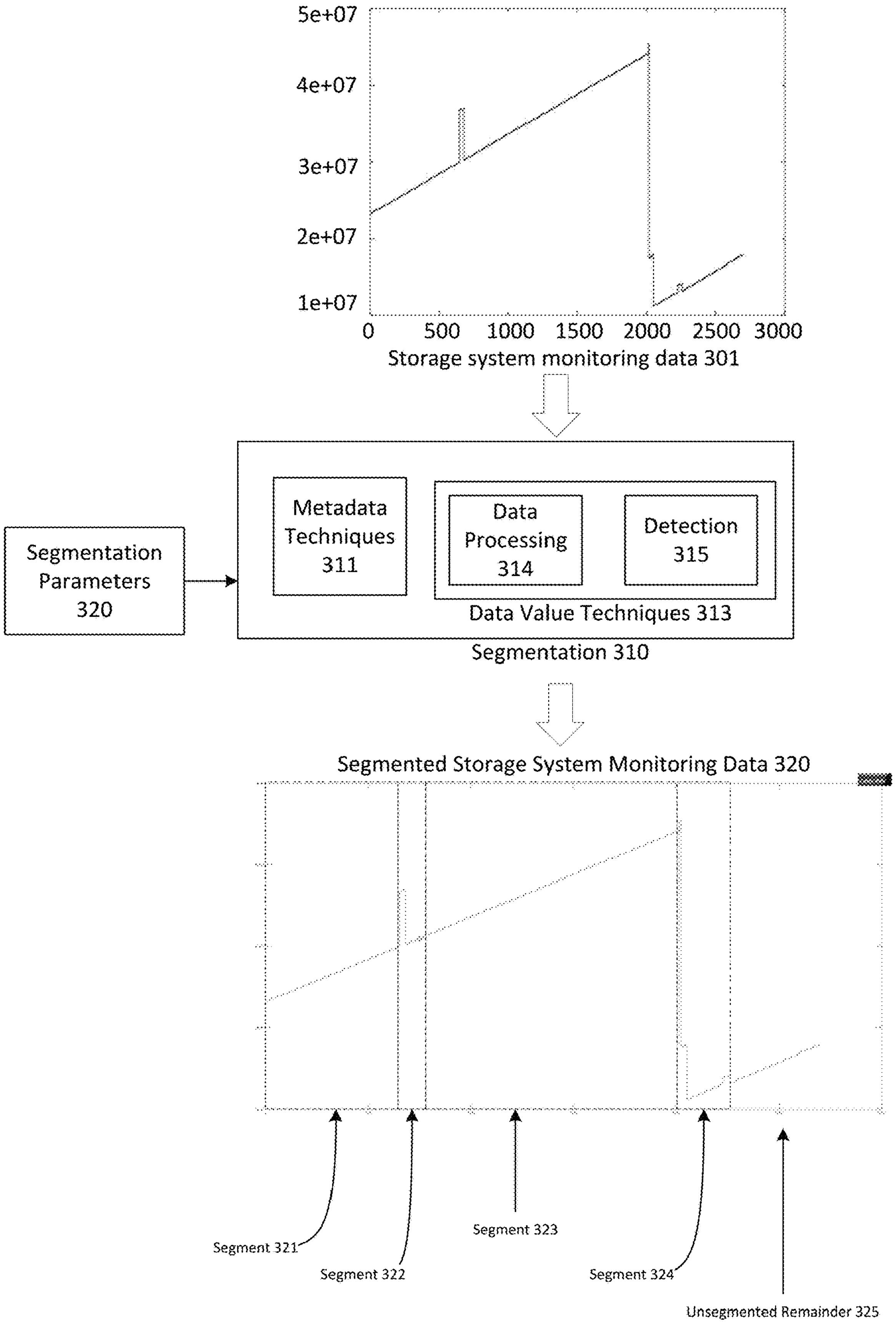
FIG. 3 depicts exemplary segmentation of storage system monitoring data, consistent with disclosed embodiments.

FIG. 3 depicts exemplary segmentation 310 of storage system monitoring data 301, consistent with disclosed embodiments. In this example, storage system monitoring data 301 includes a single channel of measurements of a storage system metric. For convenience of description, segmentation 310 is described as being performed by monitoring system 100. However, the disclosed embodiments are not so limited, as segmentation 310 can be performed by any suitable system. In some embodiments, segmentation 310 can correspond to step 203 of the storage process depicted in FIG. 2. However, segmentation 310 can also be performed as part of another process.

Consistent with disclosed embodiments, segmentation 310 can depend on segmentation parameters 320. Such segmentation parameters can have default values, values received from another system (e.g., user system 130, or the like), or values determined by a storage system (e.g., storage system 110) or storage system monitoring data. In some embodiments, segmentation parameters 320 can determine whether monitoring system 100 segments the storage system monitoring data as a batch process or as a continuous process.

In the example depicted in FIG. 3, the values included in storage system monitoring data 301 can represent an amount of data stored in a memory or disk. These values can exhibit a steady increase/purge cycle as data is stored in the memory or disk and then flushed to other storage. But this underlying pattern can be complicated with sudden increases and decreases in the amount of stored data, which may be of diagnostic or contractual importance. Here, monitoring system 100 has been configured to segment data as a continuous process. Monitoring system 100 has generated segmented storage system monitoring data 330, which includes segments 331, 332, 333, and unsegmented remainder 335. These segments correspond to periods of steady accumulation (e.g., segments 331 and 333) and periods of rapid change (e.g., segments 332 and 334). In this example, storage system monitoring data is accumulating in unsegmented remainder 335. Should monitoring system 100 identify a segment boundary in unsegmented remainder 335, monitoring system 100 can insert the segment boundary, thereby trimming unsegmented remainder 335 and creating a new segment.

In some embodiments, monitoring system 100 can select segmentation technique(s) for processing storage system monitoring data based on segmentation parameters 320. When the storage system monitoring data includes multiple channels, segmentation parameters 320 can define groups of channels that form a single segment (and optionally the channel or channels within the group used to identify segment boundaries, as described herein). Segmentation parameters 320 can specify the use of a particular segmentation technique for the storage system monitoring data, a channel of the storage system monitoring data, or a group of channels of the storage system monitoring data.

Consistent with disclosed embodiments, monitoring system 100 can perform segmentation 310 using multiple segmentation techniques. As described herein, segmentation techniques can include metadata techniques 311 and data value techniques 313. Metadata techniques 311 can include techniques based on the number of data points in a segment (e.g., including datapoints for n time values, n total datapoints, or the like), the size (e.g., in bytes, words, or the like) of the datapoints in the segment, the time values corresponding to the datapoints in the segment (e.g., datapoints corresponding to a particular time interval or duration, or the like), or another suitable criterion. Segmentation parameters can specify parameters specific to a metadata technique, such as number of datapoints per segment, elapsed time per segment, segment size, or the like.

Data value techniques 313 can include techniques that use a statistical analysis of the potential segment, or techniques that include performance of a frequency or wavelet transformation of the potential segment. In some embodiments, data value techniques 313 can include a data processing operation 314 and a detection operation 315. The data processing operation 314 can include steps of preprocessing or augmenting the storage system monitoring data. The detection operation 315 can include detecting segment boundaries in the storage system monitoring data.

Consistent with disclosed embodiments, preprocessing can include, but is not limited to, filtering the storage system monitoring data, normalizing the storage system monitoring data (e.g., mapping values of a storage system metric to a numerical range [a, b] for some a and b), coding or categorizing the storage system monitoring data (e.g., mapping numerical metric values to a number of categorical values), transforming the datatype of the storage system monitoring data (e.g., converting floating point data to fixed point data), reducing or increasing a precision of the datatype of the storage system monitoring data (e.g., converting metric data of type double float to type float, or type double integer to type integer), decimating or interpolating data points, performing a singular value decomposition or similar transformation of the storage system monitoring data, or any combination of the foregoing.

Consistent with disclosed embodiments, transforming the datatype or reducing the precision of the datatype can also be performed after generation of a compressed segment. For example, compression of a segment can include determination of formulas, parameters, or outlier values for the segment in a first datatype. These formulas, parameters, or outlier values can then be transformed into a second datatype. The second datatype can require less storage space than the first datatype. For example, the first datatype can be a float and the second an int, or the first datatype can be a double float and the second datatype a float.

Consistent with disclosed embodiments, monitoring system 100 can augment the storage system monitoring data by generating additional statistical values from the storage system monitoring data. Such statistical values can include statistics of individual channels (e.g., mean, standard deviation, percentiles, or other suitable statistics) and/or statistics of multiple channels (e.g., covariance matrices, or the like). In some embodiments, monitoring system 100 can estimate such statistical values for a time point or time interval. For example, monitoring system 100 can estimate the standard deviation of a signal $S_1$ at t as the standard deviation of the signal $S_1$ over the interval $t-\delta<x\leq t$ for some $\delta$ as:

$$\sigma_1(t) = stdev(\{S_1(x) | t-\delta < x \leq t\})$$

As an additional example, the mean of the signal can be calculated over the interval. Similarly, monitoring system 100 can estimate the covariance of two signals $S_1$ and $S_2$ at t as the covariance of the signals over the interval $t-\delta<x\leq t$ for some $\delta$ as:

$$\gamma_{1,2}(t) = \text{covariance }(\{S_1(x) | t-\delta < x \leq t\}, \{S_2(x) | t-\delta < x \leq t\})$$

In some embodiments, the additional statistical values can be considered by monitoring system 100 when segmenting the storage system monitoring data.

Consistent with disclosed embodiments, monitoring system 100 can augment the storage system monitoring data by applying a frequency or wavelet transform to the storage system monitoring data to generate additional values. For example, monitoring system 100 can generate spectrogram data for a storage system metric using suitable window sizes and offsets. The spectrogram data can represent the frequency content of the metric over time. In some embodiments, a channel of storage system monitoring data can be transformed using a wavelet transform into a wavelet domain. In some embodiments, the wavelet transform can be a continuous wavelet transform. For example, given a wavelet function $\psi(t)$ parameterized by a scale parameter $\alpha \in \mathbb{R}^+$ and a translation parameter $\beta \in \mathbb{R}$, the wavelet transform of the signal x(t) can be expressed as:

$$X(\alpha, \beta) = \frac{1}{|\alpha|^{1/2}} \int_{-\infty}^{\infty} x(t)\overline{\psi}\left(\frac{t-\beta}{\alpha}\right)dt$$

and the inverse wavelet transform as:

$$x(t) = \frac{C_{\psi}^{-1} \int_{0}^{\infty} \int_{-\infty}^{\infty} X(\alpha, \beta)1}{|\alpha|^{1/2}} \tilde{\psi}\left(\frac{t-\beta}{\alpha}\right) d\beta \frac{d\alpha}{\alpha^2}$$

where $\tilde{\psi}$ is the dual function of $\overline{\psi}$ and $$C_{\psi}^{-1}$$

is a wavelength admissible constant that imposes a power condition on the wavelets used in the transform. In some embodiments, the wavelet transform can be a discrete wavelet transform. As may be appreciated, multiple data augmentation operations can be applied to the storage system monitoring data (or to subsets of the channels included in the storage system monitoring data).

In some embodiments, preprocessing can be combined with data augmentation. For example, storage system monitoring data can be decimated and/or interpolated into predetermined sampling frequency. The storage system monitoring data can then be augmented using a frequency or wavelet transform of the storage system monitoring data. As an additional example, storage system monitoring data can be normalized and then augmented with percentiles of the storage system monitoring data. The percentiles can be calculated over a window slide of the potential segment. Segmentation parameters can include parameters concerning preprocessing (e.g., filter cutoff frequencies, filter parameters, interpolation/decimation values, mapping or normalization values, codes or categories, data transformations, or the like).

Consistent with disclosed embodiments, detection operation 315 can include identifying segment boundaries in the storage system monitoring data suitable for trimming or partitioning segments. Monitoring system 100 can perform such identification on the original, preprocessed and/or augmented data using thresholds, machine-learning models, or another suitable detection method.

Consistent with disclosed embodiments, monitoring system 100 can establish thresholds for storage system monitoring data, pre-processed storage system monitoring data, augmented storage system monitoring data, or some combination of the forgoing. For example, monitoring system 100 can identify a segment boundary at a time when a value of a storage system metric crosses a value of the threshold. Monitoring system 100 can use the segment boundary to trim or partition segments in the storage system monitoring data. For example, a value of write latency exceeding a threshold can trigger monitoring system 100 to generate a new segment. As another example, a value of the $90^{th}$ percentile of write latency exceeding a threshold can trigger monitoring system 100 to generate a new segment. As may be appreciated, various techniques (e.g., hysteresis, mask expansion/contraction, and other debouncing techniques) can be used to prevent generation of multiple segments when the values of the storage system metric approach or cross a threshold. Segmentation parameters can include parameters concerning thresholding (e.g., threshold values, or the like).

Consistent with disclosed embodiments, when monitoring system 100 is configured to generate segments including multiple channels, a threshold can involve one or more of the multiple channels. For example, when a segment includes read latency time and write latency time data values, monitoring system 100 can be configured to identify a segment boundary when the frequency transforms of the read latency time and write latency time data values include high frequency components having amplitudes greater than specified values. Alternatively, identification of a segment boundary across multiple channels can be triggered by a threshold specific to the values of one of the channels.

Consistent with disclosed embodiments, a machine learning model can be used to identify segment boundaries in the storage system monitoring data suitable for trimming or partitioning segments. In some embodiments, the machine learning model can be a supervised learning model. The supervised learning model can be trained using labeled training data (e.g., actual or synthetic storage system monitoring data). The labeled training data can include storage system monitoring data and associated labels. The labels can indicate segment boundaries in the training data selected for splitting segments. The labels can be human-generated, generated using another machine-learning model (e.g., a simpler or less-resource intensive model), generated using thresholding, or any combination of the foregoing. In some embodiments, suitable machine-learning model can be or include a neural network (e.g., a recurrent neural network, feed-forward neural network, transformer neural network, or other suitable architecture); gradient boosting, decision tree, or random-forest model; naive Bayes models; another suitable machine learning model; or combination thereof. Segmentation parameters can include parameters concerning supervised learning models (e.g., model types, model weights or parameters, or the like).

Consistent with disclosed embodiments, the machine learning model can be configured to accept as input storage system monitoring data, pre-processed storage system monitoring data, augmented storage system monitoring data, or some combination of the forgoing. The machine learning model can be configured to provide as output zero-or-more segment boundary indications. Such segment boundary indications can include a time, a sample number or index in the input data, or the like. In some embodiments, the machine learning model can output a no-boundary indication when no segment boundary is detected in the input data.

Consistent with disclosed embodiments, when monitoring system 100 is configured to generate segments including multiple channels, a machine-learning model can be configured to accept one or more of the multiple channels as input. For example, when a segment includes read latency time and write latency time data values, monitoring system 100 can be configured to apply the frequency transforms of the read latency time and write latency time data values to a machine learning model trained to identify segment boundaries based on such data. Alternatively, monitoring system 100 can be configured to identify segment boundaries across multiple channels using a machine-learning model that accepts as input the values of one of the channels.

Consistent with disclosed embodiments, monitoring system 100 can generate segments using the identified segment boundaries. In some embodiments, generating a segment can include copying or moving (e.g., to another storage location, memory, or the like) storage system monitoring data corresponding to the segment (e.g., storage system monitoring data between two consecutive identified segment boundaries). In some embodiments, generating segments can include using the storage system monitoring data and identified segment boundaries to generate compressed segments, as described herein. In such embodiments, the storage system monitoring data need not be copied or moved to another location.

Figure 4A:
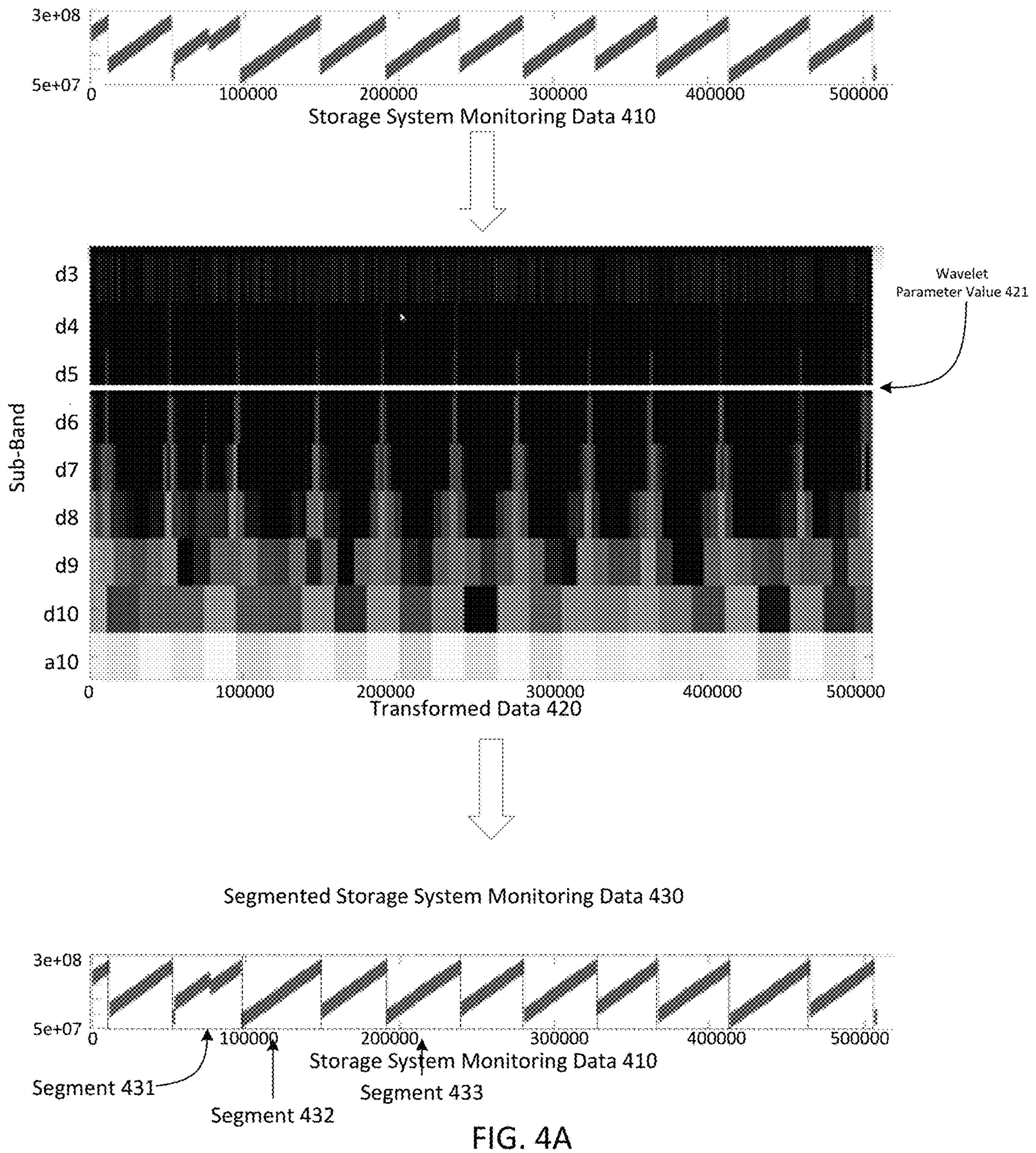
FIG. 4A depicts exemplary segmentation of storage system monitoring data using a wavelet transform, consistent with disclosed embodiments.

FIG. 4A depicts exemplary segmentation of storage system monitoring data 410 using a wavelet transform and thresholding, consistent with disclosed embodiments. As described herein, monitoring system 100 can be configured according to segmentation parameters 320 to perform batch segmentation of storage system monitoring data 410 using a data value segmentation technique. The data value segmentation technique can include, as part of a data processing operation, application of a wavelet transform to a version of storage system monitoring data 410. The amplitude of the resulting transformed data 420 at a wavelet parameter value 421 can then be assessed in a detection operation (e.g., using a threshold or the like) to identify segment boundaries. As may be appreciated, segment boundaries may be more easily identified using thresholding in the wavelet transform domain (where a discontinuity can appear as additional power in shorter-spatial extent wavelets) than in the time domain.

Using the identified segment boundaries, monitoring system 100 can segment storage system monitoring data 410. In this example, monitoring system 100 has been configured to perform batch segmentation, generating segmented storage system monitoring data 430 (e.g., including segments 431, 432, and 433).

Figure 4B:
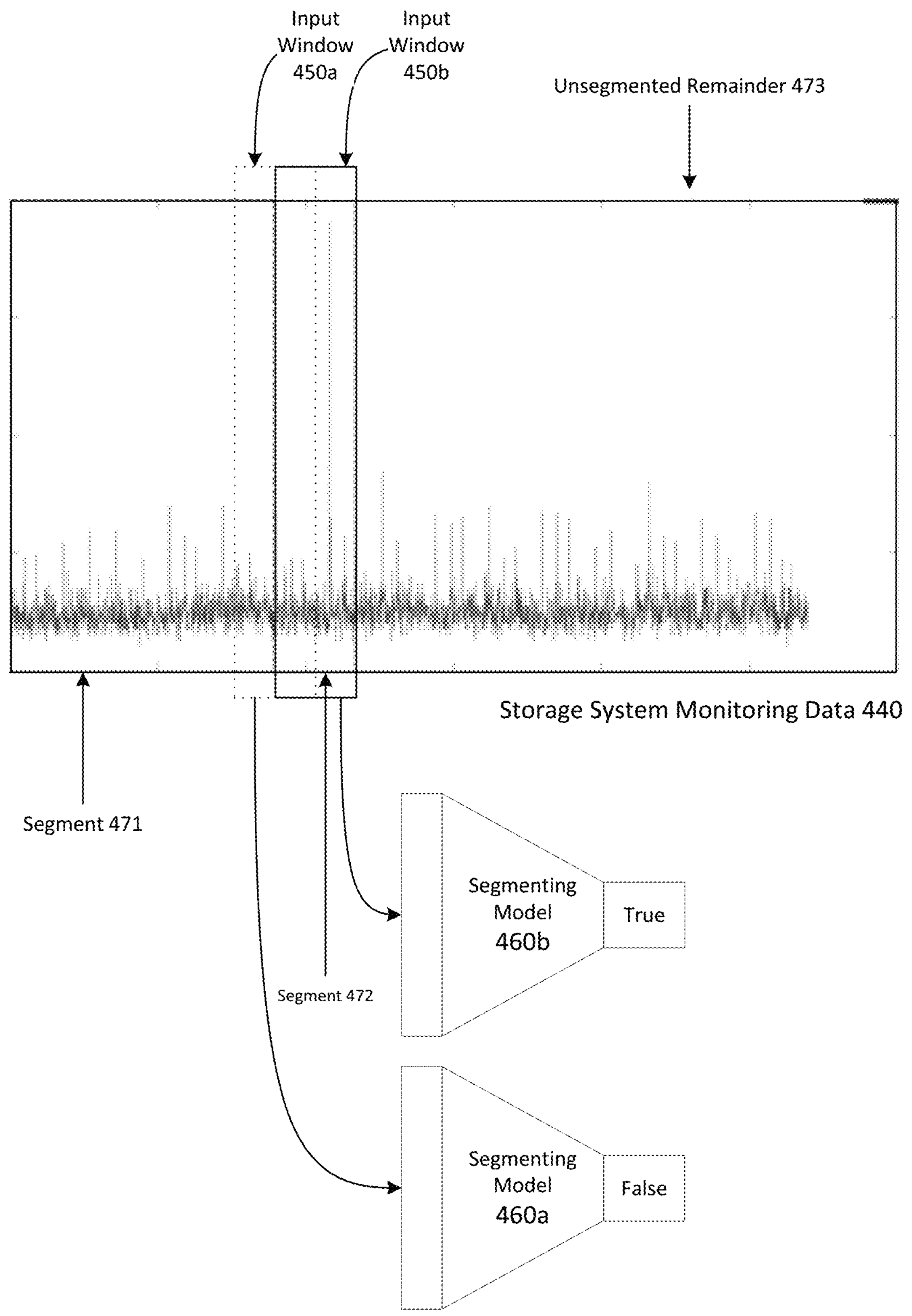
FIG. 4B depicts exemplary segmentation of storage system monitoring data using a machine learning model, consistent with disclosed embodiments.

FIG. 4B depicts exemplary segmentation of storage system monitoring data 440 using a machine learning model, consistent with disclosed embodiments. As described herein, monitoring system 100 can be configured according to segmentation parameters 320 to perform continuous segmentation of storage system monitoring data 440 using a data value segmentation technique. The data value segmentation technique can include, as part of a detection operation, application of a machine learning model to a version of storage system monitoring data 440. Two instances of this application are depicted. In a first instance, a portion of the data within an input window 450*a* (and/or suitable features extracted from such data) is applied to an instance 460*a* of a segmenting model. The output of the segmenting model instance 460*a* (e.g., “False”) indicates that a segment boundary has not been detected in input window 450*a*.

In a second instance, a portion of the data within an input window 450*b* (and/or suitable features extracted from this data) is applied to another instance 460*b* of the segmenting model. Unlike input window 450*a*, input window 450*b* contains a spike indicative of a change in the behavior of the storage system. In this hypothetical example, the segmenting model has been trained to detect such spikes. The output of segmenting model instance 460*b* (e.g., “True”) therefore indicates that a spike has been detected in input window 450*b*.

In this example, in response, monitoring system 100 can create a segment 471 that ends at the beginning of input window 450*b* and a segment 472 including the data within input window 450*b*. Monitoring system 100 can then continue to process storage system monitoring data 440 by sliding the input window of the segmenting model over unsegmented remainder 473.

In some embodiments, the segmenting model can be configured and trained to return an index value or time of a detected segment boundary in the input window. Monitoring system 100 can this use this segment boundary to segment the storage system monitoring data.

In some embodiments, the segmenting model can be configured and trained to return a prediction of a compression technique for use in compressing the segment contained within the input window or preceding the detected segment boundary in input window. Monitoring system 100 can this predicted compression technique to compress the detected segment of the storage system monitoring data.

In some embodiments, the segmenting model can be configured to return a reference to an existing compressed segment. The segmenting model can be trained to return such a reference when the compressed segment matches the data included in the input window, as described herein. The compressed segment may already be stored in data store 120. In some embodiments, monitoring system 100 can be configured to associate the reference with time information for the data contained in the input window. The reference (and the referred-to existing compressed segment) can be used to reconstruct data contained in the input window. In this manner, rather that storing the data contained in input window (or a compressed version thereof) monitoring system 100 can store a reference to the existing compressed segment.

Figure 4C:
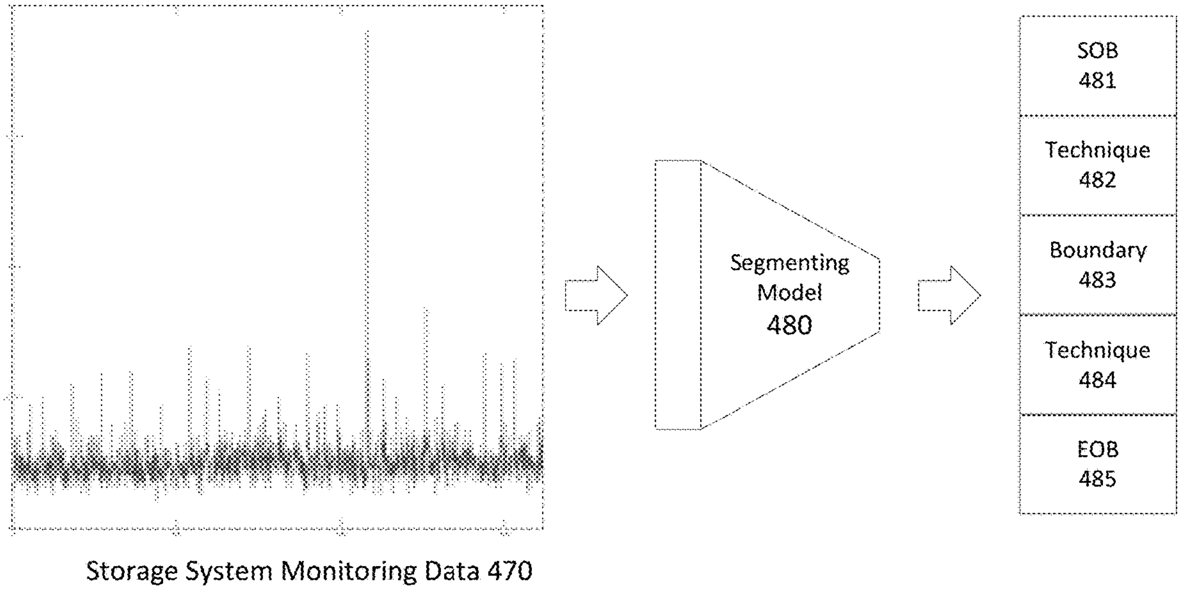
FIG. 4C depicts a segmenting model configured to recommend a compression technique in addition to indicating that the input window contains a segment boundary, consistent with disclosed embodiments.

In some embodiments, as depicted in FIG. 4C, a segmenting model can be configured to recommend a compression technique in addition to indicating that the input window contains a segment boundary. In this example, a batch of storage system monitoring data 470 can be provided to a segmenting model 480. Segmenting model 480 can be a suitable machine learning model (e.g., a recurrent neural network model, transformer, or the like). Segmenting model 480 can be trained to output a sequence of tokens, the tokens indicating the segment boundaries and the compression techniques associated with the bounded segments. In this instance, the output of the segmenting model can include a start of batch token 481, a compression technique token 482, and a segment boundary token 483. Compression technique token 482 can indicate the predicted compression technique for use on the segment bounded by the start of the batch and the sample having the index predicted by segment boundary token 483. Similarly, compression technique token 484 can indicate the predicted compression technique for use on the segment bounded by the sample following the index predicted by segment boundary token 483 and the end of the batch.

In this example, in response, monitoring system 100 can create a first segment that includes the portion of the batch ending at the predicted boundary and is compressed using the first predicted compression technique. Monitoring system 100 can create a second segment that includes the portion of the batch beginning at the predicted boundary and is compressed using the second predicted compression technique. As may be appreciated, segmenting model 480 can be trained using the determined segments and compression techniques generated by other segmenting and compression methods disclosed herein, or using manually labeled training data and specifies segment boundaries and compression techniques for segmenting and compression storage system monitoring data. For example, another method can select among compression techniques by comparing the compression ratios (and optionally error values) achieved by the compression techniques on a segment (or portion thereof). The output of this slower, more resource intensive method can be a sequence of segment boundaries and compression techniques useable to train segmenting model 480.

Figure 5:
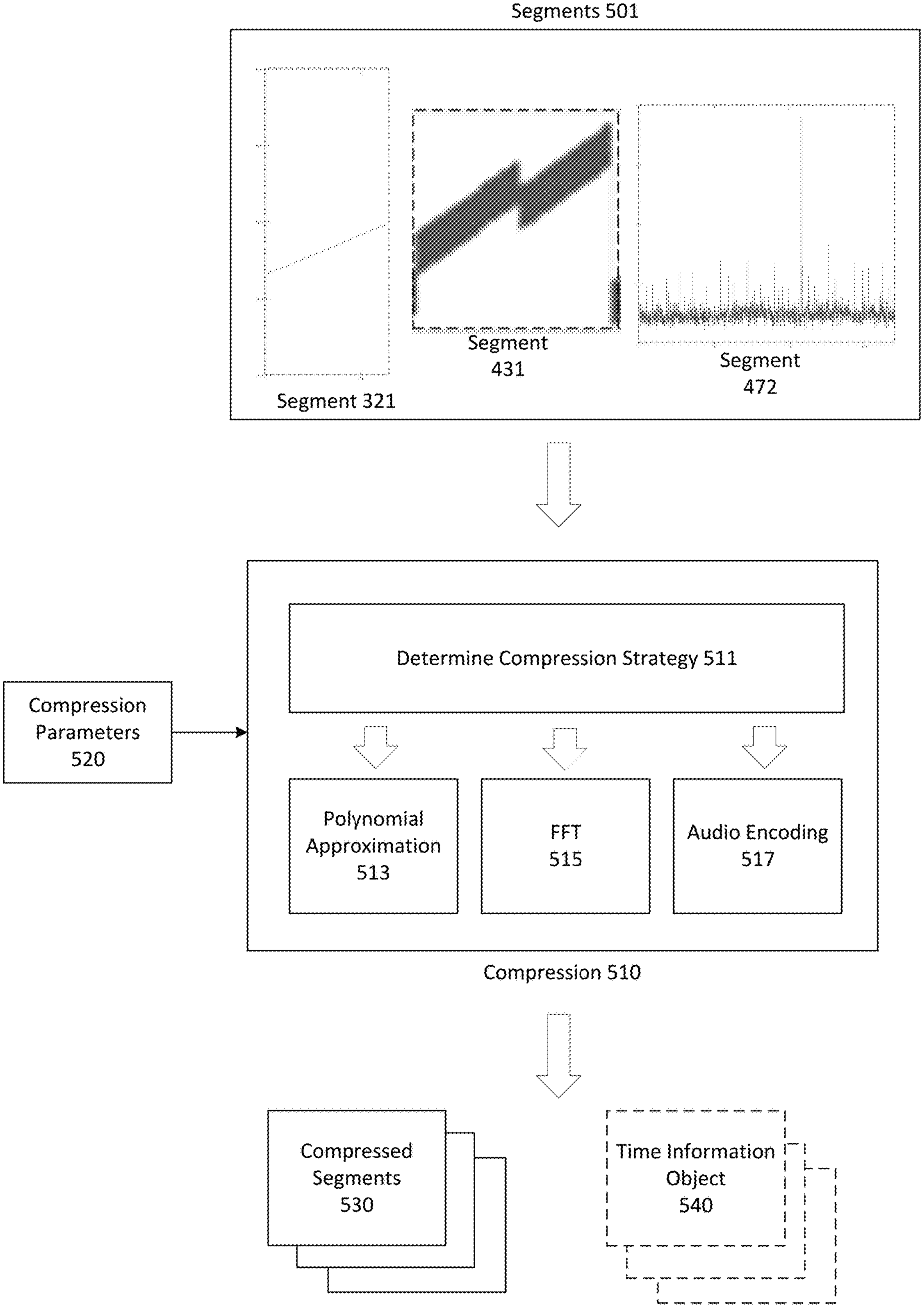
FIG. 5 depicts exemplary compression of segmented storage system monitoring data, consistent with disclosed embodiments.

FIG. 5 depicts exemplary compression 510 of segments 501, consistent with disclosed embodiments. For convenience of description, compression 510 is described as being performed by monitoring system 100. However, the disclosed embodiments are not so limited, as compression 510 can be performed by any suitable system. In some embodiments, compression 510 can correspond to step 204 of the storage process depicted in FIG. 2. However, compression 510 can also be performed as part of another process.

Consistent with disclosed embodiments, compression 510 can include a step 511 of determining a compression technique. In some embodiments, monitoring system 100 can be configured to determine the compression technique based on segment characteristics and/or compression parameters.

Segment characteristics can depend on the values contained in the segment, consistent with disclosed embodiments. Segment characteristics can include the range, standard deviation, distribution (e.g., as approximated using a histogram, or the like), or similar measures of the values in the segment (or of a first or higher-order derivative or other function of the values in the segment, or the like). Segment characteristics can include the number of zero-crossings in the segment. Segment characteristics can include an entropy or mutual information of the segment, or the like. For example, when the range of values in a segment is small, or the amplitude of derivatives of the signal (or of a filtered version of the signal) are contained within narrow bounds, then a polynomial approximation technique may be applied. As an additional example, when the rate of change or range of values in a segment is small or the standard deviation of values in the segment is small, a delta encoding technique may be applied. As an additional example, when the number of different values in the segment is small, a run-length encoding technique may be applied. As a further example, when the data exhibits a substantial high frequency component (e.g., estimated using a number of zero-crossings in the segment, or another suitable method), a Fourier transform or Discrete Wavelet Transform may be applied. As an additional, audio encoding techniques can be used when other methods exhibit unsatisfactory performance. When using audio encoding techniques, the data may be frequency shifted into an appropriate frequency for audio encoding. Reconstructing the signal may involve reversing this frequency shift. In some embodiments, multiple compression techniques can be used on a segment. For example, delta encoding can be followed by run-length encoding, or the like. As may be appreciated, the particular mapping from characteristics to compression techniques can depend on the system storage monitoring data (or channel thereof).

Compression parameters 520 can specify the available compression techniques, map particular compression technique(s) to particular channels or groups of channels in the storage system monitoring data, map particular compression technique(s) to segments having particular characteristics, or the like. In some embodiments, compression parameters 520 can specify parameters of compression techniques used (e.g., machine-learning model weights, wavelet transform scale parameters, FLAC encoding options), performance measures for determining goodness-of-compression (e.g., compression ratio, degree or loss, or another suitable criterion), or the like. In some embodiments, compression parameters 520 can specify that monitoring system 100 perform multiple compressions of the same segment or segment portion (e.g., for comparative purposes, to allow for storage of multiple compressed segments, or other suitable purposes). In such embodiments, compression parameters 520 can specify an order in which compression techniques are used to generate compressed segments and criteria for determining whether a compressed segment is satisfactory.

Consistent with disclosed embodiments, compression parameters can have default values, values received from another system (e.g., user system 130, or the like), or values determined by the storage system or storage system monitoring data. For example, monitoring system 100 can be provisioned with a set of compression techniques. Monitoring system 100 can then receive data or instructions from user system 103 that map the set of compression techniques to channels in storage system monitoring data. For example, polynomial approximation can be mapped to a first set of channels and a wavelet transform can be mapped to a second set of channels. Audio encoding can be mapped to all channels, for use as a fallback in case other compression techniques fail to satisfy a compression ratio condition. Alternatively, polynomial approximation can be mapped to all channels for use when the normalized monitoring data (or the first derivative of the normalized monitoring data) is contained within an amplitude bound. Audio encoding can be used otherwise.

In the example depicted in FIG. 5, segments 501 includes multiple different segments (segments 331, 431, and 472) representing different hypothetical storage system metrics. In this example, these segments correspond to different channels in storage system monitoring data obtained by monitoring system 100. In this example, monitoring system 100 can be configured to segment each channel independently. Start and ending times can therefore differ among segments 501. As described herein, monitoring system 100 can be configured to compress segmented storage system monitoring data using one of a set of suitable techniques. In this example, monitoring system 100 has been configured by compression parameters 520 to select among three types of compression techniques: polynomial approximation 513, fast Fourier transform technique 515, and audio encoding technique 517. Furthermore, while in some embodiments monitoring system 100 can be configured to compress segments that include the original storage system monitoring data, preprocessed storage system monitoring data, augmented storage system monitoring data, or some combination of the forgoing, in this hypothetical example, the compressed segments include only the original storage system monitoring data.

Segment 331 includes values that monotonically increase at an approximately constant rate. Accordingly, in this example and based on the compression parameters 520, monitoring system 100 can select in step 511 a polynomial approximation technique 513 for use in compressing segment 331.

Segment 431 includes values reflecting a combination of a piecewise monotonically increasing function and a superimposed high-frequency signal. Due to the substantial high-frequency component in segment 431, in this example and based on the compression parameters 520, monitoring system 100 can select in step 511 an FFT technique 515 for use in compressing segment 431.

Segment 472 may be a noisy signal unsuited for compression using polynomial approximation or an FFT. Monitoring system 100 can therefore select audio encoding 517 as a fall-back compression method for segment 472. In some embodiments, monitoring system 100 can select audio encoding 517 after determining that compressed segments generated using other compression techniques failed to satisfy a performance measure criterion (e.g., failed to achieve a compression ratio greater than a specified value). In some embodiments, monitoring system 100 can select audio encoding 517 based on compression parameters 520 mapping characteristics of the segment to compression techniques.

Compressed segments 530 can include compressed versions of segments 331, 431, and 472. The contents of these compressed segments can vary depending on the compression technique used to generate them. For example, a compressed version of segment 331 may include a set of parameters or control points (e.g., when polynomial approximation technique 513 is a spline-based method, such as a Catmull-Rom spline technique) or a set of polynomial coefficients (e.g., a slope and intercept when the polynomial approximation technique is a best-fit line). As an additional example, a compressed version of segment 431 may include amplitudes of frequency components of segment 431 (or a compressed version of such amplitudes). The compressed version of segment 472 can be the standard output of the audio encoding technique (e.g., a FLAC file, an MP3 file, an ACC file, or the like).

As described herein, time information can be associated with these compressed segments. Furthermore, the compressed segments can be associated with, or can include, compression information sufficient to enable monitoring system 100 to reconstruct the original segment from the compressed segment.

In some embodiments, as depicted in FIG. 5, such time information can be implemented using one or more time information objects 540. In some embodiments, a time information object can maintain time information for at least one corresponding compressed segment. As described herein, such a compressed segment can correspond to one or more channels of storage system monitoring data.

In some embodiments, a time information object can include a portion that specifies a time interval having a start time and an end time. In some embodiments, a monitoring system (or the like) can use the start time value and the end time value when responding to requests to determine whether a compressed segment corresponding to a time information object contains requested storage system monitoring data. A time information object can further include time entries that specify sub-intervals. In various embodiments, a sub-interval can correspond to a sampling discontinuity, change in a sampling rate, or change in compression method. In some embodiments, a sub-interval can specify three or more of a sub-interval starting time, a sub-interval stopping time, an increment time, or a number of samples.

As an example, the storage system may acquire 100 samples at a rate of 1 sample per second, beginning at $t_0$, then pause sample acquisition for 3 seconds, and then resume sample acquisition, beginning at $t_{102}$ at rate of 1 sample per 2 seconds for 100 samples. The storage system may again cease sample acquisition at $t_{300}$. In this example, the resulting 200 samples may be processed as a single segment. A corresponding time information object can include:

$T\cdot$Start_Time$=t_0$;

$T\cdot$End_Time$=t_{300}$;

$T(1)\cdot$Start_Time$=t_0$ $T(1)\cdot$Increment=1;

$T(1)\cdot N$samples=100;

$T(2)\cdot$Start_Time$=t_{102}$ $T(2)\cdot$Increment=2;

$T(2)\cdot N$samples=100;

In this example, the time object T has a start time value $t_0$, an end time value $t_{300}$, and two sub-intervals, T(1) and T(2). The two sub-intervals can each include an increment value (e.g., 1 or 2), a start time value (e.g., $t_0$ or $t_{102}$), and a number of samples (e.g., 100).

In this example, consistent with disclosed embodiments, a monitoring system can determine that a spline approximates the original segment. In some embodiments, the monitoring system can fit the spline to the original segment as a sequence of points without reference to the time information. For example, the monitoring system can treat samples 99, 100, and 101 as if these samples were evenly spaced. In some embodiments, the monitoring system can take time information into account when fitting the spline to the original segment. For example, the spline fitting can treat sample 99 and 100 as being 1 second apart, and samples 100 and 101 as being 3 seconds apart.

Consistent with disclosed embodiments, the parameters defining the spline fit can be stored in a compressed segment, which can be associated with the time information object (e.g., by including a reference to one in the other, or including references to each in additional data structure(s), or another suitable method).

Consistent with disclosed embodiments, monitoring system 100 can reconstruct the original segment using the compressed segment. When the determination of the spline did not take time information into account, the original segment can be reconstructed as a sequence of evenly spaced samples. The sequence of evenly spaced samples can then be mapped to the two discontinuous sub-intervals using the sub-interval information contained in the time information object. When the determination of the spline did take time information into account, the original segment can be reconstructed using the sub-interval information contained in the time information object.

When a time information object is associated with multiple compressed segments, a compressed segment can be associated with a sub-interval (e.g., by including a reference to one in the other, or including references to each in additional data structure(s), or another suitable method). In some embodiments, a monitoring system (or the like) can use sub-interval time information (e.g., increment values, start time values, numbers of samples, or the like) to when responding to requests to determine whether a compressed segment corresponding to a sub-interval contains requested storage system monitoring data. The referenced compressed segment can be used to reconstruct the original segment. As described herein, such reconstruction may use the time information for the sub-interval, or the reconstructed segment can be subsequently mapped to times using the time information.

Figure 6A:
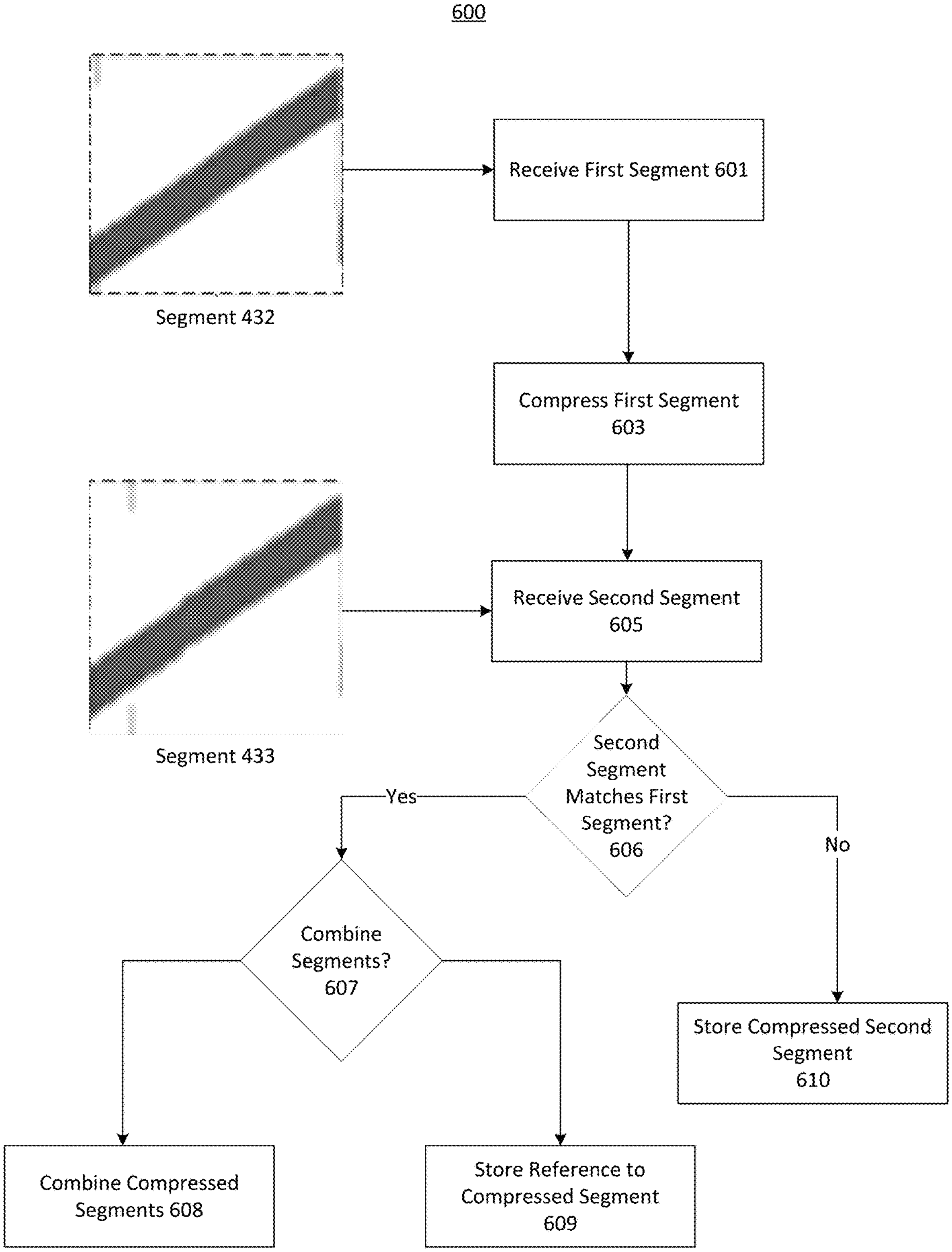
FIG. 6A depicts exemplary compression using segment matching, consistent with disclosed embodiments.

FIG. 6A depicts exemplary compression using segment matching (e.g., according to method 600), consistent with disclosed embodiments. Method 600 can be used with the method depicted in FIG. 2, or another suitable method. As may be appreciated, method 600 can be suitable for compressing data that exhibits repeated patterns. For convenience of description, method 600 is described as being performed by monitoring system 100 and storage system 110. As may be appreciated, method 600 can be performed by other suitable monitoring and storage systems.

In step 601 of method 600, monitoring system 100 can obtain a first segment (e.g., segment 432), consistent with disclosed embodiments. As described herein, monitoring system 100 can receive or retrieve the first segment directly or indirectly from storage system 110. The disclosed embodiments are not limited to any particular manner or format for transmitting the first segment.

In step 603 of method 600, monitoring system 100 can compress the first segment. As described herein with regard to FIG. 2 and FIG. 5, monitoring system 100 can select a compression technique for the first segment based on characteristics of the segment and compression parameters. In this example, the first segment may be characterized by a substantial high-frequency component and may be compressed using a frequency or wavelet domain compression technique.

In step 605 of method 600, monitoring system 100 can obtain a second segment (e.g., segment 433), consistent with disclosed embodiments. As described herein, monitoring system 100 can receive or retrieve the second segment directly or indirectly from storage system 110. The disclosed embodiments are not limited to any particular manner or format for transmitting the second segment. In some embodiments, the manner or format for transmitting the second segment can differ from the manner or format for transmitting the first segment.

In step 606 of method 600, monitoring system 100 can determine whether the second segment matches the first segment. In some embodiments, monitoring system 100 can determine whether the uncompressed values of the first segment match the uncompressed values of the second segment. In some embodiments, monitoring system 100 can determine whether the compressed values of the first segment match the compressed values of the second segment.

Consistent with disclosed embodiments, a match can be determined based on a match score (e.g., a distance between the segments according to a distance measure, such as a sum of squared differences, a correlation or cross-correlation, or another suitable measure). The match score can be determined based on the values of the first and second segments. Monitoring system 100 can determine that the first segment matches the second segment when the match score satisfies a threshold condition (e.g., exceeds or falls below a threshold, depending on the design of the match score). For example, when the compression technique is a polynomial approximation technique that determines parameters or control points for the representing the segment, monitoring system 100 can determine a distance or weighted distance between the parameters or control points for the first and second segments. Monitoring system 100 can determine that the first and second segments match when the distance between the parameters or control points for the first and second segments is less than a threshold value. Note that for such a compression technique, the parameters or control points may match, even though the first and second segment contain different numbers of measurements or different values. As may be appreciated, compression parameters can specify a method for determining the match score and the threshold, consistent with disclosed embodiments.

When the first segment matches the second segment at step 606, method 600 can proceed to step 607. In step 607, monitoring system 100 can determine whether to combine the first and second segments. In some instances, the first and second segments may be adjoining. In such instances, when the manner of compression permits, updating the time information associated with the compressed first segment can combine the first and second segments. For example, monitoring system 100 can be configured to segment a channel of system monitoring data based on metadata for the segment. In this example, monitoring system 100 can generate a new segment every 1000 data points. Two consecutive segments can include the same approximately constant value. Monitoring system 100 can compress the two segments in a lossy manner by representing each segment by the constant value. Monitoring system 100 can determine that the compressed segments match, based on the constant values, and that the type of compression permits the combination of the two segments.

When the first segment and the second segment can be combined at step 607, method 600 can proceed to step 608. In step 608, the compressed segments can be combined. As described herein, each of the compressed segments can be associated with time information. The time information can specify the beginning and ending of the compressed segments. In some embodiments, the compressed segments can be combined by updating the time information for one segment to encompass the time associated with the other segment. For example, when the first segment is associated with the time interval [a, b) and the second segment is associated with the time interval [b, c), the segments can be combined by associating the first segment with the time interval [a, c).

As a further example, when a time information object is associated with the first segment, the time information object can be modified to encompass the second segment. For example, an end time of the time information object can be modified to match an end time of the second segment. As an additional example, a sub-interval of the time information object can be updated to increase the number of samples based on the number of samples in the second segment. As a first example, another sub-interval can be added to the time information object, the additional sub-interval have a start time, sampling interval, number of points, or end time based on the second segment.

When the first segment and the second segment cannot be combined at step 607, method 600 can proceed to step 609. In step 609, monitoring system 100 can be configured to store, in place of one compressed segment, a reference to the other compressed segment (e.g., using a data structure associating time information with references to compressed segments). For example, in place of the second compressed segment, monitoring system 100 can be configured to store a reference to the first compressed segment. In this manner, the amount of data stored can be reduced.

As may be appreciated, monitoring system 100 can identify the second segment in response to a data request (e.g., using a data structure associating time information with references to compressed segments). Monitoring system 100 can then retrieve the compressed first segment (e.g., rather than a compressed version of the second segment). Monitoring system 100 can then reconstruct the second segment using the compressed first segment. As may be appreciated, the reconstructed second segment can be the same, or different than, a reconstructed first segment. For example, the first and second segments can have different time information. According to some compression techniques, the time information can be used to reconstruct the segment. The differences in time information can result in differences in the reconstructed segments.

When the first segment does not match the second segment at step 606, method 600 can proceed to step 610. In step 610, monitoring system 100 can store the compressed second segment. When matching is performed on the uncompressed first and second segments, monitoring system 100 can compress and then store the compressed second segment. As may be appreciated, monitoring system 100 may use differing compression techniques for compressing the first and second segments.

Figure 6B:
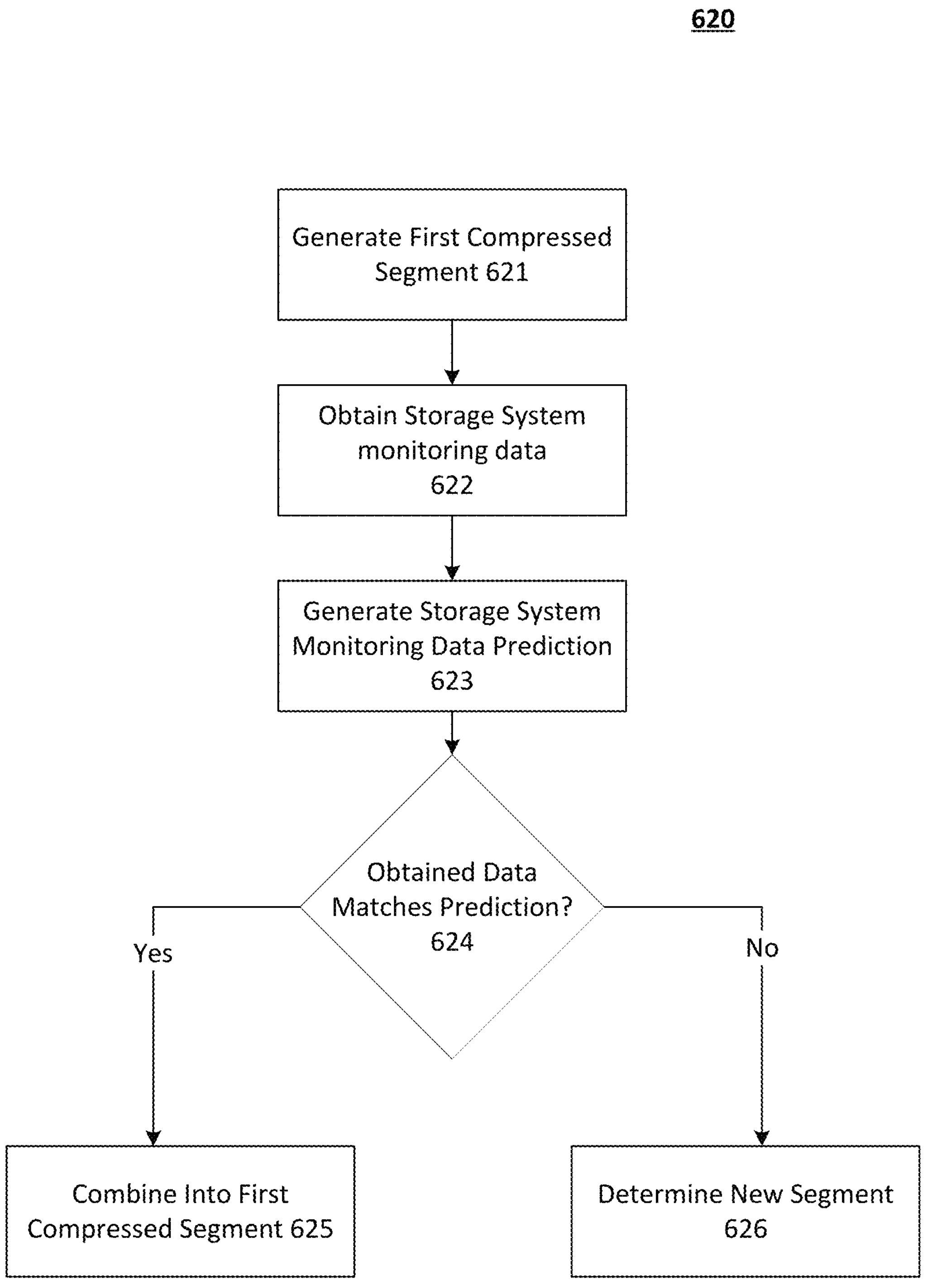
FIG. 6B depicts exemplary compression using predictive matching, consistent with disclosed embodiments.

FIG. 6B depicts exemplary compression using predictive matching (e.g., according to method 620), consistent with disclosed embodiments. Method 620 can be used with the method depicted in FIG. 2 (e.g., steps 622 to 626 can be performed prior to or as part of step 203), or another suitable method. As may be appreciated, method 620 can be suitable for compressing data that exhibits predictable behavior over multiple segments. For convenience of description, method 620 is described as being performed by monitoring system 100 and storage system 110. As may be appreciated, method 620 can be performed by other suitable monitoring and storage systems.

In step 621 of method 620, monitoring system 100 can generate a first compressed segment from obtained storage system monitoring data, consistent with disclosed embodiments. The first compressed segment can be generated using a compression technique, such as a compression technique described herein. The segment compressed can be obtained as described herein, or in another suitable manner. In some embodiments, the segment can include multiple channels. In some embodiments, the segment can include a single channel.

In step 622 of method 620, monitoring system 100 can obtain additional storage system monitoring data, consistent with disclosed embodiments. The additional storage system monitoring data can include the same channel(s) as the storage system monitoring data used to generate the first compressed segment. In some embodiments, the additional storage system monitoring data can include a single observation of the channel(s). In some embodiments, the additional storage system monitoring data can include a batch of observations of the channel(s). When generation of the first compressed segment includes preprocessing, such preprocessing can be performed on the obtain additional storage system monitoring data.

In step 623 of method 620, monitoring system 100 can generate storage system monitoring data predictions based on the first compressed segment, consistent with disclosed embodiments. In some embodiments, monitoring system 100 can base the prediction on the values of a reconstruction of the first compressed segment. For example, given a reconstruction of the first compressed segment $\hat{X}(n)$ of length N, monitoring system 100 can predict that $\hat{X}(n+N)=\hat{X}(n)$ for $0 \leq n < N$ (e.g., that the system monitoring data is periodic, largely constant, or the like). In some embodiments, monitoring system 100 can generate the prediction in a manner dependent on the compression technique. As described herein, the compression technique may involve determining parameters for a formula that takes index number as an argument (e.g., $\hat{X}(n|a)$, where n is the index and a is a set of parameters for the formula). Such compression techniques can include polynomial approximation, linear predictive coding, or other such techniques. Generating storage system monitoring data predictions can then involve applying the parameterized formula to additional indices. For example, when parameterized formula $\hat{X}(\cdot|a)$ is selected as the compression technique for a segment having indices $n_i$ to $n_j$, the prediction for index $n_{j+m}$ can be $\hat{X}(n_{j+m}|a)$.

As may be appreciated, while FIG. 6B depicts step 622 as preceding step 623 in method 620, the disclosed embodiments are not so limited. In some embodiments, step 623 can be performed before, simultaneously with, or contemporaneously with step 622.

In step 624 of method 620, monitoring system 100 can compare the predicted storage system data to the obtained storage system data, consistent with disclosed embodiments. When the obtained data matches the predicted data, method 620 can proceed to step 625. Otherwise, method 620 can proceed to step 626.

In some embodiments, the obtained data can match the predicted data when a function of the obtained and predicted data is less than a threshold value. When the obtained storage system monitoring data is a single measurement, the function can depend on the difference (or normalized difference) between the measurement and a corresponding predicted measurement. For example:

$$\epsilon < \left|\hat{X}(n_{j+m}|a) - X(n_{j+m})/X(n_{j+m})\right|$$

where $n_{j+m}$ is the index of the obtained measurement, $X(n_{j+m})$ is the value of the obtained measurement, $\hat{X}(n_{j+m}|a)$ is the predicted value of the measurement, and e is the error threshold. When the obtained storage system monitoring data is a batch of measurements, function can depend on the differences (or normalized differences) between the obtained measurements and the corresponding predicted measurements. Suitable functions include the weighted or unweighted L2 norm, L1 norm, L-infinity norm, mean squared error, Manhattan distance, or other suitable measure.

In step 625 of method 620, monitoring system 100 can combine the obtained storage system monitoring data into the first compressed segment, consistent with disclosed embodiments. In some embodiments, time information associated the first compressed segment can be updated to reference the times associated with the obtained system monitoring data. For example, when a batch of 50 samples is determined to match the first compressed segment, and the first compressed segment is associated with time information that specifies a starting index of 164, a sampling interval of 2 seconds, a starting time of 12:11:36 AM, Apr. 1, 2024, and 200 samples, the time information can be updated to specify 250 samples, while leaving the remaining information unchanged. In this manner, without changing the stored compression information, the 50 samples can be merged into the existing compressed segment. As a further example, when a time information object is associated with the first compressed segment, the time information object can be modified to encompass the obtained storage system monitoring data, similar to the combination of the first and second segments described above with regards to FIG. 6A.

In step 626 of method 620, monitoring system 100 can determine a new segment, consistent with disclosed embodiments. Monitoring system 100 can determine the new segment as described herein (e.g., as disclosed with regards to step 203).

Figure 7:
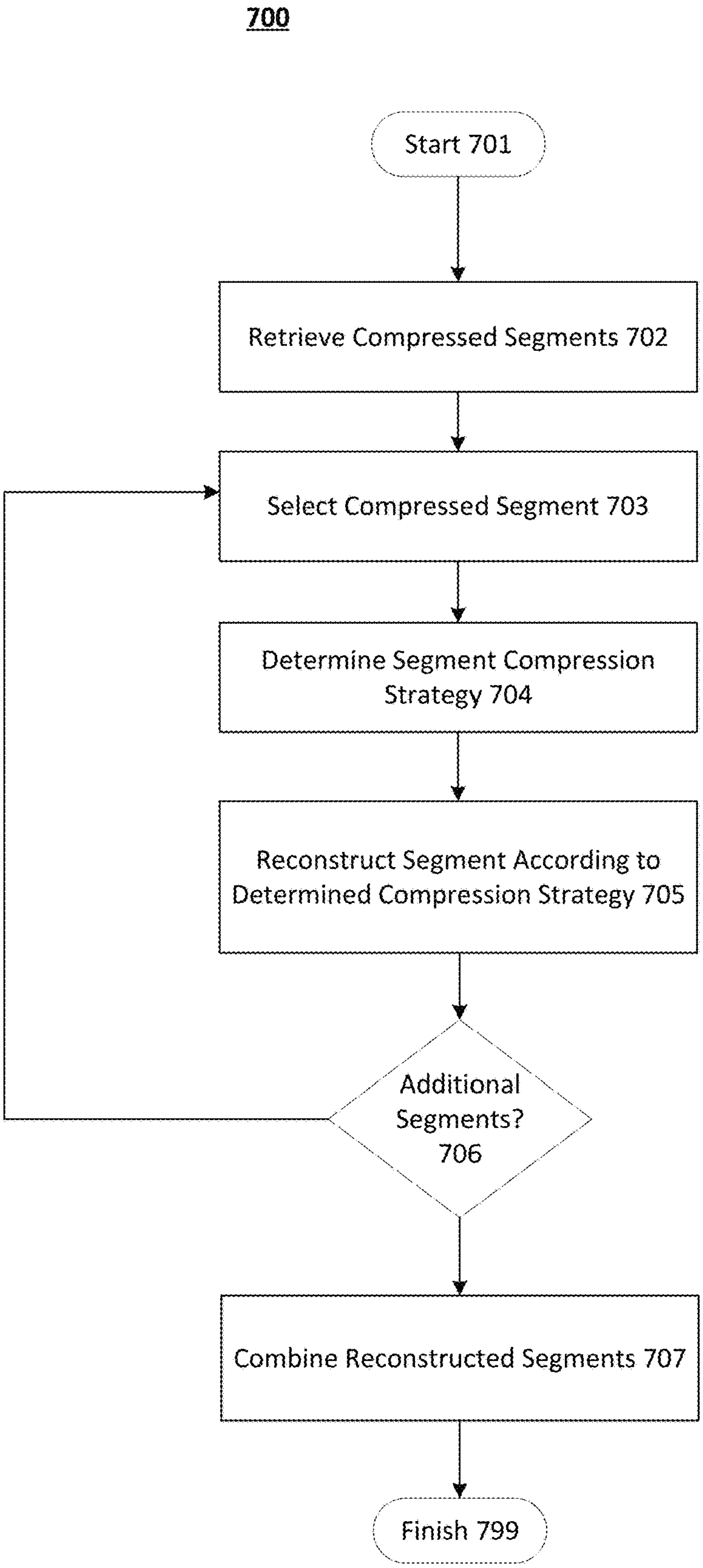
FIG. 7 depicts exemplary reconstruction of compressed segments of storage system monitoring data, consistent with disclosed embodiments.

FIG. 7 depicts exemplary reconstruction of compressed segments of storage system monitoring data (e.g., according to method 700), consistent with disclosed embodiments. In some embodiments, method 700 can be performed as part of the reconstruction process depicted in FIG. 2. For convenience of description, method 700 is described as being performed by monitoring system 100 (as in step 214B of FIG. 2). However, the disclosed embodiments are not so limited, as method 700 can be performed by user system 130

(as in step 214A of FIG. 2) or another suitable system. As may be appreciated, method 700 can also be performed as part of another suitable reconstruction process.

In step 701, method 700 can start. Monitoring system 100 can perform method 700 in response to receiving a data request for storage system monitoring data (e.g., from user system 130, or another system). As described herein, the data request can include indications of the requested time period. In some embodiments, the data request can include indications of the requested storage system monitoring data and/or storage system (e.g., storage system 110).

In step 702 of method 700, monitoring system 100 can retrieve compressed segments from data store 120, consistent with disclosed embodiments. In some embodiments, time information objects, or the like, can include information (e.g., start times, end times, or the like) that associate the time information objects with corresponding compressed segments. In some embodiments, monitoring system 100 can maintain a data structure associating time information with corresponding compressed segments (e.g., a key-value index or the like). In such embodiments, monitoring system 100 can determine compressed data segments corresponding to time information that overlaps with the requested time period (e.g., using the key-value index to retrieve references to compressed segments having corresponding times that overlap the requested time period). In some embodiment, the data structure can store references (e.g., paths, object keys, row or column values, or the like) to the compressed segments. Monitoring system 100 can request the compressed data segments from data store 120 using the stored references.

In some embodiments, data store 120 can maintain the time information objects or data structure associating time information with corresponding compressed segments. In such embodiments, monitoring system 100 can query the tine information objects or data structure, retrieve references to the relevant compressed segments, and request such compressed segments. In some embodiments, monitoring system 100 can provide the requested time period to data store 120 and data store 120 can query the data structure, retrieve the relevant compressed segments, and return them to monitoring system 100. In some embodiments, data store 120 can also reject the corresponding time information objects.

Consistent with disclosed embodiments, monitoring system 100 can also obtain compression information corresponding to the retrieved compressed segments, consistent with disclosed embodiments. The compression information can include data and/or information sufficient to reconstruct the segment from the compressed segment.

In step 703 of method 700, monitoring system 100 can select one of the retrieved compressed segments, consistent with disclosed embodiments. In various embodiments, the compressed segment can be selected randomly, based on characteristics of the compressed segments, based on the order in which such segments are received by monitoring system 100 from data store 120, or another suitable criterion.

In step 704 of method 700, monitoring system 100 can determine the compression technique of the selected segment, consistent with disclosed embodiments. In some embodiments, compression information can identify the compression technique used to compress the segment. As described herein, such compression information can be included in a data structure (e.g., a file or the like) containing the compressed segment or included in another, separate data structure. In some embodiments, the time information associated with the compressed segment can be used to obtain the compression information. For example, a data structure containing the time information (e.g., as a key) can also contain the compression information or can contain a reference to the compression information. In some embodiments, a time information object can contain the time information necessary to reconstruct the compressed segment, or map the reconstructed segment samples to corresponding times.

In step 705 of method 700, monitoring system 100 can reconstruct the segment according to the determined compression technique. Consistent with disclosed embodiments, reconstruction of the compressed segment can depend on the compression technique used to generate the compressed segment. As may be appreciated, when the compression technique is lossy, the reconstruction can be approximate. For example, when the compression technique is polynomial approximation using splines, the compression data may be parameters for splines that approximate the segment. In some embodiments, the entire segment can be reconstructed. In some embodiments, only the points in the segment falling within the requested time period can be reconstructed. For example, using the time information associated with the segment, a subset of the points in the segment that fall within the requested time period can be identified. Using the parameters for the splines, approximate values for these points can be determined. As an additional example, when the compression technique is an FFT or wavelet transform, an inverse FFT or wavelet transform can be applied to the data. Likewise, a suitable decoder and be used to reconstruct a segment compressed using an audio encoder.

In step 706 of method 700, monitoring system 100 can determine whether additional compressed segments remain to be reconstructed, consistent with disclosed embodiments. When additional segments remain to be reconstructed, method 700 can return to step 703. Otherwise, method 700 can proceed to step 707.

In step 707 of method 700, monitoring system 100 can combine the reconstructed segments, consistent with disclosed embodiments. In some instances, combining the reconstructed segments can include combining adjoining or overlapping reconstructed segments. In some embodiments, adjoining reconstructed segments can be concatenated. In some embodiments, overlapping reconstructed segments can be combined by selecting the values from one of the overlapping segments or by generating new values based on the value of the overlapping segments. For example, monitoring system 100 can select reconstructed segment with the greatest fidelity to the original segment, such as a lossless reconstruction of the original segment. As an additional example, monitoring system 100 can average the values of the reconstructed segments on the overlapped interval.

In some embodiments, a channel of storage system monitoring data can depict both an overall trend and the occurrence of discrete events. The monitoring system can be configured to segment the channel into shorter discrete event segments corresponding to the discrete events and a longer background segment depicting a greater expanse of time. The segments corresponding to the discrete events can be compressed according to one compression technique (e.g., a lossless compression technique) and the overlapping segment can be compressed according to another compression technique (e.g., a lossy compression technique). In response to the data request, the overlapping segment and any relevant segments corresponding to events can be retrieved, based on associated time information, and reconstructed. The overlapping segments can then be combined. For example, over the domain of the lossless reconstruction, the values of the lossless reconstruction can be included in the combined segment. Otherwise, the values of the lossy reconstruction can be included in the combined segment.

Consistent with disclosed embodiments, reconstruction of the requested storage system monitoring data can include combining reconstructed channels. As described herein, in some embodiments, the storage system monitoring data can include multiple channels. A compressed segment can include each of these multiple channels or a subset of these multiple channels. Accordingly, multiple compressed segments can include different channels spanning the same time interval or overlapping time intervals. Consistent with disclosed embodiments, the multiple reconstructed segments can be generated from the multiple compressed segments. The different channels can then be combined into a set or array of channels such that the requested time period includes the requested channels. In some instances, the reconstructed channels can be resampled (e.g., using decimation, interpolation, or the like) such that the reconstructed channels temporally align. In some embodiments, when one or more channels were expressed as a linear combination of other channels, prior to compression, an inverse linear combination can be applied to reconstructed versions of the one or more channels to yield the original channels.

In some embodiments, reconstruction of the requested storage system monitoring data can include trimming (by channels or by temporal extent) the combined, reconstructed segments to match the requested time period and channels.

In step 799, method 700 can terminate. In some embodiments, monitoring system 100 can provide the reconstructed storage system monitoring data to a user system (e.g., user system 130, or another system).

Figure 8A:
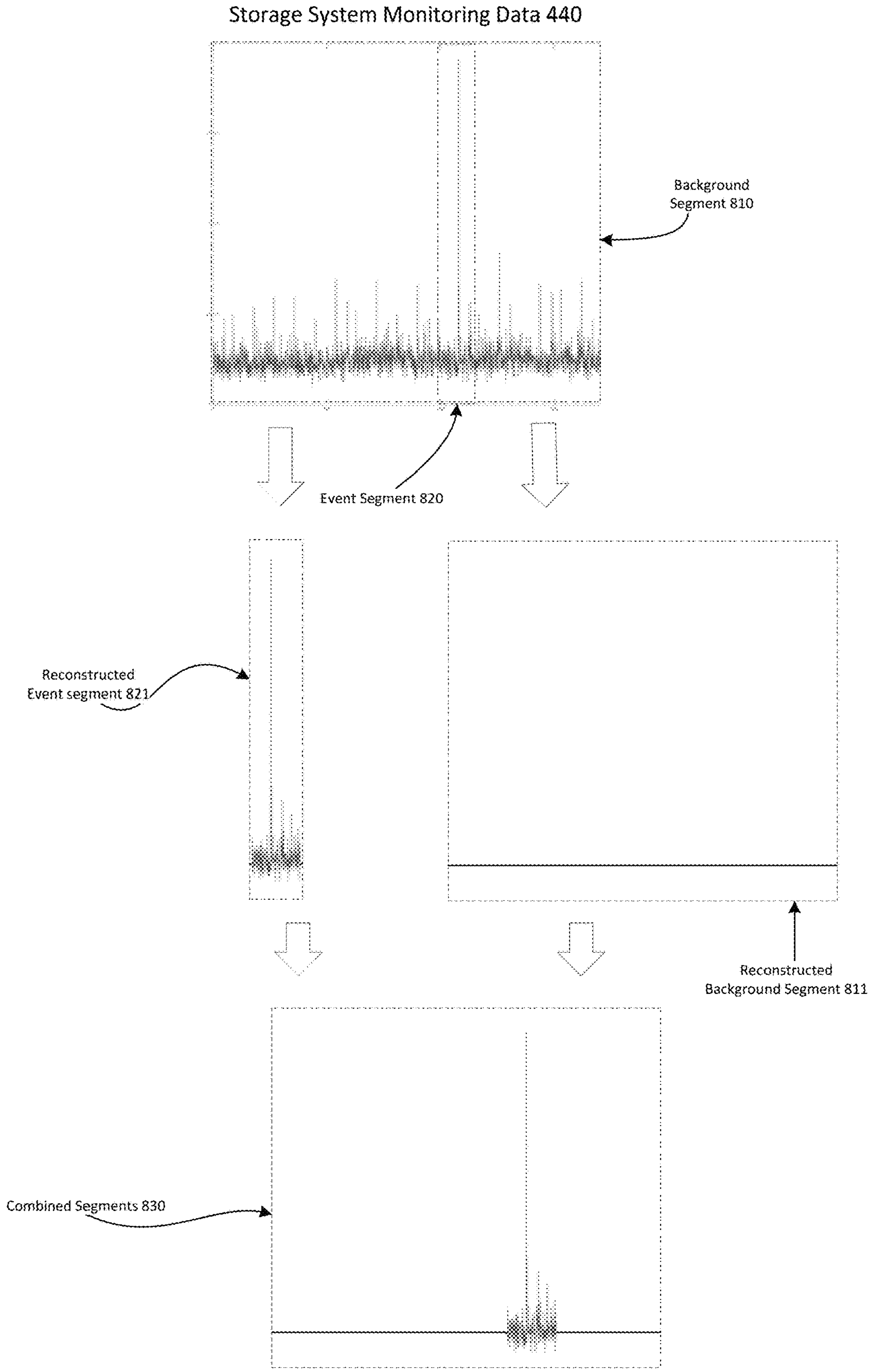
FIG. 8A depicts the exemplary compression and decompression of segments corresponding to discrete events, consistent with disclosed embodiments.

FIG. 8A depicts the exemplary compression and decompression of segments corresponding to discrete events, consistent with disclosed embodiments. In some embodiments, storage system monitoring data can document both a background behavior and discrete events of interest. For example, storage system monitoring data 440 can include both a relatively constant baseline and intermittent spikes of increased activity. In this hypothetical example, changes in the baseline and sufficiently large activity spikes may both be of interest. Monitoring system 100 can be configured to generate multiple segments for the same storage system monitoring data. Background segments (e.g., background segment 810) can be generated using segment metadata (e.g., a number of data points, duration, or the like). Discrete event segments (e.g., event segment 820) can be generated using a machine learning model trained to detect spikes (or other events of interest).

Consistent with disclosed embodiments, the background segments and, optionally, the event segments (e.g., event segments 820) can be compressed. In this example, the background segments can be compressed using a lossy compression technique (e.g., a polynomial compression technique). The discrete event segments can be compressed using a lossy or lossless compression technique.

In response to a data request that specifies that detected discrete events be displayed, monitoring system 100 can be configured to reconstruct any relevant discrete event segments (e.g., reconstructed event segment 821) and background segments (e.g., reconstructed background segment 811).

Consistent with disclosed embodiments, monitoring system 100 can then combine the reconstructed segments. In some embodiments, where the discrete event segments temporally overlap with the background segments, the combined reconstructed segment (e.g., combined segments 830) can use the values of the reconstructed discrete event segment. The combined reconstructed segment can then be provided for display. As may be appreciated, if the data request does not specify that detected discrete events be displayed, then only the background segments may be reconstructed and provided for display.

Figure 8B:
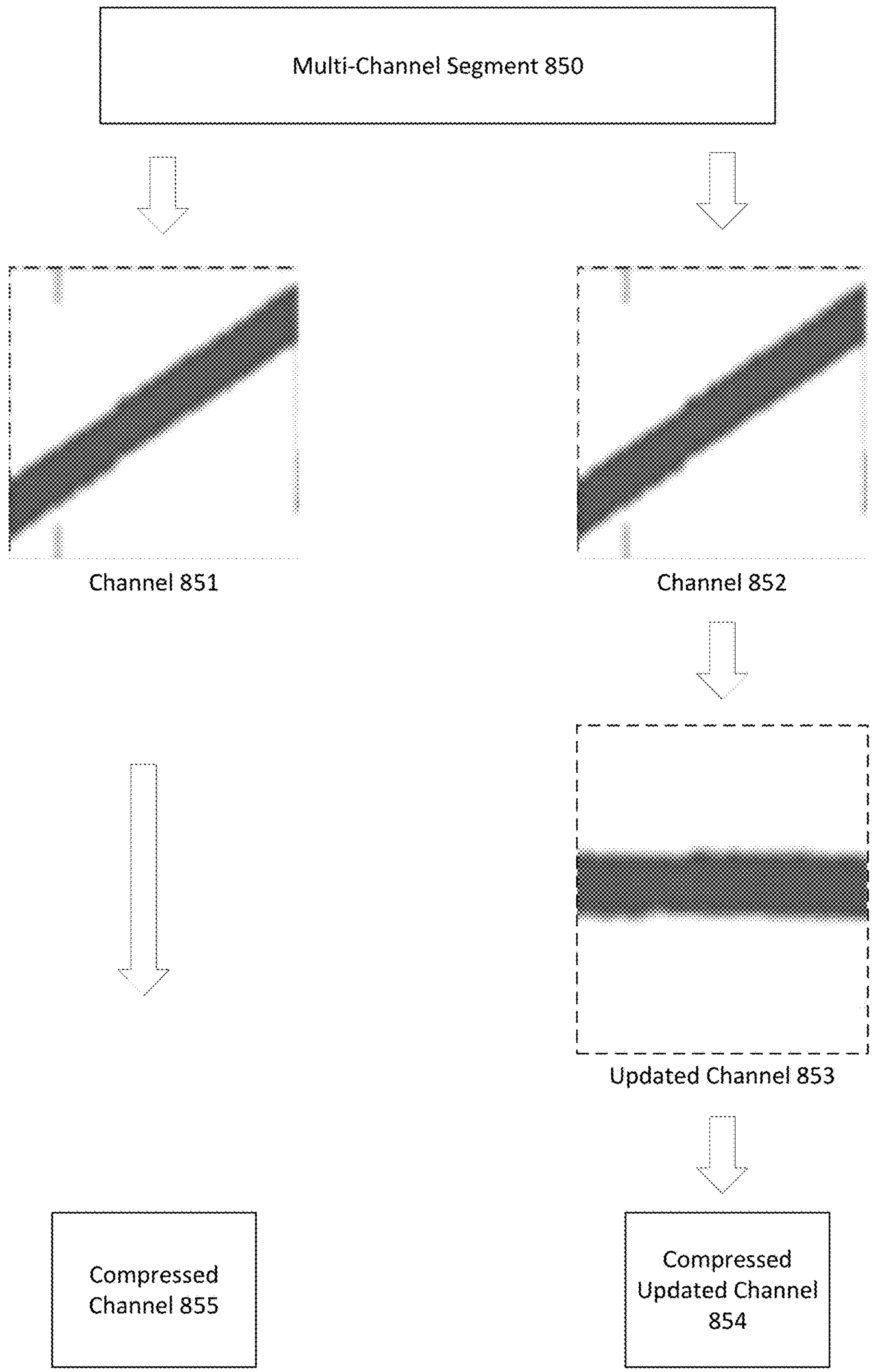
FIG. 8B depicts exemplary processing of multiple channels of storage system monitoring data, consistent with disclosed embodiments.

FIG. 8B depicts exemplary processing of multiple channels of storage system monitoring data, consistent with disclosed embodiments. In this example, monitoring system 100 can obtain a segment of storage system monitoring data including multiple channels (e.g., multi-channel segment 850). Certain channels in the multi-channel monitoring data can exhibit similar behavior. For example, transactions on a storage system (e.g., storage system 110, or the like) can be distributed across storage devices. Metric data for these storage devices may therefore vary in a similar manner. For example, when read and write transactions are balanced across a group of storage devices, read or write latencies (or other metrics) may vary similarly across multiple storage devices.

Consistent with disclosed embodiments, monitoring system 100 can be configured to use such similar behavior to improve compression of a segment. In some embodiments, monitoring system 100 can generate one or more updated channels based on the existing channels in the segment. Such updated channels may be more efficiently compressed, or may be suitable for compression techniques that cannot be used on the original channels. Monitoring system 100 can be configured to generate updated channels according to storage parameters. In some instances, such storage parameters can be received from another system. For example, a user can interact with user system 130 to provide storage parameters that specify how monitoring system 100 generates such updated channels. As may be appreciated, the user may provide such storage parameters based on the user's understanding of storage system 110. In some embodiments, monitoring system 100 can determine such storage parameters. For example, monitoring system 100 can determine that channels in obtained storage system monitoring data (or a segment thereof) satisfy a correlation condition (e.g., that a correlation between two channels exceeds some threshold, or the like).

In some embodiments, the updated channels can be functions of existing channels. For example, an updated channel can be a linear combination of a set of channels. In some embodiments, such an updated channel can be compressed in place of a channel in the set of channels used to generate the updated channel. In some embodiments, every original channel can be replaced with a corresponding updated channel.

In the example depicted in FIG. 8B, multi-channel segment 850 includes at least two channels, channel 851 and channel 852. These channels exhibit a common component (e.g., a steady increase in value) and a differing, high-frequency component. Monitoring system 100 can be configured to generate an updated channel 853 using channels 851 and 852. The updated channel can be a linear combination of channels 851 and 852 (e.g., channel 852 minus channel 851). In this manner, monitoring system 100 can remove the common component from updated channel 853.

Consistent with disclosed embodiments, monitoring system 100 can then compress updated channel 853 (and any remaining original channels, such as channel 851). In some embodiments, monitoring system 100 can determine a suitable compression technique, as described herein. In some instances, the compression technique used for the original channels can differ from the compression technique used for the updated channel (e.g., the compression technique used to generate compressed channel 854 from updated channel 853 can differ from the compression technique used to generate compressed channel 855 from channel 851).

In some instances, monitoring system 100 can receive a data request specifying an original channel. In order to reconstruct the specified channel, monitoring system 100 can reconstruct channels as necessary to generate the original channel. For example, given two original channels, A and B, monitoring system 100 can construct two updated channels C and D as:

$$C=(A+B)/2$$

$$D=(A-B)/2$$

Monitoring system 100 can then compress channels C and D. In response to a request for channel B, monitoring system 100 can reconstruct channels C and D and obtain channel B as:

$$B=C-D$$

Similarly, in response to a request for channel A, monitoring system 100 can reconstruct channels C and D and obtain channel A as:

$$A=C+D$$

In some embodiments, a compression technique applied by monitoring system 100 can combine and compress original channels into compressed updated channels, as described herein. For example, an audio compression technique can be configured to automatically (or when some condition is satisfied) combine channels in a 5.1 surround sound layout to exploit expected commonalities in these channels. When applying such a compression technique, monitoring system 100 can be configured to map channels in the obtained storage system monitoring data to channels in the 5.1 surround sound layout based on storage system parameters. Such storage system parameters can be received from another system or determined by monitoring system 100. Furthermore, such storage system parameters can reflect expected or observed commonalities in the channels of the obtained storage system monitoring data.

Figure 8C:
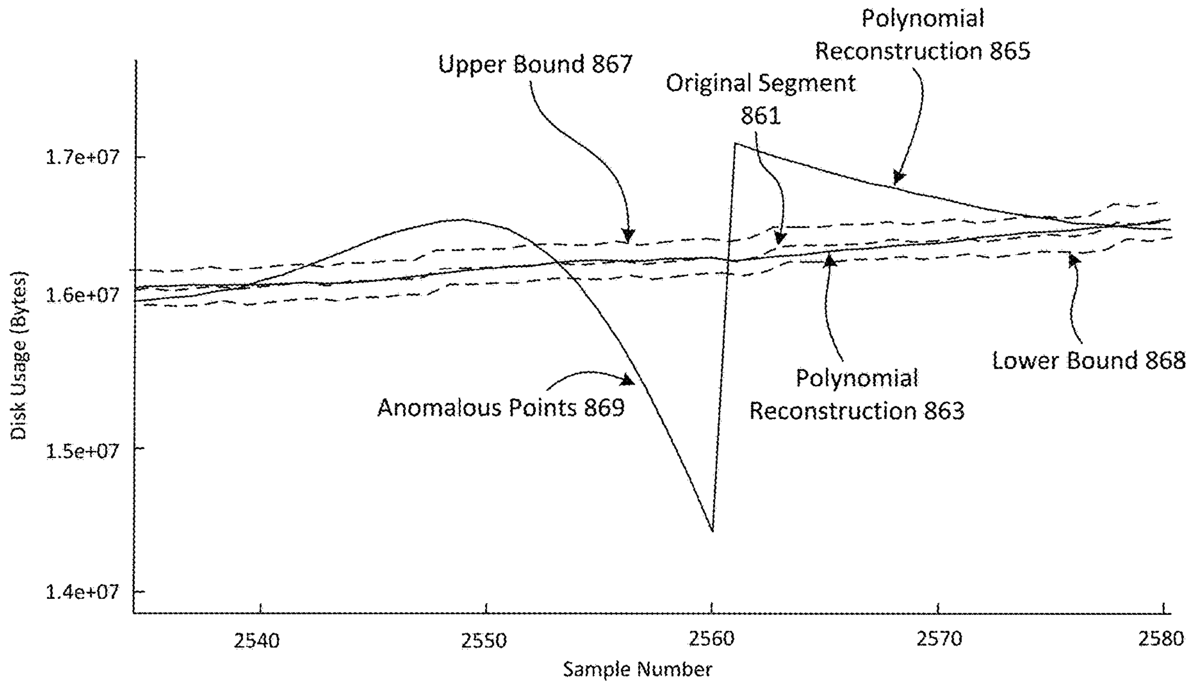
FIG. 8C depicts an example of an original segment and two reconstructed versions of the original segment, consistent with disclosed embodiments.

FIG. 8C depicts an example of an original segment (original segment 861) and two reconstructed versions (polynomial reconstruction 863 and FFT approximation 865) of the original segment, consistent with disclosed embodiments. The original segment depicts disk usage in bytes. The two reconstructed versions were generated from compressed segments generated using lossy compression techniques. Such reconstructed segments can include artifacts that affect a user's impression of the data. For example, the wide swings in the value of FFT approximation 865 erroneously appear to indicate changes in the behavior of the storage system.

Consistent with disclosed embodiments, reconstructed segments may exhibit anomalous values. For example, the value of a reconstructed segment may differ from the corresponding value of the original segment by more than some threshold amount. Or the first or second derivative of the reconstructed segment may differ from the corresponding first or second derivative of the original segment by more than some threshold amount. Such anomalous values may appear near the boundaries of segments, or where segments exhibit discontinuities in value. The appearance of anomalous values can also depend on compression techniques. For example, reconstructions of segments compressed using frequency domain techniques can exhibit jump discontinuities (e.g., Gibbs phenomenon, or the like).

Consistent with disclosed embodiments, monitoring system 100 can be configured to identify and remove anomalous values in the reconstructed segment. In some embodiments, monitoring system 100 can be configured to compare a reconstructed version of the compressed segment with the original segment. Monitoring system 100 can identify locations in the reconstructed version as anomalous based on the comparison. For example, given an original sequence X(n), a reconstructed sequence $\hat{X}(n)$, and an error threshold $\in$, monitoring system 100 can identify $\{n||(\hat{X}(n)-X(n)/X(n)|>\in\}$. In such embodiments, monitoring system 100 can identify values outside an upper bound (e.g., upper bound 867) or lower bound (e.g., lower bound 868) as being anomalous points (e.g., anomalous points 869).

In some embodiments, the error threshold E can be a function of position in the reconstructed sequence. For example, the error threshold can decrease towards the beginning and end of the segment. Such a decrease can support a smooth transition between reconstructed segments.

Depending on the compression technique, the order in which the compressed segment is generated, the reconstructed segment is generated, and the comparison is performed can vary. When using some compression techniques, monitoring system 100 may first generate the compressed segment and then generate the reconstructed segment and perform the comparison. For example, when a frequency-based compression technique is used, monitoring system 100 can select a portion of the frequency spectrum to include in the compressed segment. Monitoring system 100 can then generate a reconstructed segment using the selected portion of frequency spectrum. The reconstructed segment can be compared to the original segment to identify anomalous points. Alternatively, when using some compression techniques, monitoring system 100 may perform the comparison as part of generating the compressed segment. For example, when using a spline-interpolation based compression technique, monitoring system 100 can determine suitable control points by comparing the spline generated using such control points to the original segment. Thus, the determination of the compressed segment can be combined with the comparison of the original and reconstructed segment, and identification of anomalous points.

Consistent with disclosed embodiments, monitoring system 100 can store compression information that enables reconstruction of the original segment values. In some embodiments, such reconstruction can use the stored anomalous values. For example, the difference between the anomalous and original values may be stored, as the difference may be more compressible than the original value, or may permit use of a smaller datatype. In some embodiments, such reconstruction can be independent of the stored anomalous values. For example, the original values can be stored (e.g., in value-location pairs). Monitoring system 100 can replace the anomalous values with the original values at the appropriate location.

Figure 8D:
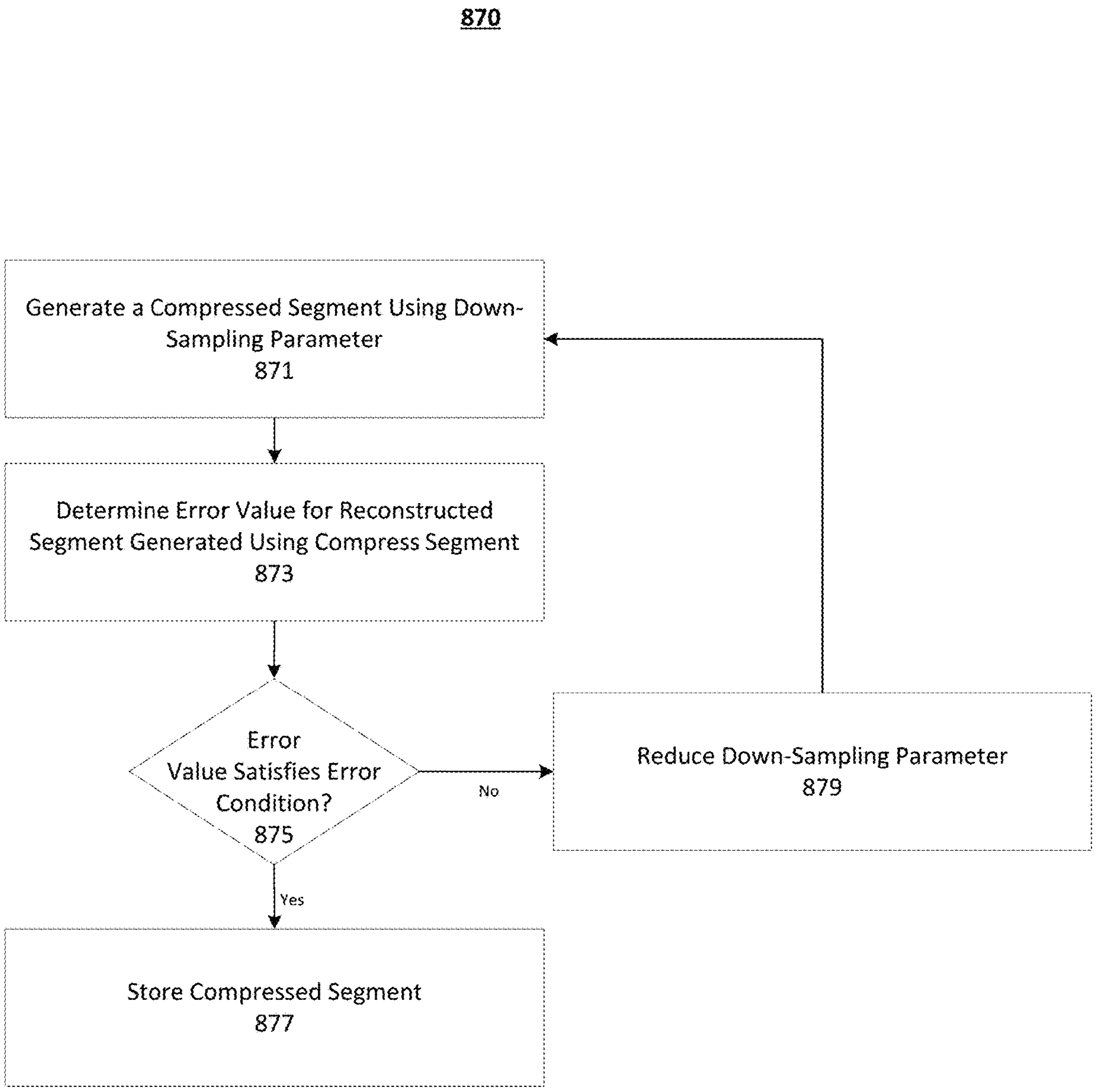
FIG. 8D depicts an exemplary process for compressing a segment using a frequency domain method, consistent with disclosed embodiments.

FIG. 8D depicts an exemplary process 870 for compressing a segment using a frequency domain method, such as an FFT or wavelet method, consistent with disclosed embodiments. Process 870 can be performed using a monitoring system (e.g., monitoring system 100, or the like) or another suitable system. In accordance with process 870, an original segment can be down-sampled and compressed. The monitoring system can determine whether a version of the original segment generated from the compressed segment satisfies an error condition. If so, the compressed segment can be stored in place of the original segment.

This process can be performed with or without using an antialiasing filter prior to down-sampling. Performing down-sampling without using antialiasing filtering may result in artifacts but such artifacts may be acceptable given the nature and intended use of the data. Furthermore, monitoring system 100 can be configured to address artifacts using stored anomalous points, are described herein, or the like. As may be further appreciated, this process can be performed in addition to or as an alternative to methods that filter out higher frequencies in the compressed segment.

In step 871 of process 870, monitoring system 100 can down-sample a segment according to a down-sampling parameter. Monitoring system 100 can then compress the down-sampled segment using the frequency domain method to generate a compressed segment.

In step 873 of process 870, monitoring system 100 can determine an error value for a reconstructed segment generated using the compressed segment. For example, monitoring system 100 can generate such a reconstructed segment using the compressed segment. The sampling frequency of the reconstructed segment can match the sampling frequency of the original segment. As may be appreciated, such reconstruction can include using an interpolation or sample-and-hold filter to up-sample a time-domain version of the compressed segment. Alternatively or additional, the compressed segment can be stored with information enabling the compressed segment to be padded out to an appropriate length (e.g., by appending zero values, or the like) to generate the reconstructed segment.

Such reconstruction can also use additional techniques described herein, such as stored anomalous values, or the like. Monitoring system 100 can then determine the error value based on the difference between the original and reconstructed segment (e.g., a total or average mean-squared error value, a greatest difference error value, or another suitable error value).

In step 875 of process 870, monitoring system 100 can determine whether the error value satisfies an error condition. For example, the error condition can be satisfied when the error value is less than a threshold value, which may be fixed or may depend on the original or compressed segment. Should the error value satisfy the error condition, process 870 can proceed to step 877, otherwise process 870 can proceed to step 879.

In step 877 of process 870, monitoring system 100 can store the compressed segment as described herein.

In step 879 of process 870, monitoring system 100 can reduce the down-sampling parameter and return to step 871. In this manner, monitoring system 100 can obtain a balance between data compression and fidelity to the original signal.

Figure 8E:
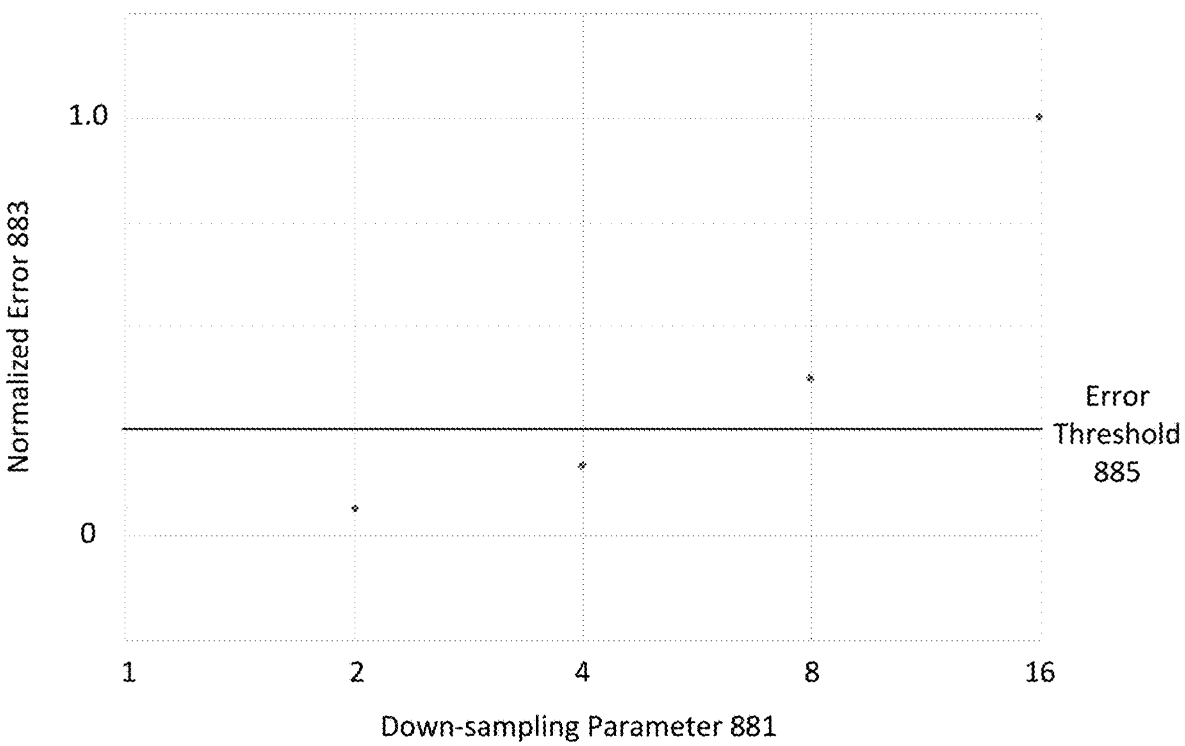
FIG. 8E depicts a graph showing a hypothetical application of the process of FIG. 8D, consistent with disclosed embodiments.

FIG. 8E depicts a graph 880 showing a hypothetical application of process 870, consistent with disclosed embodiments. The base-two logarithmic X axis 881 corresponds to the down sampling parameter, while the linear Y axis 883 corresponds to a normalized error value (e.g., normalized to the error value achieved for a down-sampling parameter value of 16). In this example, the monitoring system generates compressed segments and corresponding error values for four down-sampling parameter values (2, 4, 8, 18). As the magnitude of the down-sampling parameter decreases from 16 to 2, the error value also decreases. While four values are shown, in some embodiments monitoring system 100 may cease generating additional compressed segments and corresponding error values once the error value satisfies an error condition (e.g., falls below error threshold 885). Instead, the compressed segment that satisfies the error condition can be stored, as described herein.

Figure 9:
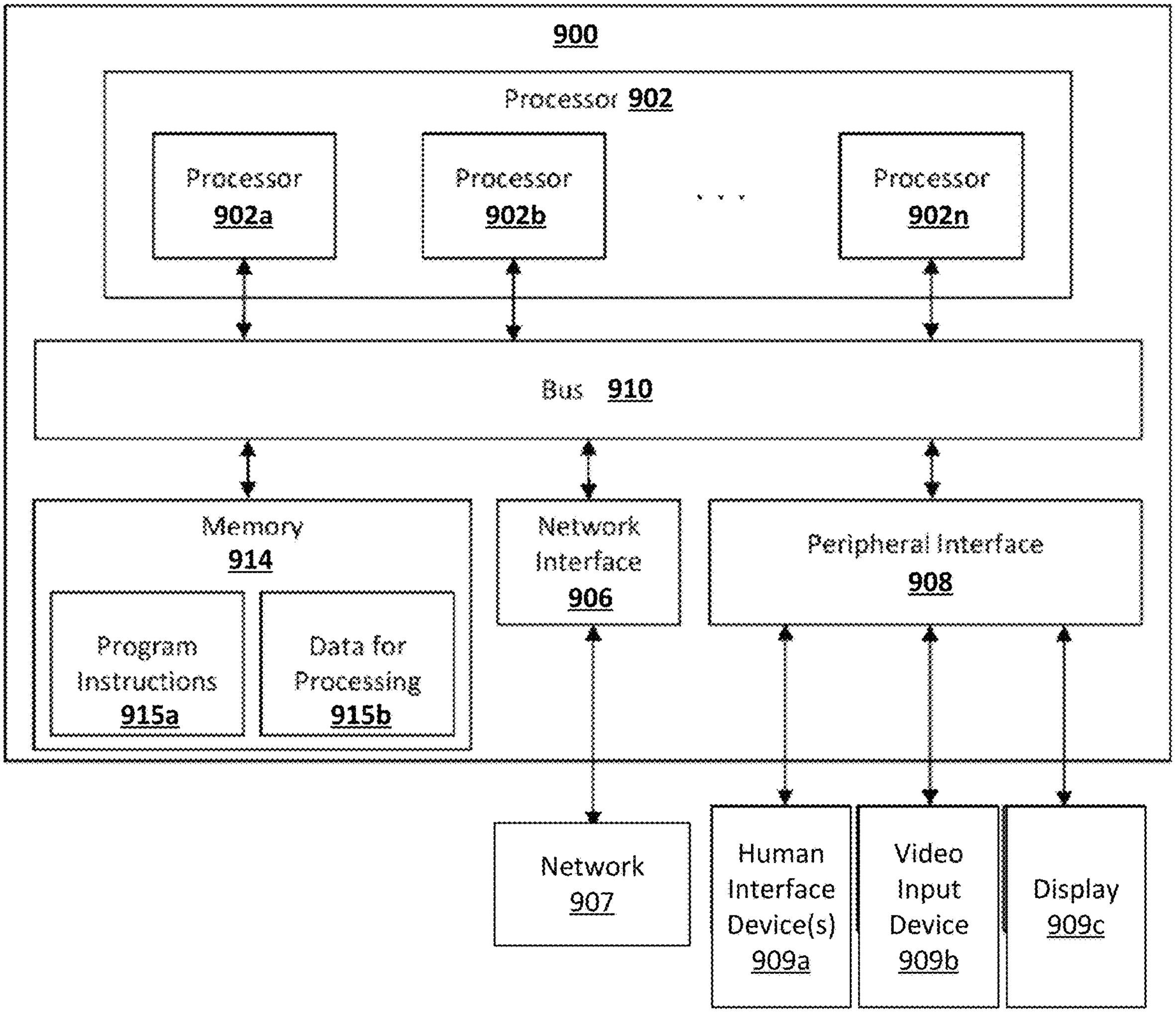
FIG. 9 is a block diagram of an exemplary server that may be used to perform the functions of a system depicted in FIG. 1, consistent with disclosed embodiments.

FIG. 9 is a block diagram of an exemplary server 900 that may be used to perform the functions of a system depicted in FIG. 1 (e.g., monitoring system 100, storage system 110, user system 130, or the like), consistent with some embodiments of the present disclosure.

As shown in FIG. 9, server 900 can include a processor 902, which can be any type of circuitry capable of manipulating or processing information. As may be appreciated, processor 902 can be implemented entirely as hardware, or as a combination of software, hardware, or firmware. In addition, processor 902 can be a single independent module or can be combined entirely or partially into any other component of the server 900. For example, processor 902 can include any combination of any number of a central processing unit ("CPU"), a graphics processing unit ("GPU"), a programmable logic controller, a microcontroller, a microprocessor, a digital signal processor, an intellectual property (IP) core, a Complex Programmable Logic Device (CPLD), a Field-Programmable Gate Array (FPGA), a System On Chip (SoC), an Application-Specific Integrated Circuit (ASIC), or the like. In some embodiments, processor 902 can also be a set of processors grouped as a single logical component. For example, as shown in FIG. 9, processor 902 can include multiple processors (e.g., a set of processors including processor 902*a*, processor 902*b*, and up to processor 902*n*).

Server 900 can also include a memory 914 configured to store data (e.g., a set of instructions, computer codes, intermediate data, or the like). For example, as shown in FIG. 9, the stored data can include program instructions 915*a* and data for processing 915*b*. Processor 902 can access program instructions 915*a* and data for processing 915*b* (e.g., via a bus 910), and execute the program instructions 915*a* to perform operation(s) on data for processing 915*b*. Memory 914 can include a high-speed random-access storage device or a non-volatile storage device. In some embodiments, memory 914 can include any combination of any number of a random-access memory (RAM), a read-only memory (ROM), an optical disc, a magnetic disk, a hard drive, a solid-state drive, a flash drive, a secure digital (SD) card, a memory stick, a compact flash (CF) card, or the like. Memory 914 can also be a group of memories (not shown in FIG. 9) grouped as a single logical component.

Bus 910 can be a communication device that transfers data between components within the server 900, such as an internal bus (e.g., a CPU-memory bus), an external bus (e.g., a universal serial bus port, a peripheral component interconnect express port), or the like.

Server 900 can further include a network interface 906 to provide wired or wireless communication with a network 907 (e.g., the Internet, an intranet, a local area network, a mobile communications network, or the like). In some embodiments, network interface 906 can include any combination of any number of a network interface controller (NIC), a radio frequency (RF) module, a transponder, a transceiver, a modem, a router, a gateway, a wired network adapter, a wireless network adapter, a near-field communication ("NFC") adapter, a cellular network chip, or the like.

In some embodiments, optionally, server 900 can further include a peripheral interface 908 to provide a connection to one or more peripheral devices. As shown in FIG. 9, the peripheral devices can include, but are not limited to, a human interface device(s) 909*a* (e.g., a mouse, a touchpad, a keyboard, a touchscreen, or some combination of the foregoing), a display 909*c* (e.g., a liquid crystal display, a light-emitting diode display, or another suitable display), a video input device 909*b* (e.g., a video camera or the like), or the like.

Exemplary Implementation and Results

Figure 10:
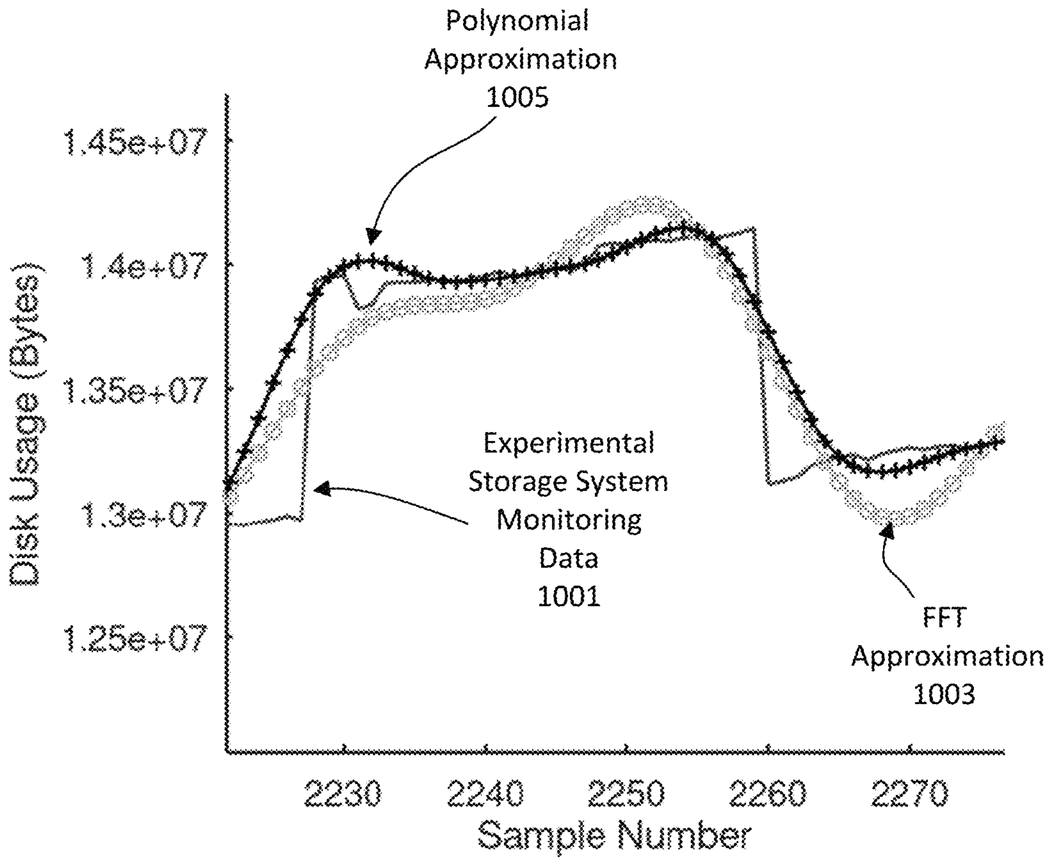
FIG. 10 depicts a time plot of experimentally obtained storage system monitoring data from the computing cluster and two reconstructed version of the same, consistent with disclosed embodiments.

A monitoring system consistent with disclosed embodiments was configured to manage storage system data obtained from a computing cluster. FIG. 10 depicts a time plot of experimentally obtained storage system monitoring data 1001 (e.g., disk usage) from the computing cluster and two reconstructed version of the same, consistent with disclosed embodiments. A first reconstructed version was generated from a segment compressed using an FFT technique (FFT approximation 1003), while a second reconstructed version was generated using a segment compressed using a polynomial approximation technique (polynomial approximation 1005). In this exemplary implementation, the monitoring system was able to achieve compression ratios up to 880 times, approximately an order of magnitude greater compression than conventional techniques, while limiting the error between the compressed and original storage data values.

In this exemplary implementation, the monitoring system comprised a server configured as a read and write backend for an instance of PROMETHEUS, an open-source systems monitoring platform. The PROMETHEUS instance was configured to collects metrics from an INSTACLUSTER 57-node CASSANDRA cluster with a PROMETHEUS endpoint enabled. Storage system metric data was collected at the node level and forwarded to the PROMETHEUS instance. The server obtained the storage system metric data for the cluster from the PROMETHEUS instance.

The server collected storage system metric data for 18 hours over a two-day period. Metric values were measured at $1/20$ Hz per channel per node, resulting in 5432 measurements per channel per node. A total of 14386 channel were processed. Channels representing aggregations (e.g., histograms) were disregarded, reducing the total number of channels to 13950 and the total data size to 606,294,900 bytes.

The server was configured to segment and compress the obtained storage system monitoring data consistent with disclosed embodiments (e.g., the "Segment and Compress" method). The server was configured to implement a compressor and a reconstructor. In this implementation, the compressor was configured to compress each channel separately. Prior to compression, the compressor converted each channel into a sequence of values associated with time information. The server was configured to enable automatic selection of the compression technique used and to allow a maximum error rate of 3%.

Consistent with disclosed embodiments, the sequence of values was divided into segments using either a data value technique or a metadata technique. The metadata technique depended on the number of observations in the obtained sequence of values. Segments generated according to the metadata technique were sized for FFT processing and were $2^n3^m$ values in length. The data value technique depended on the values of a discrete wavelet transform of a portion of the sequence of values. When the magnitude of a high-frequency component of the discrete wavelet transform exceeded a threshold at a location in the sequence, a segment boundary would be placed at or near the location in the sequence (e.g., consistent with the segmentation approach described with regards to FIG. 4A).

Consistent with disclosed embodiments, the server was configured to use the metadata technique for some channels. For other channels, the server was configured to determine whether the data value technique identified segment boundaries within a portion of the sequence of values. If so, then the server segmented the sequence of values according to the identified segment boundaries. Otherwise, the server applied the metadata technique to generate segments sized for FFT processing.

Consistent with disclosed embodiments, each segment was compressed using a suitable compression technique. The server was configured with multiple strategies for mapping segments to compression techniques. According to a first strategy, the server selected an appropriate compression technique based on a statistical analysis of the segment. According to a second strategy, the server compressed a small (128 sample) subset of the segment using all available compression techniques. The server then selected a compression technique based on the compression achieved and a specified error allowance. In some instances, depending on the compression error allowed, reconstruction accuracy was traded off against compression ratio.

Consistent with disclosed embodiments, the server was configured to store compression information in the compressed segment. The compressed segments included a header containing the compression information. The compression information included the compression technique used (1 byte), the minimum and maximum value in the segment (4 bytes each), compression technique parameters (e.g., FFT frequencies) for reconstructing the segment, and any error correction points.

The server was configured to use a run-length encoding compression technique, FFT compression technique, spline interpolation technique, inverse distance weighting technique, or linear predictive coding technique. The run-length encoding technique involved replacing a constant signal with the value of the constant signal and the number of samples in the signal.

Figure 11:
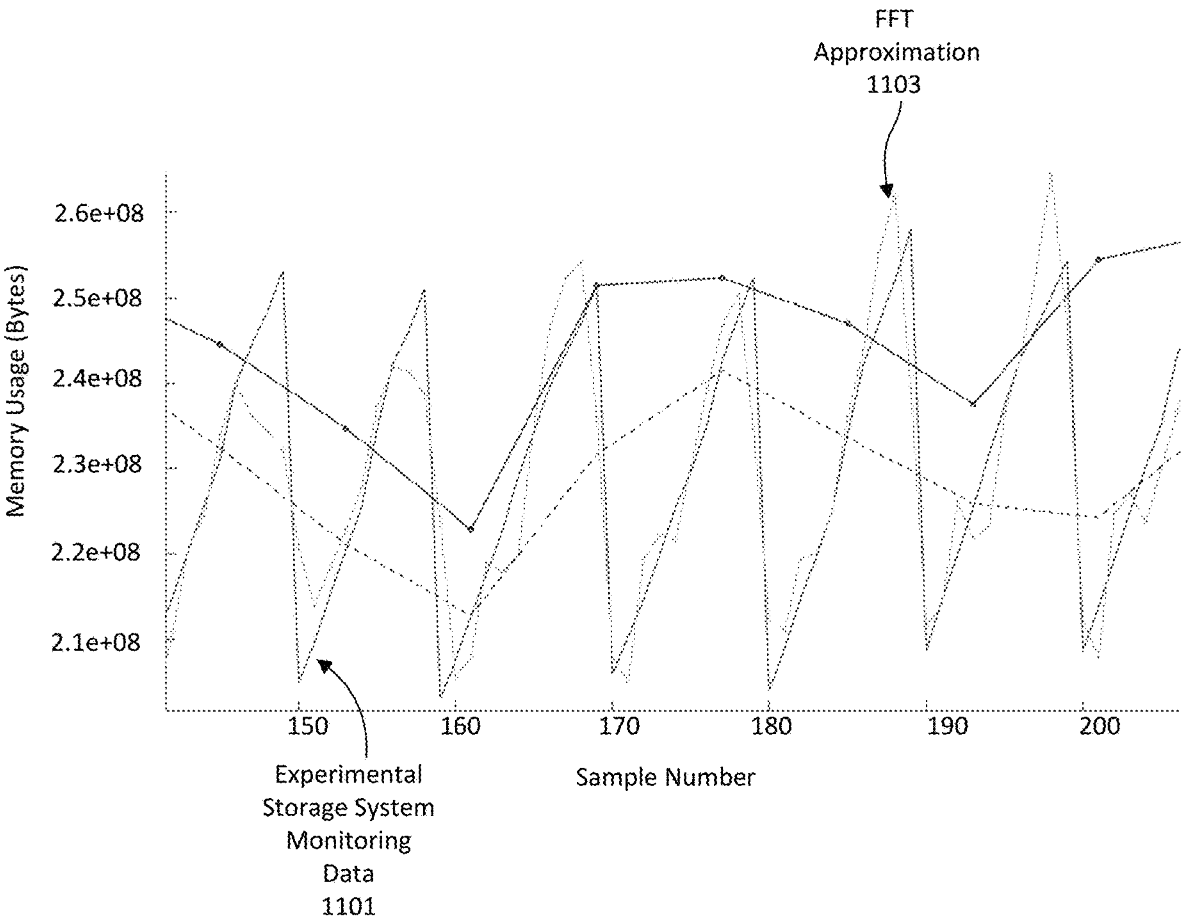
FIG. 11 depicts a comparison between experimentally obtained storage system monitoring data and reconstructed data compressed using lossy FFT compression, consistent with disclosed embodiments.

The FFT compression technique involved conversion of the signal to the frequency domain, selection of a subset of frequencies, and storing the selected frequencies and corresponding amplitudes. The number of frequencies selected depended on the error allowance. In this implementation, FFT compression was not suited for lossless compression, as the compression benefits achieved by storing only half the frequency spectrum was offset by the need to store each complex-valued frequency as a pair of floating-point values (even when the original segment contained non-floating-point data). However, a 10× compression ratio was achieved for lossy FFT compression (e.g., with a 1% to 3% error margin). Such compression ratios could be achieved by selecting only a subset of frequencies to store. To decompress, the Inverse FFT was applied on the available frequencies, zeroing out the missing frequencies. FIG. 11 depicts a comparison between experimentally obtained storage system monitoring data 1101 and reconstructed data 1103 compressed using lossy FFT compression, consistent with disclosed embodiments.

The spline interpolation compression technique used a mixture of linear interpolation and Catmull-Rom interpolation. Segments too short for Catmull-Rom interpolation were compressed using linear interpolation. The server was configured to determine control points contained in the segment that defined a spline (e.g., linear or Catmull-Rom) that satisfied an error condition. The error condition was based on the segment values and the spline values. The control points (e.g., value and index in the segment, or the like) were then stored in the compressed segment (e.g., as compression information). As may be appreciated, spline interpolation can support smaller datatypes than FFT compression. As described above, complex-valued FFT amplitudes were stored as pairs of floats (of some specified precision). In contrast, the control points-being data contained in the segment-had the same datatype as the segment (e.g., 8 bit integers or the like). As an additional benefit, when reconstructing the segment, the server can reconstruct only the requested datapoints using the spline. Because the server need not reconstruct the entire segment, the server can respond more rapidly to user requests, improving the performance of the system.

The inverse distance weighting compression technique provided an alternative to the spline compression technique. The inverse distance weighting technique tended to exhibit slower decompression times than the spline-based techniques, while exhibiting similar compression characteristics. The server was configured to use the inverse distance weighting technique only when manually selected by a user.

The linear predictive coding compression technique used was similar to FLAC encoding. Small precision and bounded signals were converted to integers, to enable use of linear predictive coding techniques. In practice, linear predictive coding compression techniques provided worse compression performance than FFT compression. Linear predictive coding was therefore only used when manually selected by a user or when lossless compression was specified. As described herein, lossless FFT compression was ineffective, while lossless linear predictive coding compression provided between 2× and 8× compression.

Consistent with disclosed embodiments, the server was configured to identify anomalous points having a mean absolute percentage error greater than an error threshold. The compression information stored in the compressed segment included the original locations of such anomalous points and the corresponding original values in the original segment. During reconstruction, the original values were used, at the original locations, in place of reconstructed values. This approach removes the biggest artifacts from the data and lowers the error rate of the signal. For lossy compression, a suitable selection of compression technique may avoid storing any point. In general, a tradeoff was observed, with more aggressive compression techniques requiring storage of more anomalous points. For lossless compression, point differences between generated and original values may be stored, or nearly all original point values may be stored, greatly reducing compression.

Consistent with disclosed embodiments, the server was configured to create a file for each channel. The file included a timestamp corresponding to the first sample in the file and a timestamp corresponding to the last timestamp in the file. The file includes entries corresponding to groups of consecutive samples. Each entry can include sample rate, a starting index, a number of samples, and a starting timestamp. As may be appreciated, when the sample rate changes or there is a discontinuity in the obtained storage system monitoring data, a new entry can be created to reflect the new sample rate or the new starting timestamp.

Consistent with disclosed embodiments, in the read path, a user could specify a timestamp range for a channel (e.g., "All the samples from 3:30 PM to 4:30 PM"). The server could locate a whether the requested timestamps were within the available timestamps in the file header. If found, the sequence of sample numbers was extracted, indicating the samples needed for decompression.

Consistent with disclosed embodiments, when a new sample was added, the index was updated. Since time progresses linearly, and samples occur in sequence, the system only needs to update the number of samples in the last entry or create a new entry. Existing entries are incremented if the sample timestamp is the next in sequence. If an entry does not exist or the timestamp is not the next in sequence for the latest entry, a new entry is created. This approach generated an index for managing variable rate sampling intervals.

Figure 12:
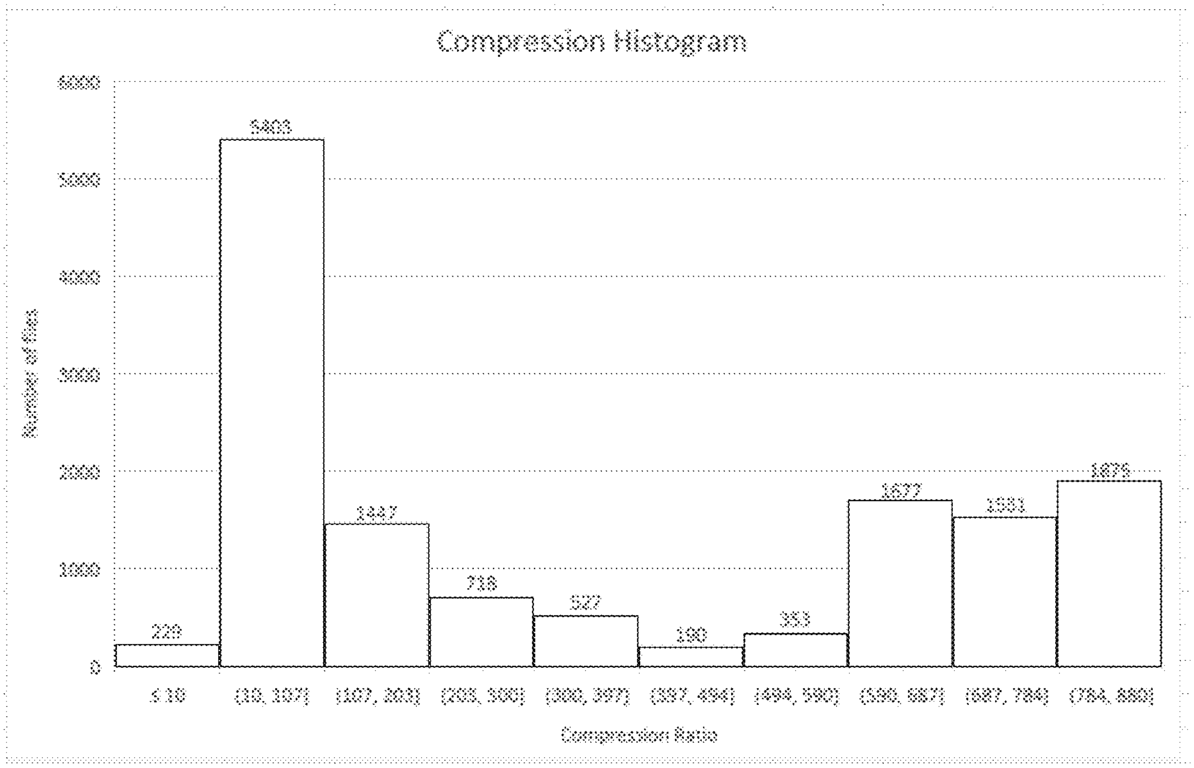
FIG. 12 depicts a compression ratio histogram showing the number of files falling into each compression ratio bin, consistent with disclosed embodiments.

The performance of the Segment and Compress method was benchmarked against two conventional methods (PROMETHEUS and LZ4). Results obtained in the compression tests are shown in Table I and FIG. 12. The Segment and Compress method achieved a compression ratio more than an order of magnitude greater than the conventional methods. The data overview in Table I provides a performance reference, while FIG. 12 depicts a compression ratio histogram showing the number of files falling into each compression ratio bin, consistent with disclosed embodiments. As can be observed, a substantial number of files exhibited compression ratios greater than 590×.

TABLE I

Benchmark Results of Compression Performance between a method consistent with disclosed embodiments (Segment and Compress) and two conventional methods (PROMETHEUS and LZ4).

| Method | Compressed Size (Bytes) | Compression Ratio |
|---|---|---|
| PROMETHEUS | 454,778,552 | 1.33 |
| LZ4 | 141,347,821 | 4.29 |
| Segment and Compress | 14,276,544 | 42.47 |

In this implementation, the Segment and Compress method achieved the greatest compression ratio when a segment could be represented losslessly by a parameterized model (e.g., a spline, or a value and number of repeats, or the like). In such instances, a sample can be represented by the parameterized model, a sample number, and timing information. In such instances, compression ratios greater than 3000× were achieved. Such instances were frequently observed during testing, as storage system monitoring data often includes infrequently changing metrics. Such infrequently changing metrics accounted for approximately 13% of the channels monitored during testing.

Figure 13A:
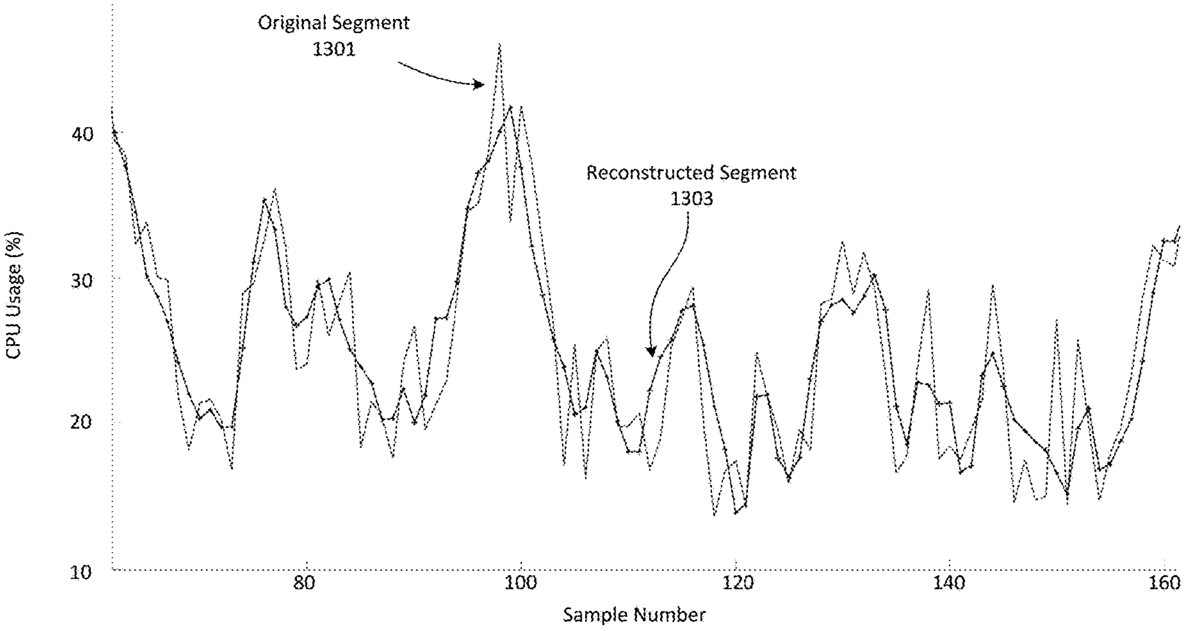
FIG. 13A depicts the reconstructed segment and the original segment for the metric "CPU usage" for a node of the cluster, consistent with disclosed embodiments.
Figure 13B:
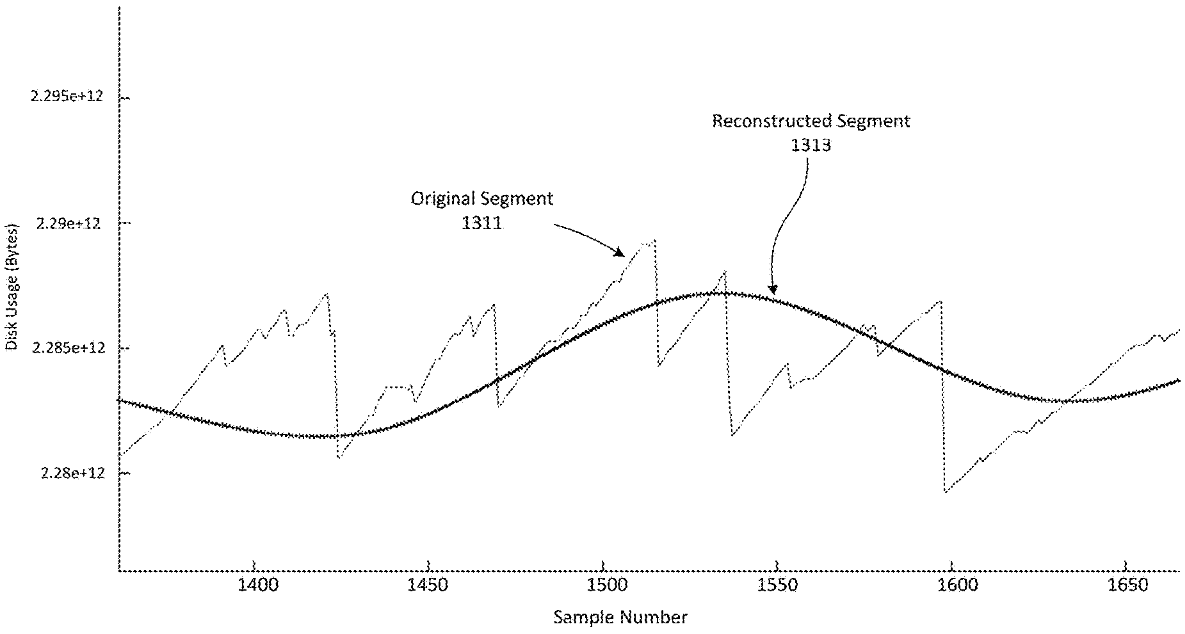
FIG. 13B depicts the reconstructed segment and the original segment for the metric "disk usage" for a node of the cluster, consistent with disclosed embodiments.
Figure 13C:
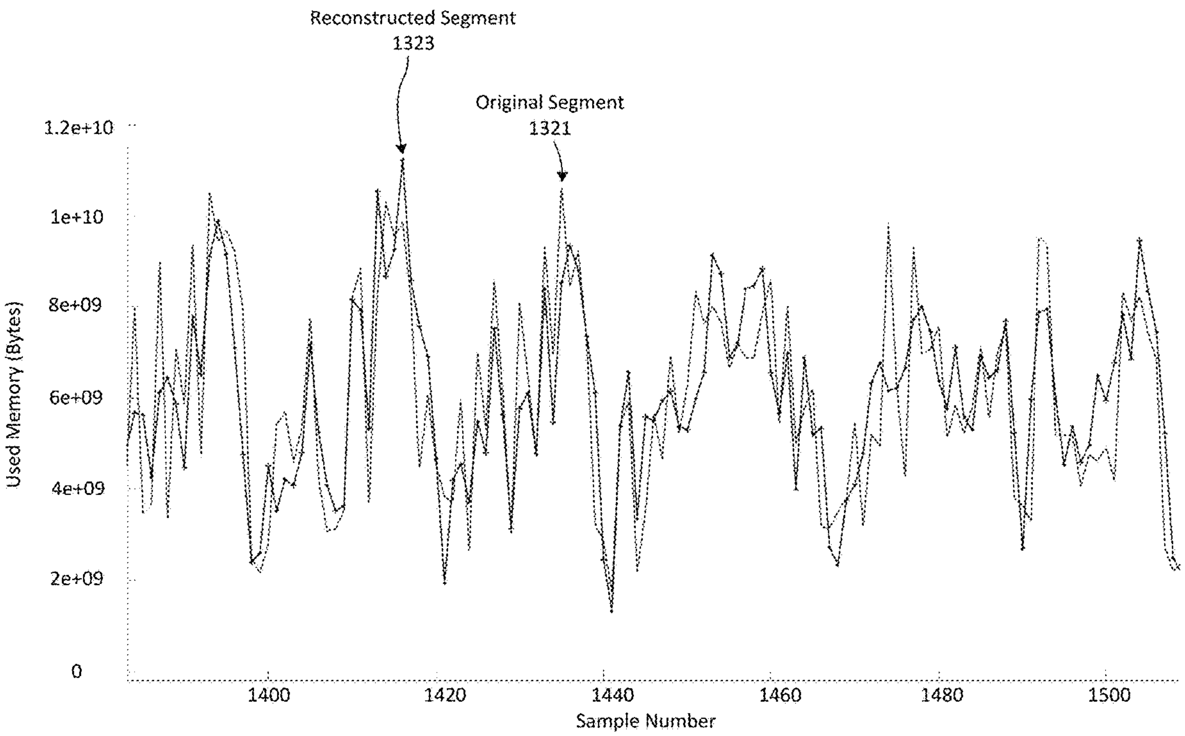
FIG. 13C depicts the reconstructed segment and the original segment for the metric "heap usage" for a node of the cluster, consistent with disclosed embodiments.

The results depicted in Table I and FIG. 12 were validated by reconstructing the compressed segments and comparing the reconstructed segment with the original segment. In the testing described herein, the compression parameters specified that the server automatically select the compression technique that provided the greatest degree of compression given a maximum allowed error. Accordingly, the server automatically selected lossy compression techniques. The degree of information loss varied significantly for different storage metrics. For example, FIG. 13A depicts the reconstructed segment 1303 and the original segment 1301 for the metric "CPU usage" for a node of the cluster, consistent with disclosed embodiments. The behavior of reconstructed segment 1303 appears similar to the behavior of original segment 1301, even though reconstructed segment 1303 was generated using a compressed segment with a compression ratio of 17×. As a further example, FIG. 13B depicts the reconstructed segment 1313 and the original segment 1311 for the metric "disk usage" for a node of the cluster, consistent with disclosed embodiments. In this example, a compression ratio of 146× was achieved at the expense of error less than 3%. As a further example, FIG. 13C depicts the reconstructed segment 1323 and the original segment 1321 for the metric "heap usage" for a node of the cluster, consistent with disclosed embodiments. Heap usage is a signal that is normally difficult to compress. However, the Segment and Compress method described herein was able to achieve a compression ratio of 18× while retaining, in reconstructed segment 1323, the appearance of original segment 1321.

In this implementation, compression ratios for a given storage system metric typically remained similar over time for a node performing the same task, or across nodes in a system that performed the same task. In some instances, nodes performing the same task exhibited significant differences in compression ratio some metrics (e.g., differences of 2 to 10 times worse compression). Upon analysis, the node exhibiting worse compression was found to be malfunctioning. In this implementation, the difference in compression metrics was detectable prior to detection using standard dev-ops diagnostic tools. The compression ratio therefore provided an alternative, superior diagnostic for identifying a malfunctioning node.

The above detailed description refers to the accompanying drawings. Wherever possible, the same reference numbers are used in the drawings and the above description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. For example, two steps shown in succession may, in fact, be executed substantially concurrently, or the steps may sometimes be executed in the reverse order, depending upon the functionality involved. Furthermore, the described embodiments are not mutually exclusive, and elements, components, materials, or steps described in connection with one example embodiment may be combined with, or eliminated from, other embodiments in suitable ways to accomplish desired design objectives. Accordingly, the present detailed description is not limited to the disclosed embodiments and examples. Instead, the proper scope is defined by the appended claims.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments. The term "exemplary" should not be construed as "preferred" or "advantageous compared to other examples" but rather "an illustration, an instance or an example."

Additionally, the articles "a" and "an" as used in the present disclosure and the appended claims should generally be construed to mean "one or more" unless specified otherwise or clear from context to be directed to a singular form. Furthermore, references to "at least one of a or b" should generally be construed to mean "a, b, or a and b" unless specified otherwise or clear from context.

The disclosed embodiments may further be described using the following clauses:

A1. A storage system monitoring method, comprising: obtaining storage system monitoring data; generating compressed storage system monitoring data segments, at least by: segmenting the storage system monitoring data into storage system monitoring data segments; and compressing the storage system monitoring data segments into the compressed storage system monitoring data segments using at least two compression techniques; and in response to a user query: identifying at least one compressed storage system monitoring data segment; and performing at least one of: reconstructing and providing a portion of the storage system monitoring data using the at least one compressed storage system monitoring data segment; or providing the at least one compressed storage system monitoring data segment for reconstruction of the portion of the storage system monitoring data.

A2. The storage system monitoring method of clause A1, wherein: the storage system monitoring data comprises at least one of a table metric, a message metric, a streaming metric, a compaction metric, a commit log metric, a storage metric, a hint metric, an index metric, a buffer pool metric, a client management metric, a batch metric, or a virtual machine metric.

A3. The storage system monitoring method of any one of clauses A1 to A2, wherein: segmenting the storage system monitoring data comprises: segmenting the storage system monitoring data based on at least one of segment size, number of data points, or segment duration.

A4. The storage system monitoring method of any one of clauses A1 to A2, wherein: segmenting the storage system monitoring data comprises: determining at least one of statistics of the storage system monitoring data, a frequency domain representation of the storage system monitoring data, or a wavelet domain representation of the storage system monitoring data.

A5. The storage system monitoring method of any one of clauses A1 to A2, wherein: segmenting the storage system monitoring data comprises: applying the storage system monitoring data to a machine learning model trained to segment the storage system monitoring data.

A6. The storage system monitoring method of any one of clauses A1 to A5, wherein: the method further comprises selecting one of the at least two compression techniques for one of the storage system monitoring data segments based on at least one of a range, standard deviation, distribution, number of zero-crossings, entropy, or mutual information of the one of the storage system monitoring data segments.

A7. The storage system monitoring method of any one of clauses A1 to A6, wherein: the method further comprises: generating, for one of the storage system monitoring data segments, multiple compressed storage system monitoring data segments using different ones of the at least two compression techniques; and selecting one of the multiple compressed storage system monitoring data segments for storage in a data store.

A8. The storage system monitoring method of any one of clauses A1 to A7, wherein: generating the compressed storage system monitoring data segments further comprises: determining a second storage system monitoring data segment matches a first storage system monitoring data segment; and associating the second storage system monitoring data segment with a compressed version of the first storage system monitoring data segment; identifying the at least one compressed storage system monitoring data segment comprises identifying the second storage system monitoring data segment based on a time associated with the user query and a time associated with the second storage system monitoring data segment; and reconstructing and providing the portion of the storage system monitoring data or providing the at least one compressed storage system monitoring data segment for reconstruction of the portion of the storage system monitoring data comprises: reconstructing, based on the association between the second storage system monitoring data segment and the compressed version of the first storage system monitoring data segment, the portion of the storage system monitoring data using the compressed version of the first storage system monitoring data segment.

A9. The storage system monitoring method of any one of clauses A1 to A8, wherein: the at least two compression techniques include at least one of polynomial approximation, frequency domain transformation, or audio encoding.

A10. The storage system monitoring method of any one of clauses A1 to A9, wherein: compressing the storage system monitoring data segments into the compressed storage system monitoring data segments using the at least two compression techniques comprises determining, and using, differing sets of compression techniques for different storage system monitoring data segments based on differing characteristics of the different storage system monitoring data segments.

A11. The storage system monitoring method of any one of clauses A1 to A10, wherein: compressing the storage system monitoring data segments into the compressed storage system monitoring data segments using the at least two compression techniques comprises compressing a one of the storage system monitoring data segments into multiple first compressed storage system monitoring data segments; and reconstructing and providing the portion of the storage system monitoring data or providing the at least one compressed storage system monitoring data segment for reconstruction of the portion of the storage system monitoring data comprises: reconstructing the first compressed storage system monitoring data segments; and recreating the one of the storage system monitoring data segments by combining the reconstructed first compressed storage system monitoring data segments.

A12. A system, comprising: at least one processor; and at least one non-transitory computer-readable medium containing instructions that, when executed by the at least one processor, cause the system to perform operations for monitoring a storage system comprising: obtaining multiple channels of storage system monitoring data for the storage system; generating compressed channel segments, at least by: segmenting the channels of the storage system monitoring data into channel segments; and compressing the channel segments into the compressed channel segments using at least two compression techniques; and in response to a user query: identifying at least one compressed channel segment; and performing at least one of: reconstructing and providing a portion of one of the multiple channels of the storage system monitoring data using the at least one compressed channel segment; or providing the at least one compressed channel segment for reconstruction of the portion of the one of the multiple channels of the storage system monitoring data.

A13. The system of clause A12, wherein: the multiple channels of the storage system monitoring data comprise at least one of a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

A14. The system of any one of clauses A12 to A13, wherein: a channel of the channels of the storage system monitoring data is segmented based on at least one of segment size, number of data points, or segment duration.

A15. The system of any one of clauses A12 to A13, wherein: segmenting the channels of the storage system monitoring data comprises: determining, for a one of the channels of the storage system monitoring data, at least one of statistics of the one of the channels, a frequency domain representation of the one of the channels, or a wavelet domain representation of the one of the channels.

A16. The system of any one of clauses A12 to A13, wherein: segmenting the channels of the storage system monitoring data comprises: applying the channels of the storage system monitoring data to a machine learning model trained to segment the channels of the storage system monitoring data.

A17. The system of any one of clauses A12 to A13, wherein: segmenting the channels of the storage system monitoring data comprises: applying respective channels of the storage system monitoring data to corresponding machine learning models trained to segment the respective channels of the storage system monitoring data.

A18. The system of any one of clauses A12 to A15 or A17, wherein: the channels of the storage system monitoring data are independently segmented.

A19. The system of any one of clauses A12 to A18, wherein: generating the compressed channel segments further comprises selecting one of the at least two compression techniques for compressing one of the channel segments based on at least one of a range, standard deviation, distribution, number of zero-crossings, entropy, or mutual information of the one of the channel segments.

A20. The system of any one of clauses A12 to A19, wherein: generating the compressed channel segments further comprises independently selecting ones of the at least two compression techniques for the channel segments.

A21. The system of any one of clauses A12 to A20, wherein: generating the compressed channel segments further comprises generating an additional channel segment using a one of the channel segments and at least one remaining channel segment of the channel segments; compressing the channel segments into the compressed channel segments comprises compressing the additional channel segment in place of the one of the channel segments; and reconstructing and providing the portion of the one of the multiple channels of the storage system monitoring data or providing the at least one compressed channel segment comprises:

reconstructing the additional channel segment and the at least one remaining channel segment; and recreating the one of the channel segments using the reconstructed additional channel segment and the reconstructed at least one remaining channel segment.

B1. A storage system monitoring method, comprising: obtaining storage system monitoring data; generating a segment by applying the storage system monitoring data to a machine learning model trained to segment the storage system monitoring data; generating a compressed segment by applying a specified compression technique to the segment; receiving a user query from a user system, the user query specifying a portion of the storage system monitoring data; in response to the user query, performing at least one of: reconstructing and providing the portion using the compressed segment; or providing the compressed segment for reconstruction of the portion.

B2. The storage system monitoring method of clause B1, wherein: the machine learning model is additionally trained to specify the compression technique applied to the segment.

B3. The storage system monitoring method of any one of clauses B1 to B2, wherein: the machine learning model is trained to indicate segment boundaries between segments.

B4. The storage system monitoring method of any one of clauses B1 to B3, wherein: the machine learning model comprises at least one neural network model; gradient boosting, decision tree, or random-forest model; or naive Bayes model.

B5. The storage system monitoring method of any one of clauses B1 to B4, wherein: the specified compression technique includes at least one of polynomial approximation, frequency domain transformation, or audio encoding.

B6. The storage system monitoring method of any one of clauses B1 to B5, wherein: the storage system monitoring data includes CPU I/O wait time, CPU Guest Usage, CPU usage, System Status, number of connected clients, network usage, memory usage, disk usage, read latency, write latency, or operating system load.

B7. The storage system monitoring method of any one of clauses B1 to B6, wherein: the method further comprises: obtaining second storage system monitoring data; and generating a reference to the compressed segment by applying the second storage system monitoring data to the machine learning model; and receiving a second user query, the second user query specifying a portion of the second storage system monitoring data; in response to the second user query, performing at least one of: reconstructing and providing the portion of the second storage system monitoring data using reference and the compressed segment; or providing the compressed segment for reconstruction of the portion of the second storage system monitoring data.

B8. A monitoring system, comprising: at least one processor; and at least one computer-readable medium containing instructions that, when executed by the at least one processor, cause the monitoring system to perform operations, comprising: obtaining multiple channels of storage system monitoring data for a storage system; generating a channel segment by applying at least one of the multiple channels to at least one machine learning model trained to segment the storage system monitoring data; generating a compressed channel segment by applying a specified compression technique to the channel segment; in response to a user query: identifying the compressed channel segment; and performing at least one of: reconstructing and providing a portion of one of the multiple channels of the storage system monitoring data using the compressed channel segment; or providing the compressed channel segment for reconstruction of the portion of the one of the multiple channels of the storage system monitoring data.

B9. The monitoring system of clause B8, wherein: the multiple channels of the storage system monitoring data comprise at least one of a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

B10. The monitoring system of any one of clauses B8 to B9, wherein: generating the channel segment by applying the at least one of the multiple channels to the at least one machine learning model trained to segment the storage system monitoring data comprises: generating a set of channel segments by applying each one of the multiple channels to a corresponding machine learning model trained to indicate segment boundaries between segments of the one of the multiple channels.

B11. The monitoring system of any one of clauses B8 to B9, wherein: generating the channel segment by applying the at least one of the multiple channels to the at least one machine learning model trained to segment the storage system monitoring data, comprises: generating the channel segment by applying the multiple channels to a machine learning model trained to indicate segment boundaries between segments of the multiple channels based on values of the multiple channels.

B12. The monitoring system of any one of clauses B8 to B9, wherein: the channel segment includes a first channel and remainder channels; and generating the channel segment by applying the at least one of the multiple channels to the at least one machine learning model trained to segment the storage system monitoring data, comprises: generating a segment boundary by applying the first channel to a machine learning model trained to indicate segment boundaries between segments of the first channel; and generating the channel segment by segmenting the first channel and the remainder channels using the segment boundary.

B13. The monitoring system of any one of clauses B8 to B9, wherein: the multiple channels of the storage system monitoring data are independently segmented.

B14. The monitoring system of any one of clauses B8 to B13, wherein: the at least one machine learning model comprises at least one neural network model; gradient boosting, decision tree, or random-forest model; or naive Bayes model.

B15. The monitoring system of any one of clauses B8 to B14, wherein: the specified compression technique includes at least one of polynomial approximation, frequency domain transformation, or audio encoding.

B16. The monitoring system of any one of clauses B8 to B5, wherein: generating the compressed channel segment further comprises generating at least one updated channel, the updated channel being a function of ones of the multiple channels and being compressed in place of one of the multiple channels.

B17. A non-transitory, computer-readable medium containing instructions that, when executed by at least one processor of a system, cause the system to perform monitoring operations, comprising: obtaining storage system monitoring data; generating a segment by applying the storage system monitoring data to a machine learning model trained to indicate segment boundaries between segments, the machine learning model including at least one of a neural network model; gradient boosting, decision tree, or random-forest model; or naive Bayes model; generating a compressed segment by applying at least one of a polynomial approximation, frequency domain transformation, or audio encoding technique to the segment; receiving a user query from a user system, the user query specifying a portion of the storage system monitoring data; in response to the user query, performing at least one of: reconstructing and providing the portion using the compressed segment; or providing the compressed segment for reconstruction of the portion.

B18. The non-transitory, computer-readable medium of clause 17, wherein: the machine learning model is additionally trained to specify the at least one of the polynomial approximation, the frequency domain transformation, or the audio encoding technique applied to the segment.

B19. The non-transitory, computer-readable medium of any one of clauses B17 to B18, wherein: the storage system monitoring data includes CPU I/O wait time, CPU Guest Usage, CPU usage, System Status, number of connected clients, network usage, memory usage, disk usage, read latency, write latency, or operating system load.

B20. The non-transitory, computer-readable medium of any one of clauses B17 to B19, wherein: the storage system monitoring data includes multiple channels of metric data; and the segment includes the multiple channels and is segmented based on values of one or more of the channels.

C1. A storage system monitoring method, comprising: obtaining compression information for a compressed segment generated from a segment of storage system monitoring data; generating a predicted portion of storage system monitoring data using the compression information; obtaining an additional portion of storage system monitoring data, the additional portion contiguous to the segment of storage system monitoring data; determining the predicted portion matches the additional portion and combining the additional portion and the compressed segment; and in response to a user query, performing at least one of: reconstructing and providing the additional portion using the compressed segment; or providing the compressed segment for reconstruction of the additional portion.

C2. The storage system monitoring method of clause C1, wherein: the additional portion of storage system monitoring data includes a batch of observations.

C3. The storage system monitoring method of any one of clauses C1 to C2, wherein: the generation of the compressed segment included preprocessing an obtained original portion of storage system data; and the method further includes, prior to determining the predicted portion matches the additional portion, preprocessing the additional portion of storage system monitoring data.

C4. The storage system monitoring method of any one of clauses C1 to C3, wherein: generating the predicted portion of storage system monitoring data using the compression information comprises: reconstructing the compressed segment using the compression information; and generating the predicted portion based on the reconstruction of the compressed segment.

C5. The storage system monitoring method of any one of clauses C1 to C4, wherein: the compression information specifies a parameterized formula that relates compressed segment indices to compressed segment values; and the predicted portion of storage system monitoring data is generated using the parameterized formula.

C6. The storage system monitoring method of any one of clauses C1 to C5, wherein: determining the predicted portion matches the additional portion comprises determining a function of a difference between the predicted portion and the additional portion.

C7. The storage system monitoring method of clause C6, wherein: the function comprises a weighted or unweighted L2 norm, L1 norm, L-infinity norm, mean squared error, or Manhattan distance.

C8. The storage system monitoring method of any one of clauses C1 to C7, wherein: combining the additional portion and the compressed segment comprises updating time information for the compressed segment to reference the addition portion.

C9. The storage system monitoring method of any one of clauses C1 to C8, wherein: the storage system monitoring data includes CPU I/O wait time, CPU Guest Usage, CPU usage, System Status, number of connected clients, network usage, memory usage, disk usage, read latency, write latency, or operating system load.

C10. The storage system monitoring method of any one of clauses C1 to C9, wherein: the compression information indicates that the segment of storage system monitoring data was compressed using polynomial approximation, linear predictive coding, or a frequency domain compression technique.

C11. A monitoring system, comprising: at least one processor; and at least one computer readable medium containing instructions that, when executed by the at least one processor, cause the monitoring system to perform operations comprising: obtaining compression information for a compressed segment generated from a segment of storage system monitoring data; generating a predicted portion of storage system monitoring data using the compression information; obtaining an additional portion of storage system monitoring data, the additional portion contiguous to the segment of storage system monitoring data; determining the predicted portion matches the additional portion and combining the additional portion and the compressed segment; and in response to a user query, performing at least one of: reconstructing and providing the additional portion using the compressed segment; or providing the compressed segment for reconstruction of the additional portion.

C12. The system of clause C11, wherein: the generation of the compressed segment included preprocessing an obtained original portion of storage system data; and the operations further include, prior to determining the predicted portion matches the additional portion, preprocessing the additional portion of storage system monitoring data.

C13. The system of any one of clauses C11 to C12, wherein: generating the predicted portion of storage system monitoring data using the compression information comprises: reconstructing the compressed segment using the compression information; and generating the predicted portion based on the reconstruction of the compressed segment.

C14. The system of any one of clauses C11 to C13, wherein: the compression information specifies a parameterized formula that relates compressed segment indices to compressed segment values; and the predicted portion of storage system monitoring data is generated using the parameterized formula.

C15. The system of any one of clauses C11 to C14, wherein: determining the predicted portion matches the additional portion comprises determining a function of a difference between the predicted portion and the additional portion, the function comprising a weighted or unweighted L2 norm, L1 norm, L-infinity norm, mean squared error, or Manhattan distance.

C16. The system of any one of clauses C11 to C15, wherein: combining the additional portion and the compressed segment comprises updating time information for the compressed segment to reference the addition portion.

C17. The system of any one of clauses C11 to C16, wherein: the storage system monitoring data includes a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

C18. A non-transitory, computer-readable medium containing instructions that, when executed by at least one processor of a system, cause the system to perform operations comprising: obtaining compression information for a compressed segment generated from a segment of storage system monitoring data; generating a predicted portion of storage system monitoring data using the compression information; obtaining an additional portion of storage system monitoring data, the additional portion including a batch of observations and being contiguous to the segment of storage system monitoring data; determining the predicted portion matches the additional portion and combining the additional portion and the compressed segment; and in response to a user query, performing at least one of: reconstructing and providing the additional portion using the compressed segment; or providing the compressed segment for reconstruction of the additional portion.

C19. The non-transitory, computer-readable medium of clause 18, wherein: the segment of storage system monitoring data is compressed using polynomial approximation, linear predictive coding, or frequency domain compression, the compression information specifies a parameterized formula that relates compressed segment indices to compressed segment values; and the predicted portion of storage system monitoring data is generated using the parameterized formula.

C20. The non-transitory, computer-readable medium of any one of clauses C18 to C19, wherein: determining the predicted portion matches the additional portion comprises determining a function of a difference between the predicted portion and the additional portion, the function comprising a weighted or unweighted L2 norm, L1 norm, L-infinity norm, mean squared error, or Manhattan distance.

C21. The non-transitory, computer-readable medium of any one of clauses C18 to C20, wherein: combining the additional portion and the compressed segment comprises updating time information for the compressed segment to reference the addition portion.

D1. A storage system monitoring method, comprising: obtaining a segment of storage system monitoring data; generating a compressed segment from the segment and a reconstructed segment from the compressed segment; identifying locations in the segment based on a comparison of the segment and the reconstructed segment; determining values for the identified locations; receiving a user query from a user system, the user query indicating a portion of the segment; in response to the user query, performing at least one of: reconstructing and providing the portion using the identified locations, the determined values for the identified locations, and the compressed segment; or providing the identified locations, the determined values for the identified locations, and the compressed segment for reconstruction of the portion.

D2. The method of clause D1, wherein: the locations are identified based on a difference between: the values, first derivative, or second derivative of the segment and corresponding values, first derivative, or second derivative of the reconstructed segment.

D3. The method of clause D2, wherein: the locations are identified based on a position-dependent threshold.

D4. The method of any one of clauses D1 to D3, wherein: the values for the identified locations are the values of the segment at the locations, or the values for the identified locations are based on the values of the segment at the locations and corresponding values of the reconstructed segment at the locations.

D5. The method of any one of clauses D1 to D4, wherein: the compressed segment is generated using a lossy compression method.

D6. The method of any one of clauses D1 to D5, wherein: the compressed segment is generated using at least one of polynomial approximation, frequency domain transformation, or audio encoding.

D7. The method of any one of clauses D1 to D6, wherein: the storage system monitoring data includes CPU I/O wait time, CPU Guest Usage, CPU usage, System Status, number of connected clients, network usage, memory usage, disk usage, read latency, write latency, or operating system load.

D8. The method of any one of clauses D1 to D8, wherein: the identification of the locations occurs during the generation of the compressed segment.

D9. A monitoring system, comprising: at least one processor; and at least one computer-readable medium containing instruction that, when executed by the at least one processor, cause the monitoring system to perform operations comprising: obtaining a segment of storage system monitoring data; generating a compressed segment from the segment and a reconstructed segment from the compressed segment; identifying locations in the segment based on a comparison of the segment and the reconstructed segment; determining values for the identified locations; receiving a user query from a user system, the user query indicating a portion of the segment; in response to the user query, performing at least one of: reconstructing and providing the portion using the identified locations, the determined values for the identified locations, and the compressed segment; or providing the identified locations, the determined values for the identified locations, and the compressed segment for reconstruction of the portion.

D10. The monitoring system of clause D9, wherein: the locations are identified based on a difference between: the values, first derivative, or second derivative of the segment and corresponding values, first derivative, or second derivative of the reconstructed segment.

D11. The monitoring system of clause D10, wherein: the locations are identified based on a position-dependent threshold.

D12. The monitoring system of any one of clauses D9 to D11, wherein: the values for the identified locations are the values of the segment at the locations, or the values for the identified locations are based on the values of the segment at the locations and corresponding values of the reconstructed segment at the locations.

D13. The monitoring system of any one of clauses D9 to D12, wherein: the compressed segment is generated using a lossy compression method.

D14. The monitoring system of any one of clauses D9 to D13, wherein: the compressed segment is generated using at least one of polynomial approximation, frequency domain transformation, or audio encoding.

D15. The monitoring system of any one of clauses D9 to D14, wherein: the storage system monitoring data includes a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

D16. The monitoring system of any one of clauses D9 to D16, wherein: the identification of the locations occurs during the generation of the compressed segment.

D17. A non-transitory, computer-readable medium containing instruction that, when executed by at least one processor of a system, cause the system to perform operations comprising: obtaining a segment of storage system monitoring data; generating a compressed segment from the segment using a lossy compression method and a reconstructed segment from the compressed segment; identifying locations in the segment based on a comparison of the segment and the reconstructed segment; determining values for the identified locations, the values depending on the values of the segment at the location; receiving a user query from a user system, the user query indicating a portion of the segment; in response to the user query, performing at least one of: reconstructing and providing the portion using the identified locations, the determined values for the identified locations, and the compressed segment; or providing the identified locations, the determined values for the identified locations, and the compressed segment for reconstruction of the portion.

D18. The non-transitory, computer-readable medium of clause D17, wherein: the compressed segment is generated using at least one of polynomial approximation, frequency domain transformation, or audio encoding.

D19. The non-transitory, computer-readable medium of any one of clauses D17 to D18, wherein: the storage system monitoring data includes a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

D20. The non-transitory, computer-readable medium of any one of clauses D17 to D19, wherein: the identification of the locations occurs during the generation of the compressed segment.

E1. A storage system monitoring method, comprising: obtaining storage system monitoring data; generating a segment of the storage system monitoring data; determining time information, a compression technique, and a compression parameter set for the segment, wherein a reconstructed segment generated using the compression technique and the compression parameter set satisfies an error condition; storing the time information, the compression parameter set, and an indication of the compression technique; receiving a user query from a user system, the user query indicating a time interval; in response to the user query, identifying the compression technique and the compression parameter set based on the time interval and the time information and performing at least one of: reconstructing and providing at least a portion of the segment using the time information, the compression technique, and the compression parameter set; or providing the compression parameter set and the indication of the compression technique for reconstruction of the portion.

E2. The method of clause E1, wherein: the compression technique comprises a formula for approximating the segment that takes segment indices and the compression parameter set as parameters.

E3. The method of clause E2, wherein: the formula comprises a polynomial approximation formula.

E4. The method of clause E1, wherein: determining the compression technique and the compression parameter set comprises determining parameters for a compression formula and parameters for an inverse formula; and storing the time information, the compression parameter set, and the indication of the compression technique comprises storing the inverse formula parameters and an indication of the inverse formula.

E5. The method of clause E4, wherein: the compression formula comprises a frequency domain transform or audio encoding.

E6. The method of any one of clauses E1 to E5, wherein: the time information specifies a mapping from segment index to time.

E7. The method of any one of clauses E1 to E6, wherein: generating the segment of the storage system monitoring data comprises: segmenting the storage system monitoring data based on at least one of segment size, number of data points, or segment duration; segmenting the storage system monitoring data based on at least one of statistics of the storage system monitoring data, a frequency domain representation of the storage system monitoring data, or a wavelet domain representation of the storage system monitoring data; or applying the storage system monitoring data to at least one machine learning model trained to segment the storage system monitoring data.

E8. The method of any one of clauses E1 to E7, wherein: the error condition depends on a difference between values of the segment and values of the reconstructed segment.

E9. The method of any one of clauses E1 to E8, wherein: the method further comprises: determining anomalous values in the reconstructed segment; and storing reconstruction values corresponding to the anomalous values; and wherein the portion is reconstructed using the reconstruction values in place of the anomalous values.

E10. The method of any one of clauses E1 to E9, wherein: the storage system monitoring data includes CPU I/O wait time, CPU Guest Usage, CPU usage, System Status, number of connected clients, network usage, memory usage, disk usage, read latency, write latency, or operating system load.

E11. A monitoring system, comprising: at least one processor; and at least one non-transitory, computer-readable medium containing instructions that, when executed by the at least one processor of the monitoring system, cause the monitoring system to perform operations comprising: obtaining storage system monitoring data including multiple channels; generating a segment of the storage system monitoring data; determining time information, a compression technique, a compression parameter set for the segment, and a set of reconstruction values for the segment, wherein a reconstructed segment generated using the compression technique, the compression parameter set, and the set of reconstruction values satisfies an error condition based on a difference between values of the segment and values of the reconstructed segment; storing the time information, the compression parameter set, the set of reconstruction values, and an indication of the compression technique; receiving a user query from a user system, the user query indicating a time interval; in response to the user query, identifying the compression technique and the compression parameter set based on the time interval and the time information and performing at least one of: reconstructing and providing at least a portion of the segment using the time information, the compression technique, the compression parameter set, and the set of reconstruction values; or providing the compression parameter set, the set of reconstruction values, and the indication of the compression technique for reconstruction of the portion.

E12. The system of clause E11, wherein: the compression technique comprises a formula for approximating the segment that takes segment indices and the compression parameter set as parameters; or determining the compression technique and the compression parameter set comprises determining parameters for a compression formula and parameters for an inverse formula and storing the compression parameter set and the indication of the compression technique comprises storing the inverse formula parameters, an indication of the inverse formula.

E13. The system of any one of clauses E11 to E12, wherein: the time information specifies a mapping from segment index to time.

E14. The system of any one of clauses E11 to E13, wherein: generating the segment of the storage system monitoring data comprises: segmenting the storage system monitoring data based on at least one of segment size, number of data points, or segment duration; segmenting the storage system monitoring data based on at least one of statistics of at least one of the multiple channels, a frequency domain representation of the at least one of the multiple channels, or a wavelet domain representation of the at least one of the multiple channels; or applying the at least one of the multiple channels to at least one machine learning model trained to segment the storage system monitoring data.

E15. The system of any one of clauses E11 to E14, wherein: the segment includes at least two of the multiple channels; and the segment is generated based on values of only one of the multiple channels.

E16. The system of one of clauses E11 to E15, wherein: the operations further comprise updating the segment before determining the time information, the compression technique, the compression parameter set for the segment, and the set of reconstruction values for the segment, updating the segment comprising replacing one of the multiple channels with a corresponding updated channel, the updated channel being a function of the multiple channels.

E17. The system of one of clauses E11 to E16, wherein: the multiple channels include a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

E18. A non-transitory, computer-readable medium containing instructions that, when executed by at least one processor of a monitoring system, cause the monitoring system to perform operations comprising: obtaining storage system monitoring data including multiple channels; generating a segment of the storage system monitoring data; determining time information that specifies a mapping from segment index to time, a compression technique, a compression parameter set for the segment, and a set of reconstruction values for the segment, wherein a reconstructed segment generated using the compression technique, the compression parameter set, and the set of reconstruction values satisfies an error condition based on a difference between values of the segment and values of the reconstructed segment; storing the time information, the compression parameter set, the set of reconstruction values, and an indication of the compression technique; receiving a user query from a user system, the user query indicating a time interval; in response to the user query, identifying the compression technique and the compression parameter set based on the time interval and the time information and performing at least one of: reconstructing and providing at least a portion of the segment using the time information, the compression technique, the compression parameter set, and the set of reconstruction values; or providing the compression parameter set, the set of reconstruction values, and the indication of the compression technique for reconstruction of the portion.

E19. The non-transitory, computer-readable medium of clause E18, wherein: the compression technique comprises a formula for approximating the segment that takes segment indices and the compression parameter set as parameters; or determining the compression technique and the compression parameter set comprises determining parameters for a compression formula and parameters for an inverse formula and storing the compression parameter set and the indication of the compression technique comprises storing the inverse formula parameters, an indication of the inverse formula.

E20. The non-transitory, computer-readable medium of any one of clauses E18 to E19, wherein: generating the segment of the storage system monitoring data comprises: segmenting the storage system monitoring data based on at least one of segment size, number of data points, or segment duration; segmenting the storage system monitoring data based on at least one of statistics of at least one of the multiple channels, a frequency domain representation of the at least one of the multiple channels, or a wavelet domain representation of the at least one of the multiple channels; or applying the at least one of the multiple channels to at least one machine learning model trained to segment the storage system monitoring data.

It will be further understood that various modifications, alternatives, and variations in the details, materials, and arrangements of the parts which have been described and illustrated to explain the nature of described embodiments may be made by those skilled in the art without departing from the scope. Accordingly, the following claims embrace all such alternatives, modifications, and variations that fall within the terms of the claims.

What is claimed is:

1. A storage system monitoring method, comprising:

obtaining a segment of storage system monitoring data;

generating a compressed segment from the segment and a reconstructed segment from the compressed segment;

identifying locations in the reconstructed segment based on a comparison of the segment and the reconstructed segment, wherein the identified locations comprise anomalous values in the reconstructed segment;

determining original values for the identified locations, wherein the original values are associated with indices in the reconstructed segment mapped to segment times;

receiving a query indicating a portion of the storage system monitoring data;

in response to the query, retrieving the identified locations, the original values and the compressed segment; and reconstructing the portion using the original values to replace the anomalous values at the identified locations.

2. The method of claim 1, wherein:

the locations are identified based on a difference between:

the original values, first derivative, or second derivative of the segment and corresponding original values, first derivative, or second derivative of the reconstructed segment.

3. The method of claim 2, wherein:

the locations are identified based on a position-dependent threshold.

4. The method of claim 1, wherein:

the original values for the identified locations are values of the segment at the locations, or values for the identified locations are based on the values of the segment at the locations and corresponding values of the reconstructed segment at the locations.

5. The method of claim 1, wherein:

the compressed segment is generated using a lossy compression method.

6. The method of claim 1, wherein:

the compressed segment is generated using at least one of polynomial approximation, frequency domain transformation, or audio encoding.

7. The method of claim 1, wherein:

the storage system monitoring data includes CPU I/O wait time, CPU Guest Usage, CPU usage, System Status, number of connected clients, network usage, memory usage, disk usage, read latency, write latency, or operating system load.

8. The method of claim 1, wherein:

identifying the locations occurs during the generation of the compressed segment.

9. A monitoring system, comprising:

at least one processor; and at least one computer-readable medium containing instruction that, when executed by the at least one processor, cause the monitoring system to perform operations comprising:

obtaining a segment of storage system monitoring data;

generating a compressed segment from the segment and a reconstructed segment from the compressed segment;

identifying locations in the reconstructed segment based on a comparison of the segment and the reconstructed segment, wherein the identified locations comprise anomalous values in the reconstructed segment;

determining original values for the identified locations, wherein the original values are associated with indices in the reconstructed segment mapped to segment times;

receiving a query indicating a portion of the storage system monitoring data;

in response to the query, retrieving the identified locations, the original values and the compressed segment; and reconstructing the portion using the original values to replace the anomalous values at the identified locations.

10. The monitoring system of claim 9, wherein:

the locations are identified based on a difference between:

the original values, first derivative, or second derivative of the segment and corresponding original values, first derivative, or second derivative of the reconstructed segment.

11. The monitoring system of claim 10, wherein:

the locations are identified based on a position-dependent threshold.

12. The monitoring system of claim 9, wherein:

the original values for the identified locations are values of the segment at the locations, or values for the identified locations are based on the values of the segment at the locations and corresponding values of the reconstructed segment at the locations.

13. The monitoring system of claim 9, wherein:

the compressed segment is generated using a lossy compression method.

14. The monitoring system of claim 9, wherein:

the compressed segment is generated using at least one of polynomial approximation, frequency domain transformation, or audio encoding.

15. The monitoring system of claim 9, wherein:

the storage system monitoring data includes a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

16. The monitoring system of claim 9, wherein:

identifying the locations occurs during the generation of the compressed segment.

17. A non-transitory, computer-readable medium containing instruction that, when executed by at least one processor of a system, cause the system to perform operations comprising:

obtaining a segment of storage system monitoring data;

generating a compressed segment from the segment and a reconstructed segment from the compressed segment;

identifying locations in the reconstructed segment based on a comparison of the segment and the reconstructed segment, wherein the identified locations comprise anomalous values in the reconstructed segment;

determining original values for the identified locations, wherein the original values are associated with indices in the reconstructed segment mapped to segment times;

receiving a query indicating a portion of the storage system monitoring data;

in response to the query, retrieving the identified locations, the original values and the compressed segment; and reconstructing the portion using the original values to replace the anomalous values at the identified locations.

18. The non-transitory, computer-readable medium of claim 17, wherein:

the compressed segment is generated using at least one of polynomial approximation, frequency domain transformation, or audio encoding.

19. The non-transitory, computer-readable medium of claim 17, wherein:

the storage system monitoring data includes a table metric channel, a message metric channel, a streaming metric channel, a compaction metric channel, a commit log metric channel, a storage metric channel, a hint metric channel, an index metric channel, a buffer pool metric channel, a client management metric channel, a batch metric channel, or a virtual machine metric channel.

20. The non-transitory, computer-readable medium of claim 17, wherein:

identifying the locations occurs during the generation of the compressed segment.

* * * * *